(12) United States Patent
Matsuda

(10) Patent No.: US 7,792,775 B2
(45) Date of Patent: Sep. 7, 2010

(54) FILTERING RULE ANALYSIS METHOD AND SYSTEM

(75) Inventor: Katsushi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

(21) Appl. No.: 11/885,050

(22) PCT Filed: Feb. 23, 2006

(86) PCT No.: PCT/JP2006/303277

§ 371 (c)(1),
(2), (4) Date: Aug. 24, 2007

(87) PCT Pub. No.: WO2006/090781

PCT Pub. Date: Aug. 31, 2006

(65) Prior Publication Data

US 2008/0215518 A1   Sep. 4, 2008

(30) Foreign Application Priority Data

Feb. 24, 2005  (JP)  ............................. 2005-048295
Oct. 28, 2005  (JP)  ............................. 2005-314683

(51) Int. Cl.
*G06N 5/02* (2006.01)

(52) U.S. Cl. ...................................................... 706/47

(58) Field of Classification Search .................... 706/47
See application file for complete search history.

(56) References Cited

U.S. PATENT DOCUMENTS 7,003,562 B2 * 2/2006 Mayer ......................... 709/223
7,107,285 B2 * 9/2006 von Kaenel et al. ................ 1/1
7,685,271 B1 * 3/2010 Schneider et al. ........... 709/224

FOREIGN PATENT DOCUMENTS

| JP | 07-152573 | 6/1995 |
|----|-----------|--------|
| JP | 2000-174808 A | 6/2000 |
| JP | 2001-175672 A | 6/2001 |
| JP | 2003-333084 A | 11/2003 |
| JP | 2004-139177 A | 5/2004 |

(Continued)

OTHER PUBLICATIONS

Applying data mining techniques for descriptive phrase extraction in digital document collections, Ahonen, H.; Heinonen, O.; Klemettinen, M.; Verkamo, A.I.; Research and Technology Advances in Digital Libraries, 1998. ADL 98. Proceedings. IEEE International Forum on Digital Object Identifier: 10.1109/ADL.1670374 Pub. Year: 1998 pp. 2-11.*

(Continued)

*Primary Examiner*—Michael Holmes
(74) *Attorney, Agent, or Firm*—Foley & Lardner LLP

(57) ABSTRACT

A filtering rule analysis system for analyzing the rules of a packet filtering process that is set in network devices includes: a rule storage for storing sets of rules for which an order of priority has been established; a matrix generator for generating matrix spatial data that contains information of the order of priority and that indicates the correspondence relation between a minimum region identified by starting points and end points of ranges of packet attributes described in each rule as the condition of application of that rule and those rules; and an overlap analyzer for referring to the matrix spatial data to analyze overlap between the rules.

38 Claims, 38 Drawing Sheets

FOREIGN PATENT DOCUMENTS

JP          2004-287810 A      10/2004
JP          2004-320267 A      11/2004

OTHER PUBLICATIONS

ACO based spatial data mining for traffic risk analysis, Ravikumar, K.; Gnanabaskaran, A.; Innovative Computing Technologies (ICICT), 2010 International Conference on Digital Object Identifier: 10.1109/ICINNOVCT.2010.5440092 Publication Year: 2010 , pp. 1-6.*

Early separation of filter and refinement steps in spatial query optimization, Ho-Hyun Park; Chan-Gun Lee; Yong-Ju Lee; Chin-Wan Chung; Database Systems for Advanced Applications, 1999. Proceedings., 6th International Conference on Digital Object Identifier: 10.1109/DASFAA.1999.765748 Publication Year: 1999 , pp. 161-168.*

Rubric: A System for Rule-Based Information Retrieval, Mc Cune, B.P.; Tong, R.M.; Dean, J.S.; Shapiro, D.G.; Software Engineering, IEEE Transactions on vol. SE-11 , Issue: 9 Publication Year: 1985 , pp. 939-945.*

O Sumataki et al., "A Policy Description Language for Policy-Based Security Management," Information Processing Society of Japan SIG Notes, vol. 2004, No. 129, pp. 89-94.

* cited by examiner

R1=(3,5,5,7, *omitted* ,D)
R2=(2,8,4,12, *omitted* ,A)
R3=(11,13,8,10, *omitted* ,A)
R4=(5,9,1,3, *omitted* ,A)
R5=(1,7,1,3, *omitted* ,A)
R6=(10,14,7,12, *omitted* ,A)
R7=(4,7,8,11, *omitted* ,A)
R8=(0,15,0,13, *omitted* ,D)

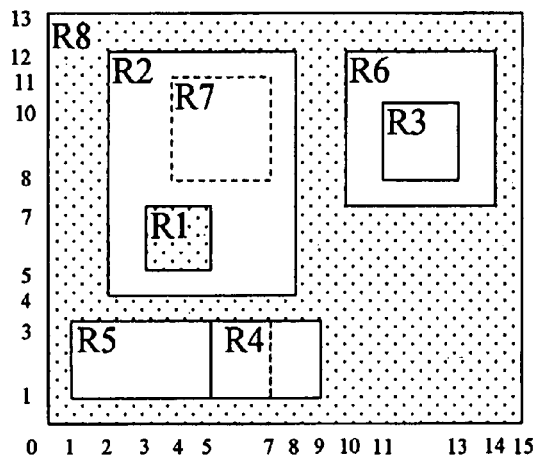
FIG. 6
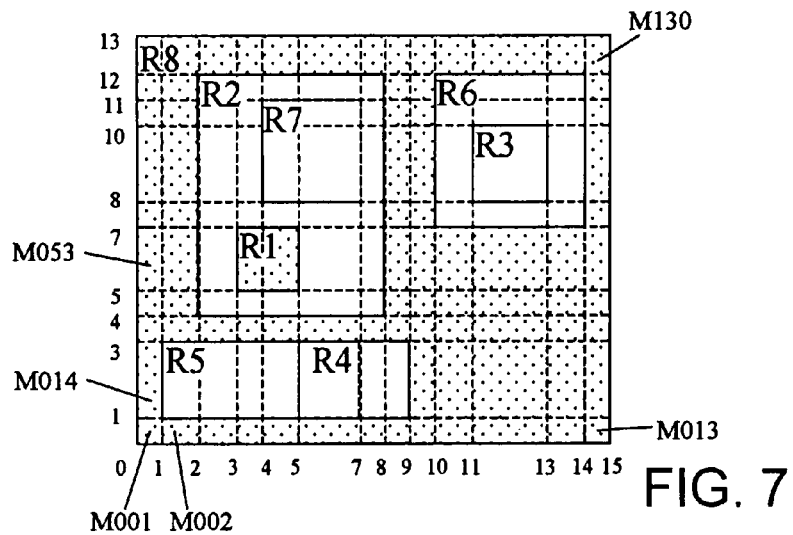
FIG. 7
M001=(0,1,0,1,*omitted*)
M002=(1,2,0,1,*omitted*)
M003=(2,3,0,1,*omitted*)
*omitted*
M012=(13,14,0,1,*omitted*)
M013=(14,15,0,1,*omitted*)
M014=(0,1,1,3,*omitted*)
M015=(1,2,1,3,*omitted*)
*omitted*
M129=(13,14,12,13,*omitted*)
M130=(14,15,12,13,*omitted*)
FIG. 8

R1=(3,5,5,7,*omitted*,D,M056,M057)
R2=(2,8,4,12,*omitted*,A,M042,M043,M044,M045,M046,M055,*omitted*,M110,M111)
R3=(11,13,8,10,*omitted*,A,M089)
R4=(5,9,1,3,*omitted*,A,M019,M020,M021)
R5=(1,7,1,3,*omitted*,A,M015,M016,M017,M018,M019)
R6=(10,14,7,12,*omitted*,A,M075,M076,M077,M088,*omitted*,M115,M116)
R7=(4,7,8,11,*omitted*,A,M083,M084,M096,M097)
R8=(0,15,0,13,*omitted*,D,ALL)

FIG. 9

M001=(0,1,0,1,*omitted*,R8)
*omitted*
M013=(14,15,0,1,*omitted*,R8)
M014=(0,1,1,3,*omitted*,R8)
M015=(1,2,1,3,*omitted*,R5,R8)
*omitted*
M018=(4,5,1,3,*omitted*,R5,R8)
M019=(5,7,1,3,*omitted*,R4,R5,R8)
M020=(7,8,1,3,*omitted*,R4,R8)
*omitted*
M056=(3,4,5,7,*omitted*,R1,R2,R8)
*omitted*
M082=(3,4,8,10,*omitted*,R2,R8)
M083=(4,5,8,10,*omitted*,R2,R7,R8)
M084=(5,7,8,10,*omitted*,R2,R7,R8)
*omitted*
M089=(11,13,8,10,*omitted*,R3,R6,R8)
*omitted*
M130=(14,15,12,13,*omitted*,R8)

FIG. 10

■ Results of overlap analysis of rules
Range (3, 5, 5, 7, *omitted*) of R2 is Overlapped by R1.
Range (5, 7, 1, 3, *omitted*) of R5 is Overlapped by R4.
Range (11, 13, 8, 10, *omitted*) of R6 is Overlapped by R3.
R7 is Concealed by R2.

FIG. 11

- Results of overlap analysis of rules
Range (2, 4, 4, 5, *omitted*) of R3 is Overlapped by R1.
Range (5, 7, 5, 7, *omitted*) of R3 is Overlapped by R2.
Range (7, 8, 5, 7, *omitted*) of R4 is Overlapped by R2.
R5 is Concealed by R3 and R4.
    Region (5, 7, 7, 10, *omitted*) is Concealed by R3.
    Region (7, 10, 7, 10, *omitted*) is Concealed by R4.

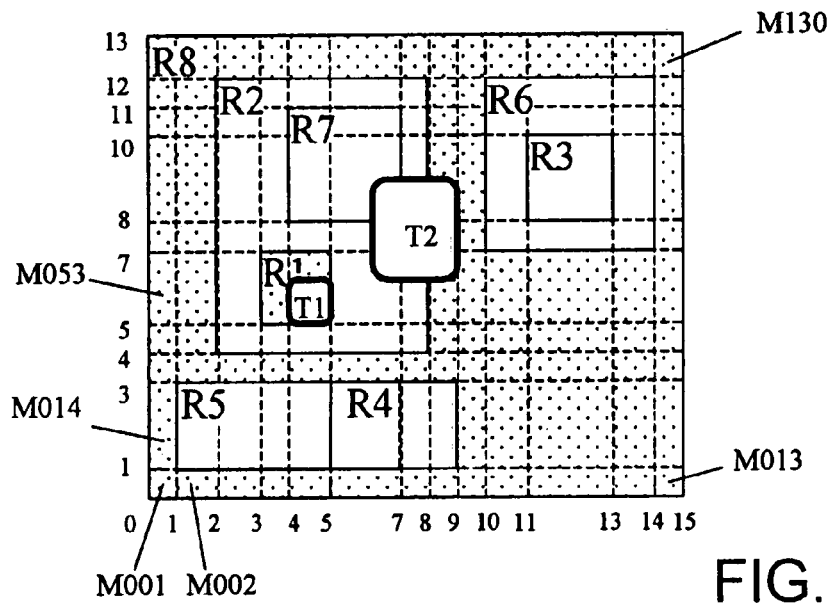
FIG. 16
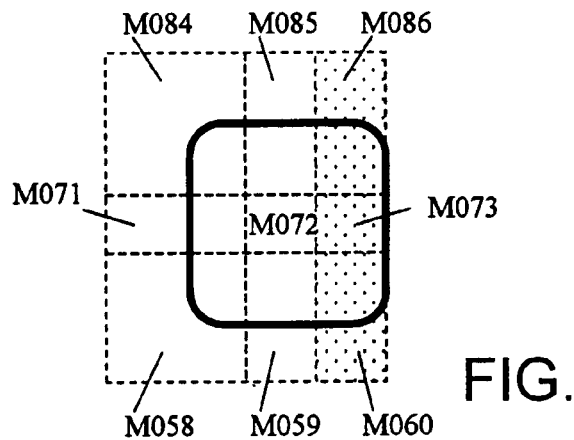
FIG. 17
- Result of packet pass test
Test packet T1 (4, 5, 5, 6, *omitted*) does not pass.
Test packet T2 (6, 9, 6, 9, *omitted*)
 passes if region of (6, 8, 6, 9, *omitted*), and
 does not pass if region of (8, 9, 6, 9, *omitted*).
FIG. 18

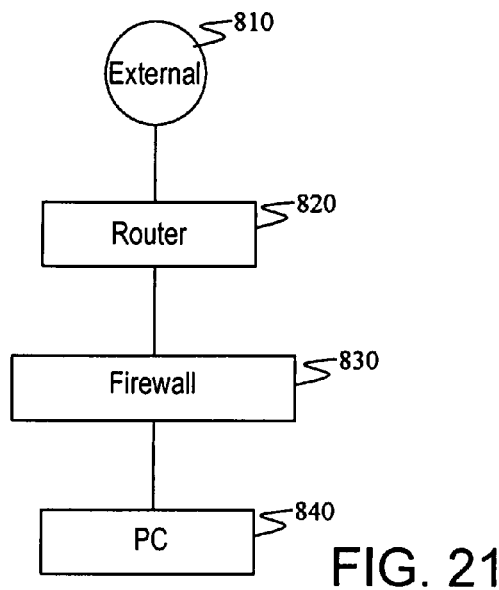
FIG. 21
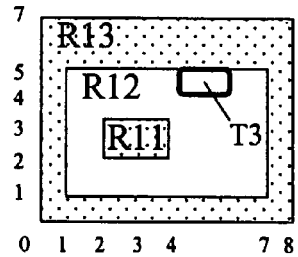
Rule set R100
R11=(2,4,2,3,*omitted*,D)
R12=(1,7,1,5,*omitted*,A)
R13=(0,8,0,7,*omitted*,D)
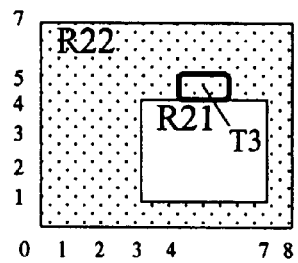
Rule set R200
R21=(3,7,1,4,*omitted*,A)
R22=(0,8,0,7,*omitted*,D)
FIG. 22
MT01=(4,7,4,5,*omitted*,R12,R13,R22)
MT02=(3,4,2,3,*omitted*,R11,R12,R13,R21,R22)
MT03=(4,7,1,2,*omitted*,R12,R13,R21,R22)
FIG. 23

■ Result of packet pass test
Test packet T1 (4, 5, 4, 5, *omitted*) does not pass. Passage of rule set R100 is allowed, but passage of rule set R100 is denied.
FIG. 24
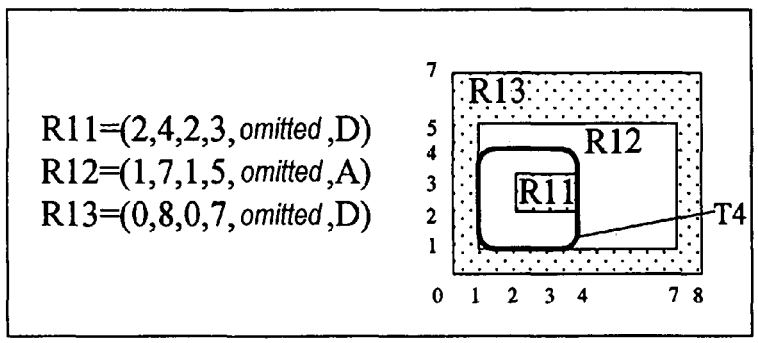
R11=(2,4,2,3,*omitted*,D)
R12=(1,7,1,5,*omitted*,A)
R13=(0,8,0,7,*omitted*,D)
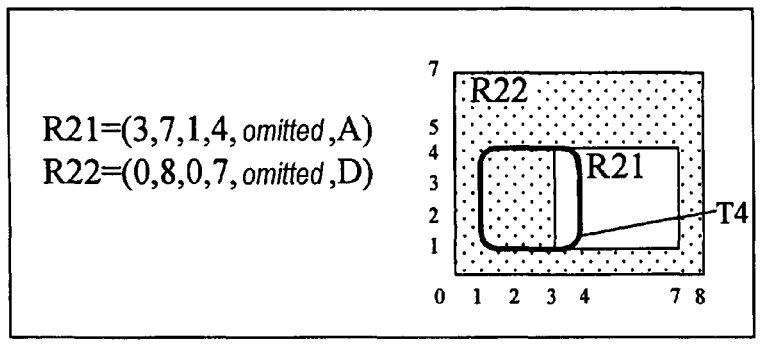
R21=(3,7,1,4,*omitted*,A)
R22=(0,8,0,7,*omitted*,D)
FIG. 25A
In case of T4=(1, 4, 1, 4, *omitted*)
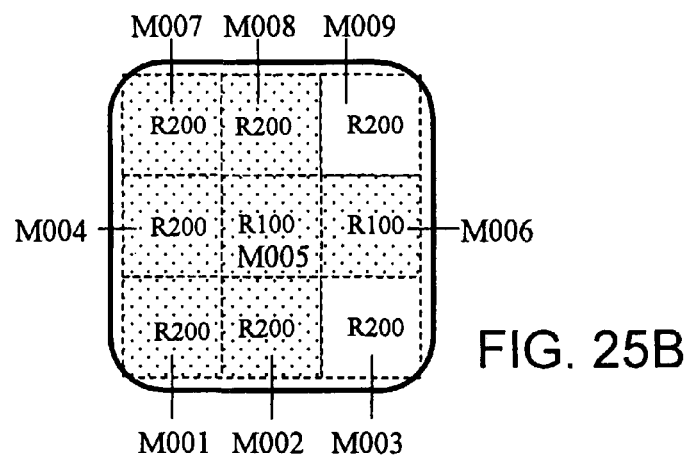
FIG. 25B Rule set R300
R31=(2,4,2,3,omitted,D)
R32=(1,7,1,5,omitted,A)
R33=(0,8,0,7,omitted,D)
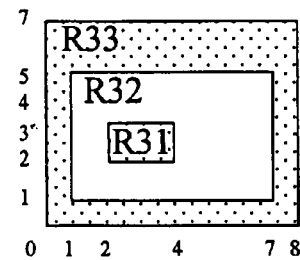
Rule set R400
R41=(4,7,2,4,omitted,A)
R42=(2,7,1,2,omitted,A)
R43=(1,2,1,5,omitted,A)
R44=(2,7,3,5,omitted,A)
R45=(0,8,0,7,omitted,D)
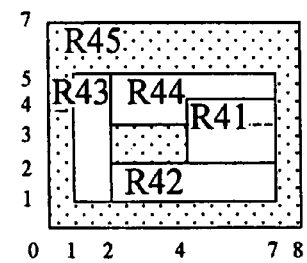
FIG. 30
■ Result of sameness analysis
Rule set R300 and rule set R400 perform same filtering process.
FIG. 31

| Rule set R800 | R81=(2,4,2,3,*omitted*,D)<br>R82=(1,7,1,5,*omitted*,A)<br>R83=(0,8,0,7,*omitted*,D) | 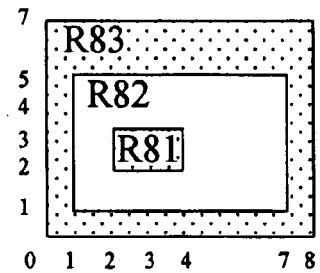 |
| Rule set R900 | R91=(4,7,2,4,*omitted*,A)<br>R92=(3,7,1,2,*omitted*,A)<br>R93=(1,2,1,5,*omitted*,A)<br>R94=(2,7,3,5,*omitted*,A)<br>R95=(0,8,0,7,*omitted*,D) | 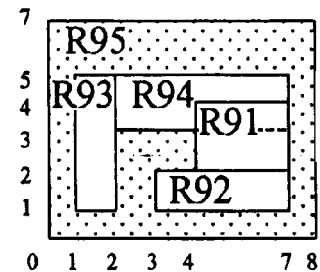 |
FIG. 32
■ Result of sameness analysis
Rule set R800 and rule set R900 perform different filtering processes.
　　Difference region: (2,3,1,2,*omitted*) A in R800; D in R900
FIG. 33

Reduction for X-axis

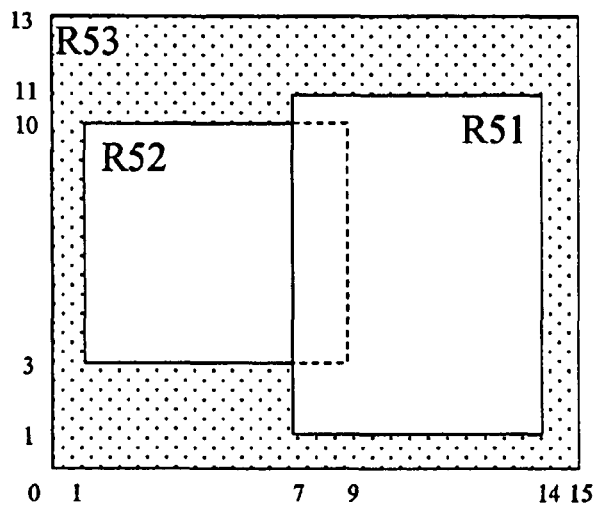
FIG. 41A
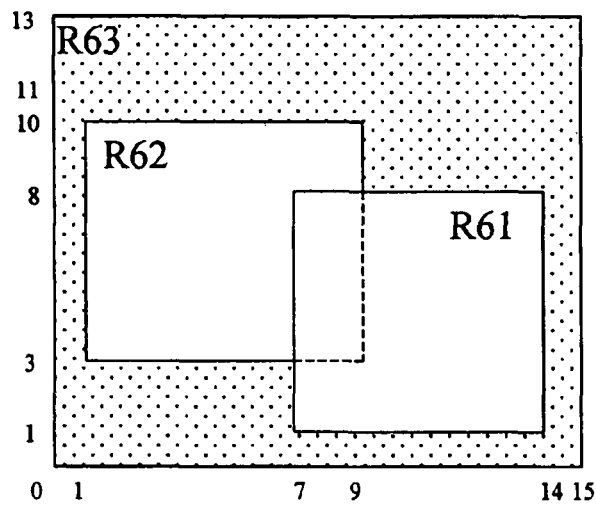
FIG. 41B
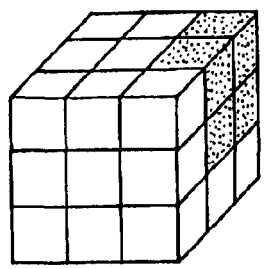
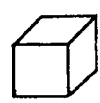 Matrix in which R72 is leading rule
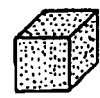 Matrix in which R71 is leading rule
FIG. 42

R1=(2,4,4,7, omitted ,A)
R2=(2,3,5,8, omitted ,A)
R3=(8,11,3,5, omitted ,A)
R4=(10,13,4,7, omitted ,D)
R5=(9,10,3,4, omitted ,D)
R6=(7,14,1,11, omitted ,A)
R7=(1,8,3,11, omitted ,A)
R8=(4,9,7,10, omitted ,A)
R9=(0,15,0,13, omitted ,D)

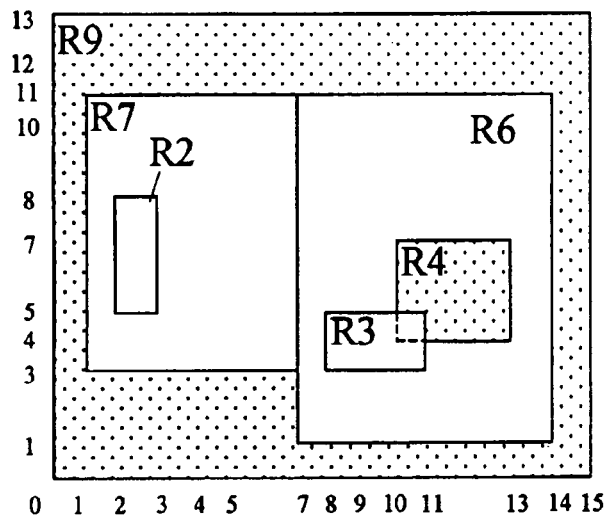
FIG. 51
R2=(2,3,5,8,*omitted*,A)    < Delete R1
R3=(8,11,3,5,*omitted*,A)
R4=(10,13,4,7,*omitted*,D)  < Delete R5
R6=(7,14,1,11,*omitted*,A)
R7=(1,7,3,11,*omitted*,A)   ← Reduce R7 (underlined portion)
R9=(0,15,0,13,*omitted*,D)  < Delete R8
FIG. 52
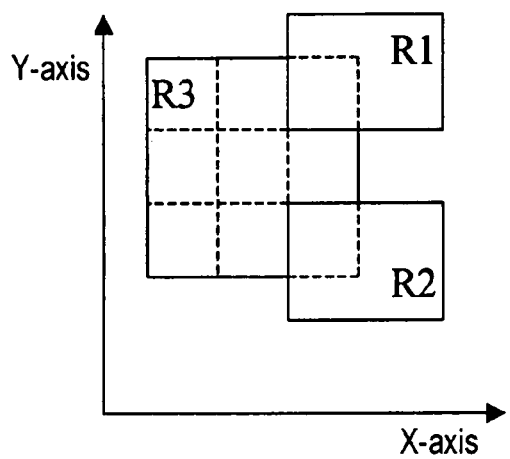
FIG. 53

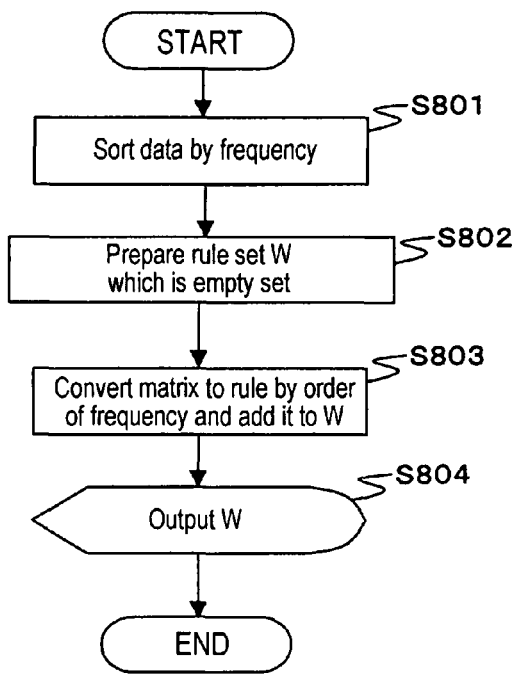
FIG. 57
FIG. 58
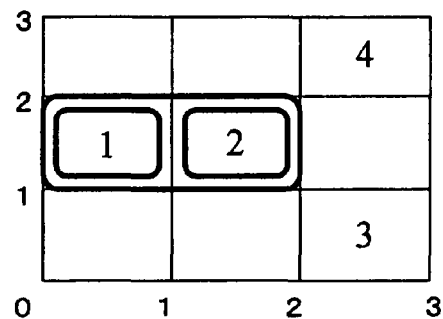
R1=(3,7,1,4,omitted,A)
R2=(0,8,0,7,omitted,D)
FIG. 59
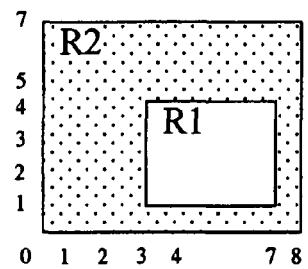
H1=(1,2)
H2=(5,2)
H3=(6,0)
H4=(5,0)
...
H1000=(2,6)
FIG. 60
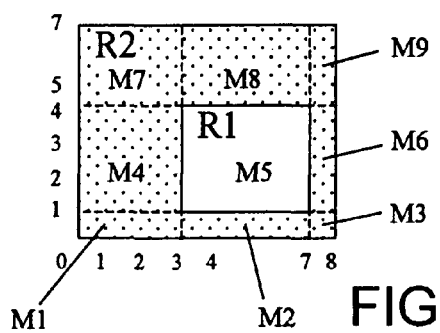
FIG. 61

M1=(0,3,0,1,*omitted*,R2,<u>64</u>)   Seventh
M2=(3,7,0,1,*omitted*,R2,<u>103</u>)   Third
M3=(7,8,0,1,*omitted*,R2,<u>12</u>)   Ninth
M4=(0,3,1,4,*omitted*,R2,<u>324</u>)   First
M5=(3,7,1,4,*omitted*,R1,R2,<u>78</u>)   Fifth
M6=(7,8,1,4,*omitted*,R2, <u>86</u>)   Fourth
M7=(0,3,4,7,*omitted*,R2,<u>226</u>)   Second
M8=(3,7,4,7,*omitted*,R2,<u>75</u>)   Sixth
M9=(7,8,4,7,*omitted*,R2,<u>32</u>)   Eighth R1=(0,3,1,4,*omitted*,D)
R2=(0,3,4,7,*omitted*,D)
R3=(3,7,0,1,*omitted*,D)
R4=(7,8,1,4,*omitted*,D)
R5=(3,7,1,4,*omitted*,A)
R6=(3,7,4,7,*omitted*,D)
R7=(0,3,0,1,*omitted*,D)
R8=(7,8,4,7,*omitted*,D)
R9=(7,8,0,1,*omitted*,D)

M001=(0,1,0,1, *omitted*,R8)  ←Delete
*omitted*
M013=(14,15,0,1, *omitted*,R8)  ←Delete
M014=(0,1,1,3, *omitted*,R8)  ←Delete
M015=(1,2,1,3, *omitted*,R5,R8)
*omitted*
M018=(4,5,1,3, *omitted*,R5,R8)
M019=(5,7,1,3, *omitted*,R4,R5,R8)
M020=(7,8,1,3, *omitted*,R4,R8)
*omitted*
M056=(3,4,5,7, *omitted*,R1,R2,R8)
*omitted*
M082=(3,4,8,10, *omitted*,R2,R8)
M083=(4,5,8,10, *omitted*,R2,R7,R8)
M084=(5,7,8,10, *omitted*,R2,R7,R8)
*omitted*
M089=(11,13,8,10, *omitted*,R3,R6,R8)
*omitted*
M130=(14,15,12,13, *omitted*,R8)  ←Delete

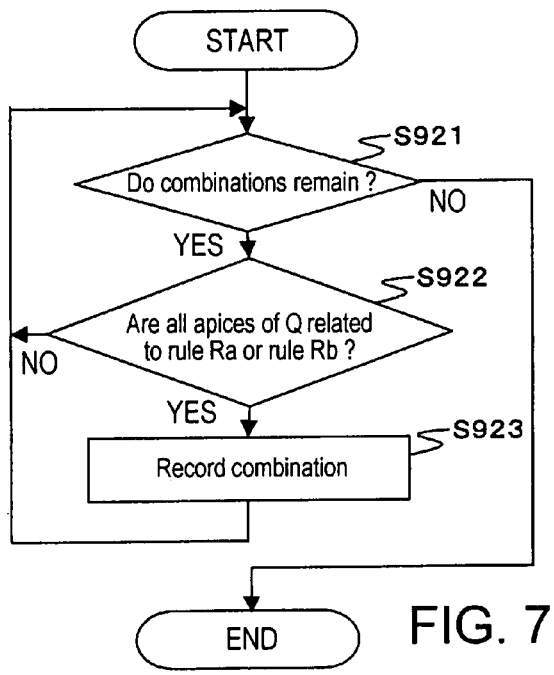
FIG. 70
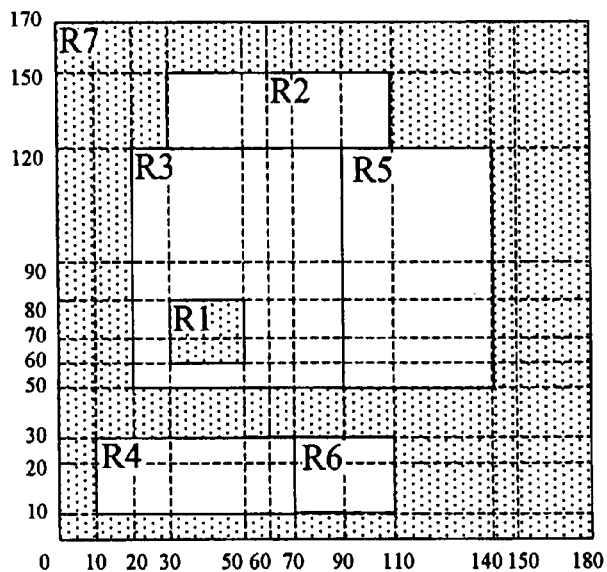
FIG. 71A
R1=(30,50,60,80,*omitted*,D,M0059,M0070) ──────────▶ 2
R2=(30,110,120,150,*omitted*,A,M0103~M0107) ──────────▶ 5
R3=(20,90,50,120,*omitted*,A,M0047~M0051,M0058~M0062,*omitted*) ──────▶ 25
R4=(10,70,10,30,*omitted*,A,M0013~M0017,M0024~M0028) ─────────▶ 10
R5=(90,140,50,120,*omitted*,A,M0052,M0053,M0063,M0064,*omitted*) ──────▶ 10
R6=(50,110,10,30,*omitted*,A,M0016-M0019,M0027-M0030) ────────▶ 8
R7=(0,180,0,170,*omitted*,D,all) ──────────────────▶ 121
FIG. 71B M(R2+R3)=36 > M(R2)+M(R3)=5+25=30
M(R2+R4)=63 > M(R2)+M(R4)=5+10=15
M(R2+R5)=36 > M(R2)+M(R5)=5+10=15
M(R2+R6)=45 > M(R2)+M(R6)=5+8=13
M(R3+R4)=48 > M(R3)+M(R4)=25+10=35
M(R3+R5)=35 = M(R3)+M(R5)=25+10=35
M(R3+R6)=48 > M(R3)+M(R6)=25+8=33
M(R4+R5)=64 > M(R4)+M(R5)=10+10=20
M(R4+R6)=14 < M(R4)+M(R6)=10+8=18
M(R5+R6)=40 > M(R5)+M(R6)=10+8=18
FIG. 72
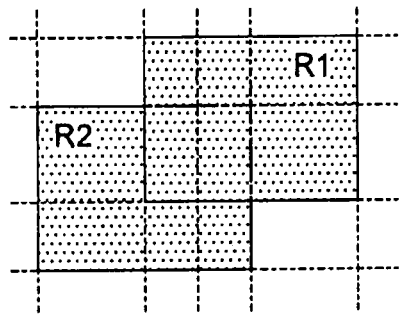
M(R1+R2)=12 = M(R1)+M(R2)=6+6=12
FIG. 73
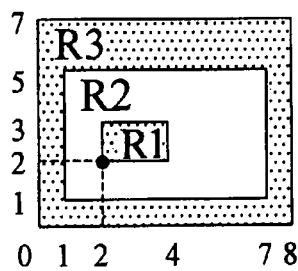
FIG. 74A
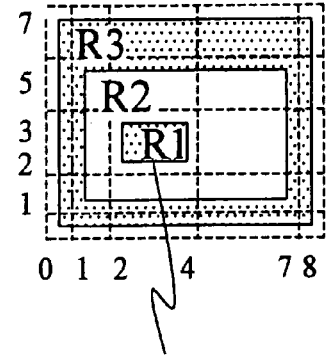
Matrix Mx
FIG. 74B
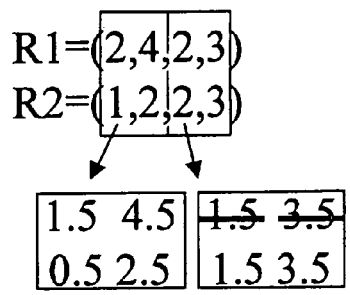
FIG. 75A
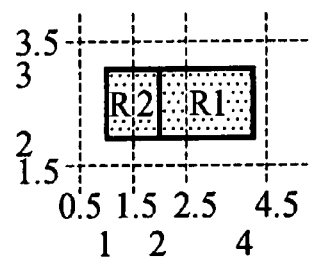
FIG. 75B

FILTERING RULE ANALYSIS METHOD AND SYSTEM

TECHNICAL FIELD

The present invention relates to a filtering rule analysis method and system for analyzing packet filtering rules.

BACKGROUND ART

In businesses and organizations, there is a growing concern regarding the security of networks operated by them.

As one method for protecting the network of an own organization, there is a method using a firewall. A firewall is network equipment or software installed in a gateway or router that connects an external network and an inside network, i.e., the network to be protected. The firewall inspects packets that flow through the network, either allowing these packets to pass through or blocking the packets to protect the inside network from improper access. The process carried out by the firewall is typically referred to as "packet filtering." The firewall inspects packets based on a set of rules in which packet attributes (such as the address or port of the transmission source, the address or port of the transmission destination, and the type of protocol) are taken as conditions. The firewall examines whether to permit passage of packets based on a set of rules such as "permit passage of packets having a particular protocol and directed toward a specific port of an address of the public server of this organization's network." The set of rules are referred to as a policy. Because the number of rules in the policy of a typical firewall currently ranges from several tens to several hundreds and the conditions of each rule are complex, a thorough understanding of an entire policy is difficult even for a security expert to achieve. Managing and maintaining the policies in a firewall in an optimum state is therefore a major problem in maintaining network security.

Comprehending the state of the policies of a firewall is currently achieved manually by an expert through the use of software for realizing a GUI (Graphical User Interface) that displays a list of policies. Policy management for determining whether policy rules are the optimum set and shaping this set to the optimum rule set when the policy rules are not the optimum set is also currently realized manually.

JP-A-2000-174808 describes a technique for changing the order among policy rules to raise the efficiency of the packet filtering process of a firewall. The operation method of the data packet filter described in JP-A-2000-174808 is a method which raises the processing efficiency of packet filtering by moving forward in the order of rules those rules of the packet filtering rules that frequently match incoming packets. In this method, a particular rule is paired with another rule and this pair then checked for conflict. Conflict means that substituting a particular rule for another rule results in a change in the meaning of the entirety of rules. More specifically, a conflict of rules is a case in which actions differ, and moreover, an intersection occurs between fields, i.e., an intersection occurs between any of protocols, source addresses, source ports, destination addresses, and destination ports. In this method, all pairs are checked for the existence or lack of conflict and a conflict table indicating the conflict data is generated. The number of times a rule matches received packets is referred to as a "match count," and based on this match count of each rule, rules having high match counts are finally moved forward in sequence. At this time, the order of the rules is altered on the condition that the overall policy does not change despite changes in the rule order, i.e., that rules do not conflict with each other. A sorting algorithm such as bubble sorting is used for this algorithm.

JP-A-2003-333084 describes a method for, when adding rules to a firewall policy, determining where a new rule is to be added and inserted. In this method, new rules and already existing rules are compared in order, and when there is an already existing rule that contains all or a portion of a new rule, the new rule is inserted immediately before the already existing rule. The algorithm for checking the containment relation of rules is as follows: A new rule is first selected. Already existing rules are then selected in order one at a time. The selected rules are then subjected to interface collation, protocol collation, chain collation, address collation, and port collation; and when non-matching occurs in any collation, the next existing rule is selected and the same collation carried out. When there is matching, the rules are next subjected to action collation, and if the actions match, the new rule is inserted immediately before the selected already existing rule. If the actions do not match, the user is prompted to decide whether to insert the new rule or not.

The method described in JP-A-2003-333084 uses a technique that is substantially equivalent to the step for determining intersections of fields in the rule pairs described in JP-A-2000-174808. This JP-A-2003-333084 also describes the addition to rules of information regarding the effective time and scanning of the rule set at fixed time intervals to delete rules when the effective time matches or exceeds the current time. This technique enables the appropriate elimination of old rules.

SCCML (Security Configuration Coordinator Markup Language), which is policy language capable of the integrated expression of the setting information of various security devices, is described in Okajo Sumitaka, Matsuda Katsushi, and Ogawa Ryuichi, "A Policy Description Language SCCML for Policy-Based Security Management," Information Processing Society of Japan SIG Notes, Vol. 2004, No. 129, pp. 89-94.

Patent Document 1: Japanese Patent Laid-open Application No. 2000-174808 (JP-A-2000-174808)

Patent Document 2: Japanese Patent Laid-open Application No. 2003-333084 (JP-A-2003-333084)

Non-Patent Document 1: Okajo Sumitaka, Matsuda Katsushi, and Ogawa Ryuichi, "A Policy Description Language for Policy-Based Security Management," Information Processing Society of Japan SIG Notes, Vol. 2004, No. 129, pp. 89-94

DISCLOSURE OF THE INVENTION

Problem to be Solved by the Invention

In the method described in JP-A-2000-174808, rules are re-arranged to achieve a higher-speed filtering process. However, this method cannot meet the needs of an administrator who wishes to know the actual state of a policy, the needs of an administrator who wishes to know if a policy is in optimum form, or the needs of an administrator who wishes to optimize a policy, and further, cannot realize an accelerated filtering process in the case of a rule set in which rules cannot be re-arranged by algorithms, i.e., in the case of a rule set in which conflict occurs between any two rules.

The method described in JP-A-2003-333084 merely determines where a newly added rule is to be inserted and cannot meet the needs of an administrator who wishes to know the actual state of a policy, the needs of an administrator who wishes to know whether a policy is in optimum form, or the needs of an administrator who wishes to optimize a policy. Further, although this method deletes rules having an effective time that precedes the current time in rule sets in which effective time has been set, the method cannot meet the needs of an administrator who wishes to delete rules that have become unnecessary to optimize rules in typical packet filtering in which effective times are not set.

When inspecting packet filtering rules in the case of a plurality of network devices that carry out the packet filtering process, it is preferably possible to determine the sameness of the packet filtering process in each device.

It is an object of the present invention to provide a filtering rule analysis method and system that can support the management of the filtering rules of a firewall and that can facilitate the comprehension of the relations between rules and the comprehension of the entirety of rules, i.e., a policy, that determines which packets are to be permitted to pass and which packets are to be blocked.

It is another object of the present invention to provide a filtering rule analysis method and system that allow the optimization of a set of rules for a set of rules that has become complex.

It is yet another object of the present invention to provide a filtering rule analysis method and system that enable a packet filtering process of higher speeds.

Finally, it is another object of the present invention to provide a filtering rule analysis method and system that allow the determination of the sameness of the packet filtering process in a plurality of devices.

Means for Solving the Problem

According to the present invention, a filtering rule analysis method includes: a step of storing a set of rules in which an order of priority has been set, these rules being used in a packet filtering process; and a spatial data generation step of generating spatial data that contains information of the order of priority, the spatial data indicating the correspondence relation between: a minimum region identified by starting points and end points of ranges of packet attributes described in each rule as a conditions of application of the rule; and the rules.

The filtering rule analysis method of the present invention may includes: an integratable rule identification step for identifying a combination of rules that can be integrated, and a rule integration step for integrating rules that make up the combination identified in the integratable rule identification step, and that are rules that belong to a rule set that has been stored. This configuration can integrate rules with each other, and by integrating rules together, can reduce the number of rules and thus make the rules more easily comprehended by an administrator.

The spatial data generation step may be provided with a step of deleting, of the generated spatial data, data of a minimum region that can be placed in correspondence with only a default rule. This configuration can reduce the data of the minimum region and thus facilitate comprehension of the relations between each of the rules. This configuration can further reduce the number of minimum regions and thus decrease the consumption of memory.

According to the present invention, a filtering rule analysis system includes: rule storage means for storing a set of rules in which an order of priority has been set, the rules being used in a packet filtering process; and spatial data generation means for generating spatial data that contains information of an order of priority, the spatial data indicating the correspondence relation between: a minimum region identified by starting points and end points of ranges of packet attributes described in each rule as a condition of application of the rule, and the rules.

The filtering rule analysis system of the present invention may includes overlap analysis means that uses the spatial data generated by the spatial data generation means to analyze overlap of the ranges of attributes described as the condition of application of each rule. In this configuration, since the overlap analysis means analyzes the overlap of the ranges of attributes described as the condition of application of each rule, it is possible to comprehend the relation between rules in the management of filtering rule. The overlap analysis means may be of a configuration that detects a state in which the range of an attribute described by one rule is contained within or partially overlaps with the range of an attribute described by another rule having a higher order of priority than this one rule. This configuration detects rules that are concealed by rules having a higher order of priority and therefore enables comprehension of the relation between rules.

The filtering rule analysis system of the present invention may be of a configuration which includes packet attribute input means for receiving packet attributes as input, and pass test means for using spatial data that have been generated by the spatial data generation means to determine the minimum regions to which the packet attributes pertain, and then, by checking the operations that accords with the rule that corresponds to the minimum region to which the packet attributes pertain, determining whether a packet having the attributes that have been received as input is to be permitted to pass in the packet filtering process. A configuration of this type can facilitate the comprehension of the entirety of rules for determining which packets are to be permitted to pass and which packets are to be blocked.

The system of the present invention may be of a configuration in which the rule storage means stores a plurality of sets of rules; the spatial data generation means extracts starting points and end points of ranges of packet attributes described within each rule as a condition of application of the rule from all rules contained within the plurality of rule sets and uses the starting points and end points to generate spatial data for each set of rules; and the system further includes sameness analysis means for determining whether packet filtering processes based on each rule set are the same process or not by determining whether the operations of rules in minimum regions corresponding to a plurality of items of spatial data match or not. A configuration of this type can determine the sameness of packet filtering processes in a plurality of devices. The sameness analysis means may be of a configuration that supplies ranges of the minimum regions as output when it determines that the operations of rules in minimum regions that correspond to a plurality of items of spatial data do not match.

The system of the present invention may be of a configuration which includes rule deletion means that refers to the spatial data generated by the spatial data generation means to identify a rule that, despite deletion, exerts no influence on the packet filtering process, and that deletes the identified rule. According to a configuration of this type, the rule deletion means deletes unnecessary rules, whereby the set of rules can be optimized.

The system of the present invention may also be of a configuration which includes rule amendment means that refers to the spatial data generated by the spatial data generation means to amend a relevant rule so as to exclude, of the regions identified by ranges of attributes described in each rule as a condition of application of the rule, a region that despite elimination exerts no influence on the packet filtering process. A configuration of this type can optimize a set of rules by amending rules by means of the rule amendment means. The rule amendment means may be of a configuration that realizes the amendment by identifying, of the ranges of attributes described as a condition of application of one rule, a region of overlap with a range of an attribute described as a condition of application of another rule having a higher order of priority, and when a range of all attributes other than the one attribute in this region matches the range of the attribute originally described as the condition of application of the one rule, narrowing a range of the one attribute in the one rule. Alternatively, the rule amendment means may be of a configuration that divides, by the minimum regions, a rule for which a portion of a range of an attribute described as a condition of application overlaps with the range of an attribute described as a condition of application of another rule having a higher order of priority, and, of the plurality of rules obtained by the division, deletes a rule that overlaps with the range of the attribute described as a condition of application of another rule having a higher order of priority.

The system of the present invention may be of a configuration which includes frequency analysis means that refers to attributes of a plurality of packets that are actual objects of the packet filtering process to count, for each minimum region, the number of packets for which attributes are contained in the minimum region; and rule creation means that sorts the minimum regions in order of greater number of packets that have been counted, and that creates a new rule based on a portion or all of the minimum regions and rules that correspond to these minimum regions. According to a configuration of this type, the rule creation means the sorts minimum regions in the order of greater number of counted packets and then creates new rules based on a portion or all of these minimum regions and the rules that correspond to these minimum regions. Accordingly, rules that conform to packets that are actually the objects of the packet filtering process are newly created, whereby the speed of the packet filtering process can be increased.

The rule creation means may also select, of minimum regions that have been sorted, a prescribed number of minimum regions in order of greater numbers of counted packets and then create a new rule based on these minimum regions and rules that correspond to these minimum regions to add to originally existing set of rules. Alternatively, the rule creation means may be of a configuration that identifies, of the set of rules to which a newly created rule has been added, a rule that despite deletion exerts no effect on the packet filtering process, and deletes the identified rules. A configuration of this type enables optimization of the set of rules. The rule creation means may further be of a configuration that selects all sorted minimum regions in order, creates new a rule based on a minimum region that has been selected and a rule that corresponds to the selected minimum region, and creates a set of new rules from only created rules. Rule-making means may further be provided, and this rule-making means may join together minimum regions that are adjacent minimum regions for which difference in the number of packets counted by the frequency analysis means is within a prescribed range to thus produce one minimum region and then produces a new rule after joining the minimum regions.

The filtering rule analysis system of the present invention may be of a configuration which includes integratable rule identification means for identifying a combination of rules that can be integrated; and rule integration means for integrating rules together that are rules belonging to a rule set stored in the rule storage means and that make up a combination that have been identified by the integratable rule identification means. A configuration of this type can integrate rules with each other, and integrating rules can decrease the number of rules and thus allow an administrator to more easily comprehend the rules. The integratable rule identification means may be of a configuration that, when a sum of the number of minimum regions that correspond to one of two rules that share operations and that are not a default rule and the number of minimum regions that correspond to the other rule of the two rules matches the number of minimum regions that correspond to a region determined by the two rules, takes the combination of the two rules as an integratable rule combination candidate; and when, of the minimum regions that correspond to a region determined by the two rules that make up the combination candidate, each minimum region that contains an apex of the region determined by the two rules corresponds to either one of the two rules, takes the combination of the two rules as an integratable rule combination. Alternatively, a configuration is also possible in which the integratable rule identification means identifies a combination of rules that can be integrated, and the rule integration means repeats the integration of rules that make up identified combinations until the integratable rule identification means can no longer identify combinations of rules that can be integrated.

In the present invention, the spatial data generation means may be of a configuration that deletes, of generated spatial data, data of a minimum region that has been placed in correspondence with only a default rule. A configuration of this type can reduce the data of minimum regions and facilitate the comprehension of the relation between each rule. In addition, the ability to decrease the number of minimum regions enables a reduction of memory consumption. Alternatively, the spatial data generation means may be of a configuration that uses values obtained by subtracting a prescribed value from values of starting points of ranges of packet attributes described in each rule as a condition of application of the rule and values obtained by adding a prescribed value to values of end points of ranges of the attributes to determine a minimum region that is identified by starting points and end points of ranges of packet attributes that are described in each rule as a condition of application of the rule.

The present invention can facilitate the comprehension of the relation between rules and the comprehension of the entirety of rules that determines the type of packets that are to be permitted to pass and the type of packets that are to be blocked in the management of filtering rules of a firewall. The present invention allows the optimization of the set of rules in sets of rules that have become complex, enables an acceleration of the packet filtering process, and allows the determination of sameness of the packet filtering processes in a plurality of devices.

BRIEF DESCRIPTION OF THE DRAWINGS

FIG. 6 is a schematic view in which a rule set is represented on a two-dimensional plane;

FIG. 7 is a schematic view in which matrix data is represented on a two-dimensional plane;

FIG. 8 is a view showing an example of the description format of matrix data;

FIG. 9 is a view showing an example of rule data;

FIG. 10 is a view showing an example of matrix data;

FIG. 11 is a view showing an example of the analysis results realized by the overlap analyzer;

FIG. 16 is a schematic view in which matrix data derived from a rule set are represented on a two-dimensional plane;

FIG. 17 is a schematic view showing two-dimensional space in the vicinity of a test packet;

FIG. 18 is a view showing an example of the test process results realized by the pass test unit;

FIG. 21 is a view showing an example of a network configuration;

FIG. 22 is a view showing an example of a rule set;

FIG. 23 is a view showing an example of matrix data in which a list of rules has been added;

FIG. 24 is a view showing an example of the test process results realized by the pass test unit;

FIG. 25A is a view showing a rule set and a test packet;

FIG. 25B is a view showing a rule set and a test packet;

FIG. 30 is a view showing an example of a rule set;

FIG. 31 is a view showing an example of the analysis results realized by the sameness analyzer;

FIG. 32 is a view showing an example of a rule set;

FIG. 33 is a view showing an example of the analysis results realized by the sameness analyzer;

FIG. 41A is a view showing a case in which reduction is possible;

FIG. 41B is a view showing a case in which reduction is not possible;

FIG. 42 is a view showing a case in which reduction is not possible;

FIG. 51 is a schematic view showing the change of a rule set that accompanies the processing of the rule deletion unit;

FIG. 52 shows an example of the process results realized by the rule deletion unit;

FIG. 53 is a schematic view showing an example of a case in which reduction is realized by increasing rules;

FIG. 57 is a flow chart showing another example of the new rule set creation process realized by the rule maker;

FIG. 58 is a schematic view showing an example of joining matrix data;

FIG. 59 is a view showing an example of a rule set;

FIG. 60 is a view showing an example of packet history;

FIG. 61 is a schematic view in which matrix data are represented on a two-dimensional plane;

FIG. 70 is a flow chart showing an example of the progression of the process for checking whether a combination of rules that is taken as a candidate for integration can be subjected to integration or not;

FIG. 71A is a view showing an example of rule data;

FIG. 71B is a view showing an example of rule data;

FIG. 72 is an explanatory view showing the comparison of Mq and Ma+Mb;

FIG. 73 is an explanatory view showing an example of a case in which the number of matrices of a portion in which two rules overlap matches with the number, of the matrices that make up the minimum multidimensional solid Q realized by two rules, those matrices having no relation to the two rules;

FIG. 74A is a view showing packets on the boundaries of the region of a rule;

FIG. 74B is a view showing packets on the boundaries of the region of a rule;

FIG. 75A is an explanatory view showing an example of a matrix for a case in which a value obtained by subtracting a prescribed value from a value representing the starting point of each attribute of a rule and a value obtained by adding a prescribed value to a value representing the end point of each attribute of a rule are taken as boundary points; and FIG. 75B is an explanatory view showing an example of a matrix for a case in which a value obtained by subtracting a prescribed value from a value representing the starting point of each attribute of a rule and a value obtained by adding a prescribed value to a value representing the end point of each attribute of a rule are taken as border points; and

EXPLANATION OF REFERENCE NUMBERS

100 Rule storage;
120 Matrix space storage;
130, 131 Matrix generator;
140 Overlap analyzer;
150, 151 Pass test unit;
160 Sameness analyzer;
170 Rule deletion unit;
180 Frequency analyzer;
190 Rule maker;
200 Rule integrator;
920 Input device;
930 Output device; and
940 Test input device.

BEST MODE FOR CARRYING OUT THE INVENTION

Explanation next regards exemplary embodiments of the present invention with reference to the accompanying drawings. In the following explanation, the packet filtering rules of a firewall and the access control rules of a router are similar rules, and the two types of rules will therefore at times be referred to as "packet filtering rules" and at times be referred to as simply rules.

First Exemplary Embodiment

Figure 1:
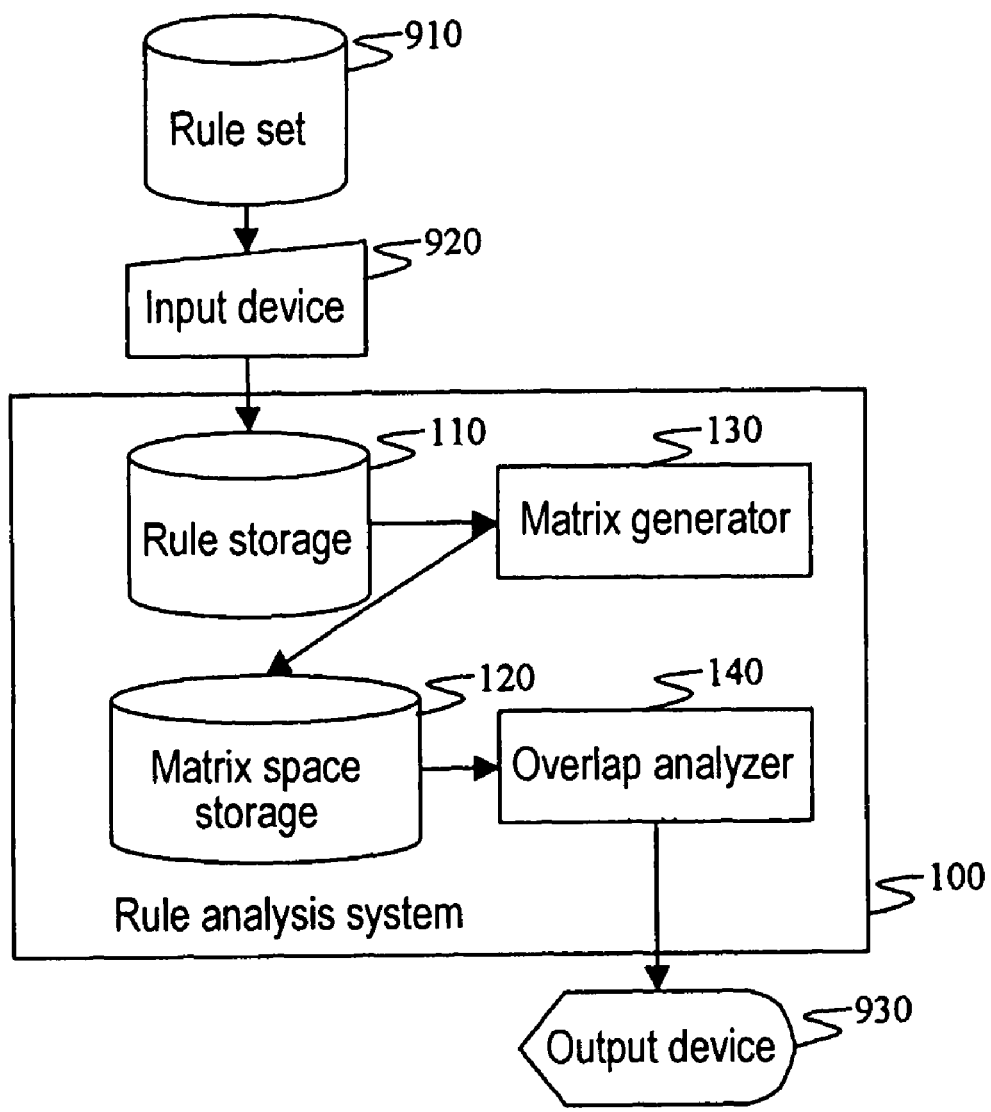
FIG. 1 is a block diagram showing the configuration of a filtering rule analysis system according to the first exemplary embodiment of the present invention.

The filtering rule analysis system according to the first exemplary embodiment of the present invention shown in FIG. 1 is provided with: rule analysis system 100, input device 920, and output device 930. Rule analysis system 100 is provided with: rule storage 110, matrix space storage 120, matrix generator 130, and overlap analyzer 140.

Input device 920 applies as input to rule analysis system 100 rule set 910 in which a set of any filtering rules is represented by description of a unique format. In this case, the description of a unique format may be description of a shared format that does not depend on the various network devices and not description that depends on a specific network device such as a specific firewall or a specific router. The description of a unique format may be description that adopts, as a description format for integrated use, a description format of the rules in a specific network device and that is represented in that format. In the following explanation, a case is described by way of example in which rule set 910 is described by a shared format that does not depend on the various network devices.

Rule analysis system 100 is provided with: rule storage 110, matrix space storage 120, matrix generator 130, and overlap analyzer 140. Rule storage 110 stores filtering rule sets that have been applied as input by input device 920, i.e., rule sets described by a unique format. Matrix space storage 120 stores rules as multidimensional matrix spatial data. Matrix spatial data will be described hereinbelow. Matrix generator 130 converts rules described by the unique format to matrix spatial data and stores these data in matrix space storage 120. Overlap analyzer 140 refers to the matrix spatial data to analyze the overlap of rules.

Output device 930 supplies as output the results of analysis realized by rule analysis system 100.

Matrix generator 130 and overlap analyzer 140 are realized by, for example, a CPU (Central Processing Unit) or MPU (Micro Processing Unit) that operates in accordance with a program. In addition, the program is stored in a program storage device (not shown) that is provided in rule analysis system 100. Rule storage 110 and matrix space storage 120 are realized by, for example, a storage device. Output device 930 is realized by, for example, a display device. Input device 920 is realized by, for example, an interface with a rule conversion system (not shown) that converts rule sets that are described by, for example, a format that depends on various network devices to rule set 910 described by a format that does not depend on network devices and supplies the results as output.

The rule conversion system (not shown) here described is connected to various network devices and collects from various network devices rules that are described by a format that depends on the devices. The rule conversion system then stores knowledge relating to the description specifications of rules in the various security devices and the format information of the rules contained in rule set 910 and refers to these items of knowledge to generate rules of a unique format from the collected rules. The rule conversion system supplies the set of rules that has been thus generated as rule set 910. In addition, the subroutine by which the rule conversion system is caused to collect rules and the subroutine by which the rule conversion system is caused to generate rules of a unique format from the collected rules are prepared in advance for each of the various network devices.

Explanation next regards the rules contained in rule set 910 that input device 920 applies as input.

The filtering rules are typically IF-THEN rules made up from condition portions and action portions. Ranges that use sources (transmission sources) addresses, source ports, destination addresses, destination ports, and protocols, which are attributes of packets, are described as the conditions in the conditions portions (IF portions). For example, a condition such as "the range of the destination port is 0 to 80, and the range of the protocol is TCP" are described. The combination of attributes described as conditions is arbitrary, and packets that satisfy all of the ranges of the attributes described in the conditions become the objects of application of the rules that contain these condition portions.

When there is an attribute that is not described in the condition portion of the rules, the condition portion is assumed to indicate entire range for this attribute that is not described. For example, in the case of the above-described condition "the range of the destination port is 0 to 80, and the range of the protocol is TCP," the condition is assumed to indicate all ranges for attributes other than the destination port and protocol. In other words, under this condition, all packets for which the packet destination port is within the range of 0 to 80 and further, for which the protocol is TCP (Transmission Control Protocol) are taken as packets that match the condition. In other words, the ranges of attributes described in a rule as the condition of application of the rule are described as the condition for the application of the rule when determining whether a packet is to be permitted to pass or not, and if each of the attributes of a packet are within the range of each attribute that is described as the application condition of the rule, that rule can be applied when determining whether that packet is to be permitted to pass or not. The action portion (THEN portion) describes whether to permit or not permit the passage (referred to as "action") of a packet that has matched the condition portion.

A rule set of packet filtering rule is made up from rules of this type described in a sequence. An order (also referred to as "order of priority") is determined for each rule. Upon the arrival of a particular packet, a network device that carries out packet filtering compares the condition portions of the rules of a rule set with the attributes of the packet in order. When a rule is found that matches with the attributes of the packet, a process is carried out according to the action of the action portion of the rule. There is a default rule as a special rule. The default rule is a rule that is executed when a packet does not match any rules other than the default rule. In other words, the default rule is a rule having the widest condition portion that matches with any kind of packet and sometimes are not of the IF-THEN format. This is because, if the rule can be recognized to be the default rule, the IF portion is unnecessary. The default rule is typically arranged to come at the head or at the end of a sequence of a rule set. In the present exemplary embodiment, the default rule is assumed to come at the end of the sequence. In addition, even if the previously described rule conversion system (not shown) is assumed to convert the rule sets collected from network devices to rule set 910 that is described by a unique format, the rules included in rule set 910 are assumed to maintain the original order of the rules in network device.

Explanation next regards the operation of the filtering rule analysis system shown in FIG. 1. Input device 920 applies rule set 910 as input to rule analysis system 100 and causes the rule set to be stored in rule storage 110. In the interest of simplifying the explanation, a case is here assumed in which a rule set of a single network device and that is expressed by description of a unique format that does not depend on devices is applied as input and stored in rule storage 110. In addition, input device 920 may convert the description format of the set of rules to facilitate handling by a computer (more specifically, by rule analysis system 100).

Matrix generator 130 in rule analysis system 100 creates a five-dimensional space that takes as axes each of the five types of attributes used in the condition portion of rules, i.e., source address, source port, destination address, destination port, and protocol. Matrix generator 130 creates minimum regions that are realized by the intersection of the starting points and end points of the ranges of the attributes of each rule when each rule is arranged in this five-dimensional space. These minimum regions are referred to as matrices. Matrix generator 130 further creates matrix spatial data in which the relation between each rule and matrix and the relation between each matrix and rule are expressed. This case assumes a five-dimensional space using the five attributes typically used, i.e., the source address, the source port, the destination address, the destination port, and the protocol, but the number of attributes is not limited to five, and may be any number. In the case of a five-dimensional space, a particular rule represents a particular five-dimensional region in this five-dimensional space.

Figure 2:
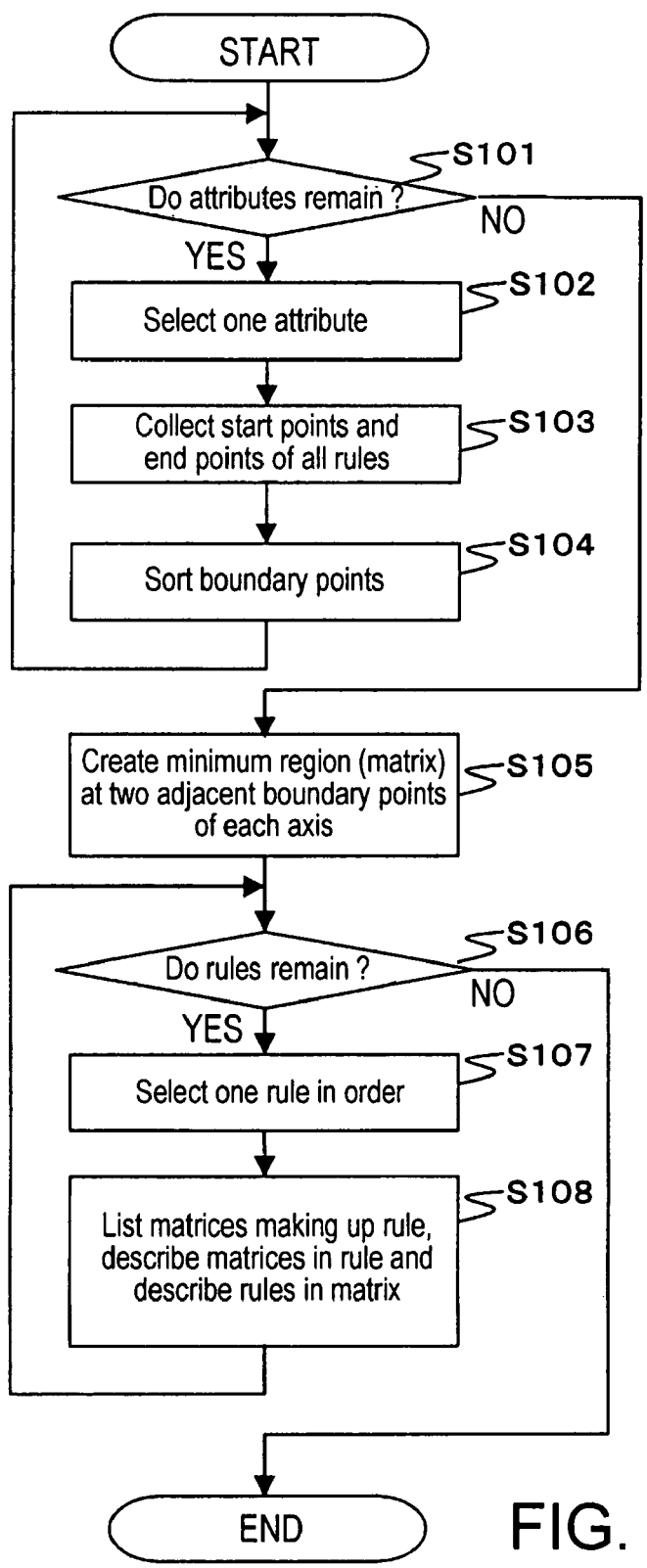
FIG. 2 is a flow chart showing an example of the matrix spatial data creation process realized by a matrix generator.

FIG. 2 is a flow chart showing an example of matrix spatial data creation process realized by matrix generator 130. In the flow chart shown in FIG. 2 and subsequent figures, the expression "remaining" means "of the elements contained in a particular set of elements, elements remain to which a check has not been appended indicting that the element has been selected." In this case, a check is information indicating that an element has been selected. In the various flow charts shown in FIG. 2 and subsequent figures, the expression "select one" means that "when one element of the elements contained in a set is selected, a check is simultaneously appended to that element." When it is determined, in a process for determining whether any elements remain, that an element remains, the process of selecting one of the remaining elements continues.

In Step S101, matrix generator 130 determines whether any attributes (for example, the five types of attributes) that are used in the condition portion of a rule remain. If any attributes remain, matrix generator 130 selects one attribute from among these attributes in Step S102 and then collects the starting point and end point relating to the attribute selected in Step S102 from the condition portions of all rules stored in rule storage 110 in Step S103. In this case, the general term for the starting point and end point is boundary point. In Step S104, matrix generator 130 next sorts the boundary points that were collected in Step S103. If there are redundant boundary points in the collected boundary points, i.e., boundary points that have the same values, matrix generator 130 carries out the sorting process by keeping only one of the boundary points that have the same values and deleting the other boundary points having the same values. After Step S104, the process moves to Step S101 again. Matrix generator 130 carries out the series of processes of Steps S102 to S104 for all attributes. Upon completion of sorting of boundary points for all attributes, no attributes remain in Step S101, and the process therefore moves on to Step S105.

In Step S105, matrix generator 130 creates information (matrix data) of the minimum regions that are produced at the two adjacent boundary points of all attributes (each axis). In the case of a five-dimensional space having axes corresponding to each of five types of attributes, these minimum regions result in five-dimensional regions. A minimum region produced by two adjacent boundary points on each axis is referred to as a matrix, as previously described. Matrix generator 130 creates matrix information, i.e., matrix data, by describing attribute ranges, i.e., pairs of adjacent boundary points, for each attribute.

After Step S105, matrix generator 130 carries out the processes of the following Steps S106 to S108 in order for all rules recorded in rule storage 110.

Matrix generator 130 first determines whether a rule remains in Step S106. If a rule remains, matrix generator 130 then selects one rule in accordance with the order from among the remaining rules in Step S107, and in Step S108, lists the matrices that make up the rule selected in Step S107 and places these matrices in correspondence with the rule selected in Step S107. Because the range of each attribute and the action are described in each rule, only a list of the matrix names need be added to the description in Step S108. Description of this type is referred to as rule data. The matrices that make up a rule are the matrices contained in the range of the attributes indicated by the condition portion of a rule. In Step S108, matrix generator 130 further places each of the matrices that make up the rule selected in Step S107 in correspondence with that rule. Since the range of each attribute is described in the matrix data, similar to each rule, only the rule name need be added to the matrix data.

After Step S108, the process again moves to Step S106, whereby matrix generator 130 carries out the series of processes of Steps S107 to S108 for all rules as previously described, this series of processes being carried out in accordance with the order of each of the rules in the rule set stored in rule storage 110. Accordingly, when two or more rules are added to a single matrix (matrix data), the rule names added to the matrix data keep the order of the rules. For example, it is assumed that the order of rules in a rule set is {R1, R2, R3, R4} and that R2 and R4 are placed in correspondence with a particular matrix. In this case, the list of rule names is added in the order of {R2, R4} to the matrix data of this matrix, and the order {R4, R2} does not occur. Completion of the processes of Steps S107 and S108 for all rules results in a state in which no rules remain in Step S106, and the matrix spatial data creation process therefore ends in this case.

Matrix generator 130 stores the rule data (i.e., rule data to which matrix names have been added) and matrix data (i.e., rule data to which rule names have been added) that have been created by the matrix spatial data creation process shown in FIG. 2 in matrix space storage 120. The entire set of rule data and matrix data is referred to as "matrix spatial data" as a general term.

Figure 3:
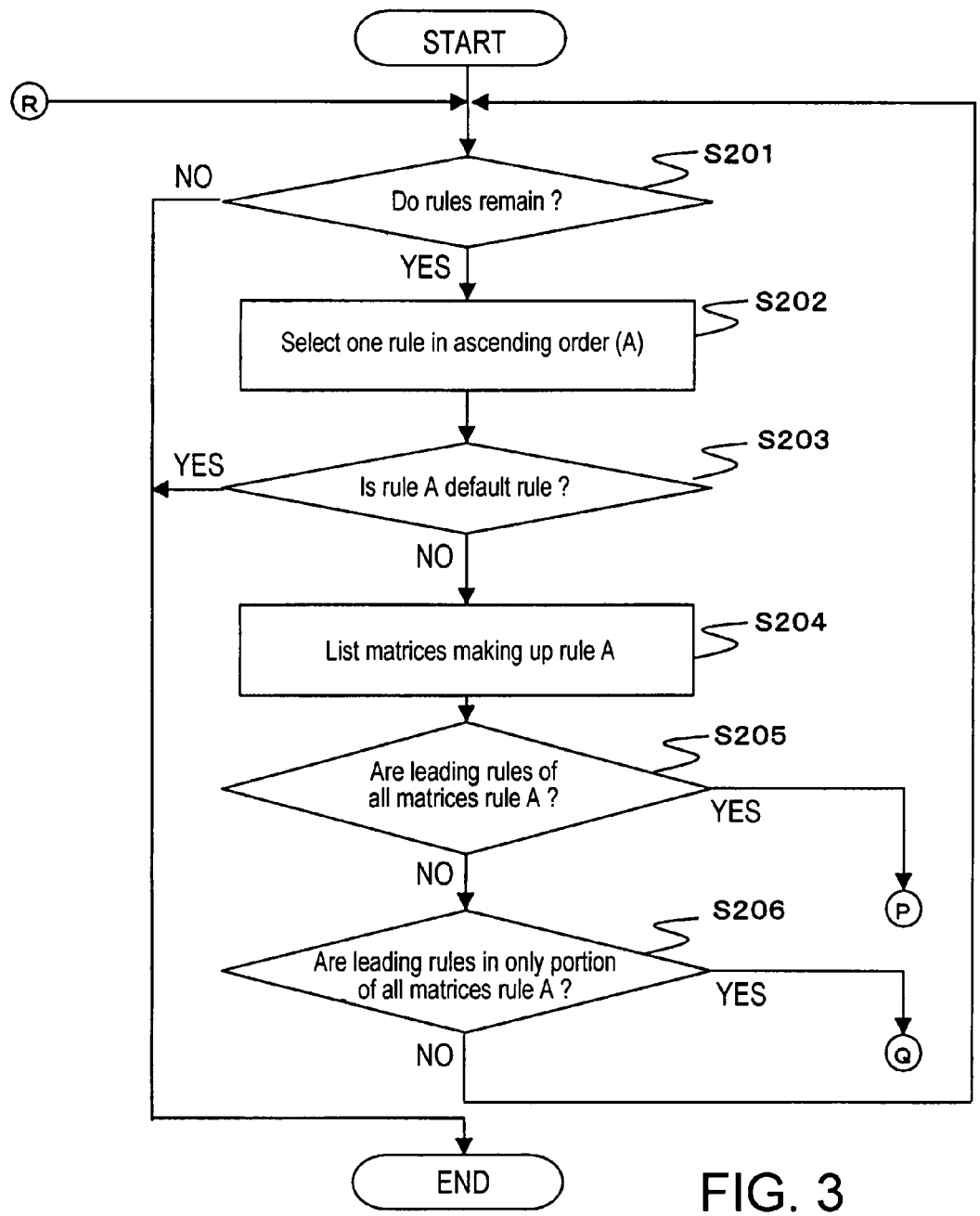
FIG. 3 is a flow chart showing an example of the process realized by the overlap analyzer.
Figures 4, 5:
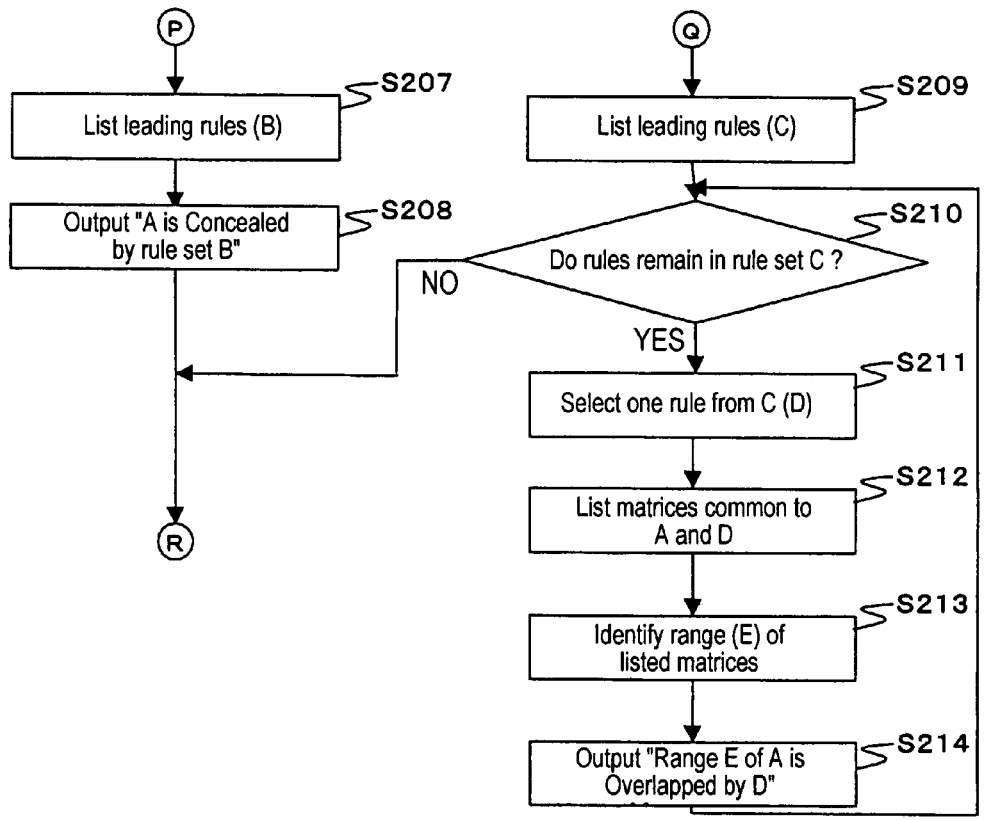
FIG. 4 is a flow chart showing an example of the process realized by the overlap analyzer.
FIG. 5 shows an example of a rule set.

After matrix generator 130 has stored the matrix spatial data in matrix space storage 120, overlap analyzer 140 refers to the matrix spatial data stored in matrix space storage 120, discovers overlap between rules, and uses output device 930 to supply these results as output. FIGS. 3 and 4 are flow charts showing an example of the process realized by overlap analyzer 140. Overlap analyzer 140 carries out the processing of Step S202 and succeeding steps for all rules, and when processing is completed for all rules and a state achieved in which no rules remain, ends processing. Explanation next regards the details of the processing in overlap analyzer 140.

In Step S201, overlap analyzer 140 first determines whether rules remain for which the processes of Step S202 and succeeding steps have not been carried out. If such rules remain, overlap analyzer 140 selects one rule in ascending order from rules (rule data) that are stored in matrix space storage 120. The "ascending order" means according to the order of rules that has been determined in advance. The rule selected in Step S202 is assumed to be rule A. Overlap analyzer 140 determines whether rule A is the default rule or not in Step S203 and ends the process if rule A is the default rule. In the present exemplary embodiment, the order of the default rule is at the end of the rules contained in a rule set. Accordingly, upon selection of the last rule in Step S202, the process branches toward "YES" in Step S203 and the process ends. It is therefore impossible for the process to branch towards "NO" in Step S201, and the process of Step S201 therefore does not actually need to be carried out.

If rule A is not the default rule in Step S203, overlap analyzer 140 lists the matrices that make up rule A in Step S204. The matrices that make up rule A are described as a list in the rule data of rule A, and overlap analyzer 140 should refer to the rule data in Step S204. In Step S205, overlap analyzer 140 next examines the list of rules that has been added to the matrix data of the matrices that make up rule A and determines whether the leading rule is other than rule A in all matrix data of matrices that make up rule A. If the leading rule is other than rule A in any of all matrix data of matrices that make up rule A, the process moves to Step S207. In Step S205, if there is even one item of matrix data in which the leading rule is rule A, the process moves to Step S206. In Step S206, overlap analyzer 140 determines whether rule A is the leading rule in only a portion of all matrix data of matrices that make up rule A or rule A is the leading rule in all matrix data of matrices that make up rule A. If rule A is the leading rule in only a portion of all matrix data of matrices that make up rule A, the process moves to Step S209. If rule A is the leading rule in all matrix data of matrices that make up rule A, the process moves to Step S201, and the above-described process is repeated.

If the process branches toward "YES" in Step S205, i.e., if the leading rule is other than rule A in any of all matrix data of matrices that make up rule A, overlap analyzer 140 lists the leading rules other than this rule A in Step S207 of FIG. 4. The set of rules that are listed in Step S207 will be taken as "rule set B." B is a set of one or more rules. After Step S207, overlap analyzer 140 uses output device 930 to supply the message "rule A is concealed by rule set B" in Step S208. "Concealed" means that a particular rule is in a completely hidden state due to another rule (this rule not being limited to a single rule) having a higher order of priority than the particular rule. In other words, "concealed" means that a particular rule is completely concealed by another rule having an order of priority higher than that of the rule in question, and regardless of the type of packet that is sent in, the other rule having the higher order of priority is activated (applied) and the concealed rule itself is not activated (applied). After output of the analysis result that "rule A is concealed by rule set B" in Step S208, the process moves to Step S201 and the processes following Step S201 are repeated.

When the process branches toward "YES" in Step S206, i.e., when rule A is the leading rule in only a portion of all matrix data of matrices that make up rule A, overlap analyzer 140 lists the leading rules other than this rule A in Step S209 of FIG. 4. The set of rules that are listed in Step S209 is taken as "rule set C." Overlap analyzer 140 next determines in Step S210 whether any rules remain for which the processes of Step S211 and succeeding steps have not been carried out among the rules contained in rule set C. If such rules do not remain in rule set C, the process moves to Step S201, and the processes of Step S201 and succeeding steps are repeated. On the other hand, if such rules remain in rule set C in Step S210, overlap analyzer 140 selects one rule from among the remaining rules in Step S211. The rule selected in Step S211 is taken as rule D. Overlap analyzer 140 then collects matrices common to rule A and rule D in Step S212. Rule D is a rule having an order of priority ahead of rule A, and overlap analyzer 140 therefore should list, of the matrices that make up rule A, those matrices that have been listed by rule D ahead of rule A in the matrix data.

In Step S213, overlap analyzer 140 next identifies a region that is formed by matrices collected in Step S212. This region is taken as "region E." The matrices collected in Step S212 are not matrices that take rule D as the leading rule because the potential exists that a rule having a higher order than rule D is within rule D. After region E has been identified in Step S213, overlap analyzer 140 uses output device 930 to supply the message "the range (region) E of rule A is overlapped by rule D" in Step S214. "Overlapped" means that a portion of the region of a particular rule is in a concealed state due to another rule or rules having a higher order of priority than the rule in question. In Step S214, the analysis results that "region E of rule A is overlapped by rule D" are supplied as output, following which the process transitions to Step S201 and the processes of Step S201 and succeeding steps are repeated.

Output device 930 performs the output of analysis results according to overlap analyzer 140 in Step S208 or Step S214 as described above. No particular limitations apply to the output mode of the analysis results. For example, output device 930 may be realized by a display device and the analysis results may be supplied as display. Alternatively, output device 930 may be realized by a CPU and the analysis results supplied as a file.

In addition, the procedures in matrix generator 130 shown in FIG. 2 and the procedures of overlap analyzer 140 shown in FIGS. 3 and 4 show only examples of the procedures. The procedures in matrix generator 130 and the procedures in overlap analyzer 140 are not limited to the procedures shown in these figures, and results similar to those described above may be obtained by other procedures.

Explanation next regards the operation in the first exemplary embodiment using a specific example.

As previously described, the filtering rules contained in rule set 910 (refer to FIG. 1) may not be description that depends on a specific network device (such as a specific firewall or specific router), but may be description by a shared format that does not depend on the various network devices. The above-described policy language SCCML is one example of this type of shared format. Alternatively, the description format of rules in a specific network device may be adopted as a uniformly used description format and the filtering rules may be described by this format. In either case, conversion is possible from a description format that depends on a network device to each of the filtering rules contained in rule set 910 by means of a simple one-to-one grammar conversion. Each of the rules contained in rule set 910 is assumed to maintain the original order of the rules in the network device. However, whether the original order of the default rule in a network device is at the beginning or at the end, the order of the default rule in rule set 910 is assumed to be at the end. The condition portion of the default rule is assumed to indicate the maximum regions (maximum ranges) of all attributes.

Input device 920 applies rule set 910 as input to rule analysis system 100 and causes the storage of the set of rules in rule storage 110. As previously explained, input device 920 may convert the description format of the rule set that is applied as input to facilitate handling by a computer (more specifically, rule analysis system 100). In the present example, input device 920 converts the set of rules applied as input to a set of rules represented by the data structure shown in FIG. 5 and causes this rule set to be stored in rule storage 110. However, the data structure shown in FIG. 5 is only an example, and conversion to a set of rules represented by another data structure is also possible.

Explanation next regards the format of the rule description, i.e., the data structure of rules, shown as an example in FIG. 5. FIG. 5 shows a rule set composed of eight rules (R1 to R8). Each of the rules describes the starting point of the first attribute, the end point of the first attribute, the starting point of the second attribute, the end point of the second attribute, and so on up to the starting point of the n-th attribute and the end point of the n-th attribute, and at the end describes the action. In the example shown in FIG. 5, however, the starting points and end points of the third and following attributes are noted as "omitted." For rule 1 (R1), for example, the starting point and end point of the first attribute are 3 and 5, respectively, and similarly, the starting point and end point of the second attribute are 5 and 7, respectively. This means that in R1, the action D is to be executed when the first attribute is within the range of 3 to 5 and the second attribute is within the range of 5 to 7. D as described in the rules is an abbreviation for "Deny" and indicates the action of not permitting passage. A as described in the rules is an abbreviation for "Allow" and indicates the action of permitting passage.

Of the attributes which are indicated in the condition portion of an actual filtering rule, the source address and destination address are represented by IP (Internet Protocol) addresses, Accordingly, the source addresses and destination addresses are represented within the range: 0.0.0.0 to 255.255.255.255, i.e., as starting points and end points in IP address space. The ranges of the source ports and destination ports are represented by the starting points and end points within the range of 0 to 65535. Protocol is represented by the ranges of "only TCP," "only UDP (User Datagram Protocol)," or "TCP and UDP." In the interest of simplification, explanation is here presented with the ranges of all attributes represented as the integer ranges 0 to m. Although the expression of IP address space or protocol may differ in filtering rules, these expressions are represented as one-dimensional line segments (or points) having a total order similar to that of ports, and as a result, this explanation can be easily applied to IP address space or protocol even in an explanation in which these expressions are represented by the above-described integer ranges of 0 to m. For example, if TCP is represented by "0" and UDP by "1," "only TCP" can be represented by making the starting point and end point 0, and the range "TCP and UDP" can be represented by making the starting point 0 and the end point 1.

As described hereinabove, data that describe rules are rule data, and the data shown in FIG. 5 corresponds to rule data. In the rule data shown in FIG. 5, the third attribute and following attributes in which "omitted" is noted are assumed to lack starting points and end points, and representing the two attributes (the first attribute and second attribute) of the rule data shown in FIG. 5 by two-dimensional space results in the state shown in FIG. 6. In FIG. 6, the X-axis (horizontal axis) corresponds to the first attribute and the Y-axis (vertical axis) corresponds to the second attribute. The ranges that are determined by the first attribute and the second attribute in the condition portion of each rule are represented by rectangles. When the action of a rule is A meaning "allow passage," this rectangle is shown white, and when the action is D meaning "deny passage," the rectangle is shown with a pattern, more specifically with a pattern produced by inscribing a multiplicity of dots. In FIG. 6, rectangles for rules of a low order of priority are depicted in a lower layer, and rectangles for rules of higher orders of priority are shown in correspondingly higher layers that overlap other layers. In FIG. 6, ranges determined by two attributes are represented two-dimensionally, and when there are five attributes indicating the condition portion of a rule, the range is represented as five-dimensional space.

Matrix generator 130 refers to the rule data stored by rule storage 110, creates matrix spatial data, and records the matrix spatial data in matrix space storage 120. Explanation next regards a concrete example of the process realized by matrix generator 130 using FIG. 2 and FIGS. 5 to 10. In the case of the rule data shown in FIG. 5, n attributes exist up to the n-th attribute including the portions noted as "omitted," but the following explanation uses the first two attributes. Regardless of the number of attributes, the same processes need only be repeated.

Upon first transitioning to Step S101 (refer to FIG. 2), matrix generator 130 moves to Step S102 because two attributes remain and selects the first attribute. Next, in Step S103, matrix generator 130 collects the starting points and end points of the selected first attribute from all rules R1 to R8 (see FIG. 5). In the case of the rule data shown in FIG. 5, matrix generator 130 collects each of: 3 and 5 from R1; 2 and 8 from R2; 11 and 13 from R3; 5 and 9 from R4; 1 and 7 from R5; 10 and 14 from R6; 4 and 7 from R7; and 0 and 15 from R8. In the next Step S104, matrix generator 130 deletes duplicate boundary points among these boundary points and then sorts the boundary points. As a result, the values 0, 1, 2, 3, 4, 5, 7, 8, 9, 10, 11, 13, 14, and 15 are obtained for the first attribute. Matrix generator 130 carries out the same processes (Steps S101 to S104) for the second attribute, whereby the values 0, 1, 3, 4, 5, 7, 8, 10, 11, 12, and 13 are obtained for the second attribute. Upon completion of processing for the second attribute, the process moves to Step S101, but because other attributes no longer remain, the process proceeds to Step S105.

In Step S105, matrix generator 130 creates minimum regions (matrices) determined by the ranges between two adjacent boundary points of a particular attribute and the ranges between two adjacent boundary points of another attribute. Matrix generator 130 changes the two adjacent boundary points in each attribute to create all matrices that can be created. For example, when boundary points are obtained for each axis (each attribute) as shown in FIG. 6, matrix generator 130 creates 130 matrices as shown in FIG. 7.

FIG. 8 shows an example of the description format of the data of matrices. In this example, matrices exist from the first to the 130$^{th}$ matrix, these matrices being M001 to M130. Each of these matrices is represented by description that lists pairs of the starting point and end point of each attribute as with rule data. For example, matrix M001 is the region in which the first attribute is in the range of 0 to 1 and the second attribute is in the range of 0 to 1. In the example shown in FIG. 8, the third and succeeding attributes are omitted. As previously described, data that describe a matrix are referred to as "matrix data," and the data shown in FIG. 8 correspond to matrix data.

Matrix generator 130 next carries out the processes of Steps S106 to S108 in order for all rule data that are stored in rule storage 110. Upon first transitioning to Step S106, all rules remain and matrix generator 130 therefore moves on to Step S107. Upon first transitioning to Step S107, matrix generator 130 selects the first rule R1. Matrix generator 130 then moves on to Step S108 and lists the matrices that make up that rule R1. As clear from FIG. 7, R1 is made up from the two matrices M056 and M057. M056 is the third matrix from M053, and M057 is the matrix next to M056 shown in FIG. 7. As shown by the underlined portions of the first line in FIG. 9, matrix generator 130 adds these matrices M056 and M057 to the end of the rule data of R1. Matrix generator 130 further adds the selected rule (R1 in this case) to the end of the matrix data of these two matrices M056 and M057. For example, regarding the matrix data of M056, matrix generator 130 adds "R1" to M056=(3, 4, 5, 7, omitted) to produce M056=(3, 4, 5, 7, omitted, R1). The same is true for the matrix data of M057.

Upon completion of the process of Step S108, the process returns to Step S106, and the same processes are carried out for all of the remaining rules. As a result, a list of matrices is added to the rule data as shown in FIG. 9 and a list of rules is added to the matrix data as shown in FIG. 10. As previously explained, the entire set of rule data and matrix data is referred to as "matrix spatial data." Matrix generator 130 records the matrix spatial data in matrix space storage 120 and ends the process.

After Step S105 in the flow chart shown in FIG. 2, rules are selected one at a time in ascending order, i.e., in the order of the rules and the list of the matrices that make up the rule is added to the rule data. However, because the default rule is made from all matrices, only data that indicate formation from all matrices need be added to the rule data of the default rule. In the example shown in FIG. 9, the data "ALL" is added as the data that indicates formation from all matrices. Matrix generator 130 may also unconditionally add the default rule to the end of the rules that are placed in correspondence with matrix data.

Explanation next regards a concrete example of the process realized by overlap analyzer 140 using FIGS. 3 to 4 and FIGS. 11 to 13. Overlap analysis is the examination for overlap of condition portions between two rules. In packet filtering, rules are examined in order beginning from highest order of priority, and when a rule (condition portion) is found in which the attributes of a particular packet match, operation is carried out in accordance with the action described in the action portion of the rule. As a result, collation with the attributes of the above-described packet is not carried out for rules having a lower order of priority than this rule. In other words, when there are two rules having a condition portion that matches with the same packet attribute, the rule having the lower order of priority has no significance in the filtering process. In the overlap analysis, such a rule is detected.

Overlap analyzer 140 examines the rule data of matrix spatial data stored in matrix space storage 120 in order from highest order of priority. Rule data of the matrix spatial data created based on the rule set shown in FIG. 5 is as shown in FIG. 9. When the process first transitions to Step S201, all rule data remain, and the process therefore proceeds to Step S202. When first transitioning to Step S202, overlap analyzer 140 selects rule R1. The rule selected in Step S202 is assumed to be rule A, and rule R1 is therefore assumed to be rule A.

In Step S203, overlap analyzer 140 next examines whether rule A is the default rule or not. In the rule data shown in FIG. 9, the default rule is R8, and the process therefore now branches toward "NO" and transitions to Step S204. In Step S204, overlap analyzer 140 lists the matrices that make up rule A. The matrices that make up rule A can be immediately determined by referring to the portion following the action portion of the rule data. In this case, matrices M056 and M057 are listed.

In Step S205, overlap analyzer 140 next examines the leading rules of the listed matrices and determines whether the leading rules are all other than rule A. The listed matrices are M056 and M057, and overlap analyzer 140 examines the list of rules that are placed in correspondence with these matrices. For example, referring to the matrix data of FIG. 10, the list of rules that are placed in correspondence with matrix M056 are found to be R1, R2, and R8 (see the underlined portion of the eleventh row of FIG. 10). The leading rule that has been placed in correspondence with this matrix is R1. Similarly, the leading rule of the rules placed in correspondence with M057 is also R1. In other words, the leading rules of the rules placed in correspondence with matrices 056 and 057 are all R1 (rule A), and the process therefore branches toward "NO" in Step S205 and transitions to Step S206. Although the leading rules of both M056 and M057 have been examined for the sake of explanation, in actuality, the finding that the leading rule is rule A in the examination of M056 eliminates the possibility that all leading rules will be rules other than rule A, whereby there is no need to examine M057.

In Step S206 as well, overlap analyzer 140 examines the leading rule similar to Step S205, and if, of the matrix data of the matrices that make up rule A, even one leading rule is other than rule A, the process moves to Step S209. When the selected rule is R1, the leading rule is rule A in all of matrices M056 and M0557 in the determination in Step S206, and the process therefore branches toward "NO" in Step S206 and returns to Step S201. Although the leading rules were again checked for both M056 and M057 for the sake of explanation, in actuality, there is no need to again perform an examination regarding the matrices that were examined in Step S205. In the flow chart shown in FIG. 3, the determination of Step S206 was carried out after the determination of Step S205, but the determination process of Step S205 and the determination process of Step S206 may be carried out simultaneously by using, for example, flags.

When the process is completed for the first rule (R1), overlap analyzer 140 carries out a similar process regarding the next rule. In the example shown in FIG. 9, the process for R1 is completed and rules R2 to R8 remain, and overlap analyzer 140 therefore determines that rules remain in Step S201 and proceeds to Step S202. In Step S202, overlap analyzer 140 selects rule R2 and takes rule R2 as rule A. R2 is not the default rule, and the process therefore branches toward "NO" in Step S203 and moves on to Step S204. In Step S204, overlap analyzer 140 lists the matrices that make up rule A (in this case, R2). Referring to FIG. 9, the matrices that make up rule A are the thirty matrices M042, M043, M044, omitted, M110, M111. In Step S205, overlap analyzer 140 next examines the leading rules of the above-described thirty matrices. For example, the leading rule of M042 is R2, and the leading rule of M056 is R1. When the leading rules are not all A in Step S205, the determination "YES" is realized, whereby the process branches toward "NO" when A is R2 and the process moves to Step S206. In Step S206, the leading rules of matrices M056 and M057 are R1, whereby the leading rule of two matrices among the thirty matrices is other than rule A. As a result, the process branches toward "YES" in Step S206 and the process moves on to Step S209.

In Step S209, overlap analyzer 140 lists leading rules other than rule A among the leading rules in the thirty matrices. When the rule selected in Step S202 is R2, R1 is the rule for which the leading rule is not R2 (=A). The set of rules listed in Step S209 is next assumed to be C. Only R1 is contained in rule set C in this example, but a plurality of rules may be contained in rule set C. Overlap analyzer 140 next subjects all rules contained in rule set C to the processes of the following Steps S210 to S214. In this example, C={R1} applies, and because only rule R1 is contained in rule set C, the series of processes of Steps S210 to S214 is carried out only once for R1. When the process again moves to Step S210 after Step S214, a state is realized in which no rules remain in rule set C, whereby the process moves on to Step S201.

The processes of Steps S210 to S214 performed for rule R1 contained in rule set C are as next described.

Overlap analyzer 140 first determines that rule R1 remains in rule set C in Step S210 and then selects one rule from rule set C in Step S211. The rule selected in Step S211 is assumed to be rule D. In this example, rule R1 is rule D. Overlap analyzer 140 next collects matrices common to rule A (R2 in this case) and rule D (R1 in this case) in Step S212. Of the thirty matrices that make up rule R2, matrices in which rule R1 is in the rule list in the matrix data are the matrices common to rule A and rule D. In this example, the two matrices M056 and M057 are the matrices common to rule A and rule D. Overlap analyzer 140 identifies the ranges of the regions that are made up of the matrices collected in Step S212. This range is assumed to be E. According to the matrix data, the region of M056 is (3, 4, 5, 7, omitted), and the region of M057 is (4, 5, 5, 7, omitted). Overlap analyzer 140 identifies that range E of the region made up from these two matrices is E=(3, 5, 5, 7, omitted). Overlap analyzer 140 next uses output device 930 to supply the analysis result that "range E of rule A (R2 in this case) is overlapped by rule D (R1 in this case)" in Step S214, and then moves on to Step S210. As previously explained, since only R1 is contained in rule set C, the determination result of Step S210 is "NO" and the process moves to Step S201.

When it is determined in Step S201 that there are rules that have not been selected, the process moves to Step S202, and overlap analyzer 140 selects one rule according to the order. When the rule selected in Step S202 is R3 or R4, the determination results are "NO" in both Steps S205 and S206, and the process therefore returns to Step S201. When the rule selected in Step S202 is R5 or R6, the determination result in Step S206 is "YES," and the processes of Step S209 and succeeding steps are therefore executed. As a result, the analysis result "range E of rule A is overlapped by rule D" is supplied as output, as with the case of selecting R2 in Step S203.

Explanation next regards a case in which the rule selected in Step S202 is R7. As shown in FIG. 6, rule R7 is a rule that is concealed by rule R2. When rule A is rule R7, the process moves to Step S204 after Step S203. In Step S204, overlap analyzer 140 lists the matrices that make up rule A (R7 in this case). The matrices that make up rule A are the four matrices M083, M084, M096, and M097. Overlap analyzer 140 examines the leading rules of these four matrices in Step S205. The leading rule of these four matrices is R2 in every case and thus differs from rule A (i.e., R7) in every case. Accordingly, the process branches to "YES" in Step S205 and thus moves on to Step S207. In Step S207, overlap analyzer 140 lists the leading rules of all matrices that make up rule A. This set of rules is B. When rule A is R7, the leading rule of matrices that make up rule A is R2 in every case. Accordingly, only rule R2 is contained in rule set B, and B={R2}. In Step S208, overlap analyzer 140 next uses output device 930 to supply as output the analysis results "rule A is concealed by rule set B."

The process next moves by way of Step S201 to Step S202, and in Step S202, overlap analyzer 140 selects the last remaining R8. R8 is the default rule, and the process therefore branches toward "YES in Step S203, whereby the process ends.

In the flow chart shown in FIG. 3 and FIG. 4, rules are selected in an ascending order and analysis is carried out to determine whether there are other rule sets that completely conceal that rule or whether there are rule sets that conceal a portion of that rule. The leading rule has the highest order of priority and therefore cannot be completely or even partially concealed by other rules. Accordingly, when first proceeding to Step S202, the second rule may be selected without selecting a leading rule in Step S202, following which one rule may be selected in order in Step S202. In this case, processing relating to the leading rule may be dispensed with to achieve an acceleration of processing speed. The default rule, i.e., a rule that comes at the end, are necessarily partially or completely concealed, and processes of Step S204 and succeeding steps are therefore not carried out for the default rule. However, for the purpose of more detailed overlap analysis, the process of Step S204 may be carried out regarding the default rule and the analysis results regarding the default rule then supplied as output in Step S208 or Step S214. In this case, the determination process of Step S203 need not be carried out.

No particular limitations apply to the mode of output of the analysis results. For example, the analysis results may be supplied as display output, may be supplied as audio output, or may be supplied as a file. Alternatively, output device 930 may be provided in a separate system connected to rule analysis system 100 by way of a communication network, and the analysis results may be supplied to the other system. In this case, the analysis results can be reported to users of the other system that is connected by way of the communication network to rule analysis system 100. FIG. 11 shows an example of the display of analysis results when output device 930 is a display device and the analysis results are supplied as display output.

In the foregoing explanation, a case was described in which analysis results are sequentially supplied in Steps S208 and S214, but the analysis results may also be displayed together following the completion of the processes by overlap analyzer 140. In this case, overlap analyzer 140 may record analysis results such as "range E of rule A is overlapped by rule D" in a temporary storage device (not shown) in Steps S208 and S214. The analysis results that have been recorded in the temporary storage device may then be supplied together as output after completion of the processing realized by overlap analyzer 140, i.e., the processing shown in FIGS. 3 and 4.

Figures 12, 13:
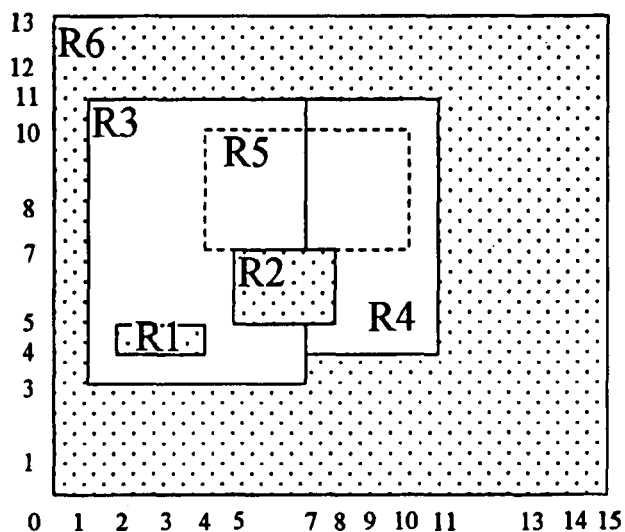
FIG. 12 is a schematic view in which each item of rule data is represented on a two-dimensional plane.
FIG. 13 is a view showing an example of the analysis results realized by the overlap analyzer.

FIG. 13 shows an example of the display of the analysis results when overlap analysis has been carried out for rule data that are schematically represented as shown in FIG. 12. In the example shown in FIG. 13, analysis results are displayed in greater detail, taking the form of, for example, "the region of (5, 7, 7, 10, omitted) is concealed by R3" instead of merely "R5 is concealed by R3 and R4." When supplying more detailed analysis results regarding a region that is concealed, the process of Step S207 should be carried out similarly to Steps S209 to S213.

Explanation next regards the advantages of the filtering rule analysis system of the first exemplary embodiment. This filtering rule analysis system enables full comprehension of the relation between rules regardless of the complexity of the filtering rules. This capability is realized because matrix generator 130 converts rules to matrix spatial data, and overlap analyzer 140, by exhaustively investigating matrices that make up any rule, analyzes the overlapping relation between rules, in particular, analyzes a relation in which a rule is completely concealed by another rule or a relation in which a rule is partially concealed by another rule. This system enables comprehension of the relations between each of the rules even in the case of filtering rules having a large number of attributes indicated in the condition portion. This capability is realized because rules can be converted to matrix spatial data regardless of the number of attributes and because the overlapping relation between rules is analyzed using matrices instead of analyzing by attributes.

Second Exemplary Embodiment

Figure 14:
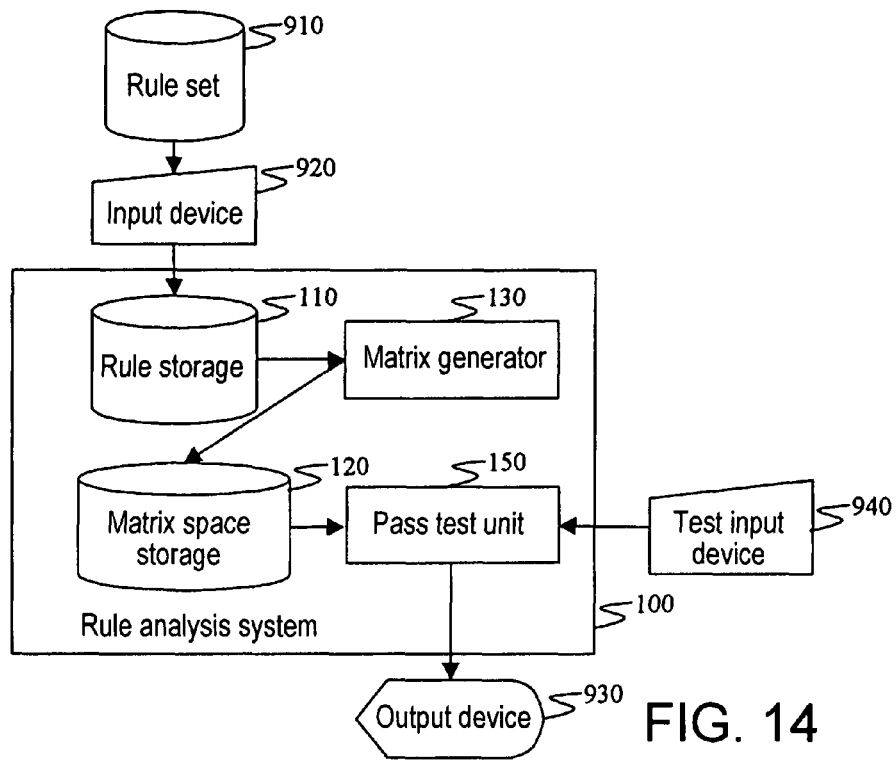
FIG. 14 is a block diagram showing the configuration of the filtering rule analysis system according to the second exemplary embodiment of the present invention.

Explanation next regards the filtering rule analysis system of the second exemplary embodiment of the present invention. In FIG. 14 that shows the filtering rule analysis system of the second exemplary embodiment, constituent elements that are identical to elements in the first exemplary embodiment are given the same reference numbers as in FIG. 1, and redundant explanation is omitted.

The filtering rule analysis system of the second exemplary embodiment is similar to the system shown in FIG. 1, but differs from the system shown in FIG. 1 in that pass test unit 150 is provided in rule analysis system 100 in place of the overlap analyzer. The filtering rule analysis system of the present exemplary embodiment is further provided with test input device 940.

Test input device 940 is provided for applying as input to rule analysis system 100 data for testing which types of packets are to be allowed to pass and which types of packets are to be denied passage, with rule set 910 as the entirety of rules. The data for testing are represented by the attributes of packets. Test input device 940 is realized by, for example, an input device such as a keyboard.

Based on matrix spatial data and data that are applied as input by test input device 940, pass test unit 150 tests what types of packets are to be allowed to pass and what types of packets are to be denied passage in a packet filtering process based on a rule set. Pass test unit 150 is realized by, for example, a CPU that operates in accordance with a program. The program is stored in, for example, a program storage (not shown) provided in rule analysis system 100. In the present exemplary embodiment, output device 930 supplies test results realized by pass test unit 150.

Explanation next regards the operation of the filtering rule analysis system of the second exemplary embodiment. Detailed explanation is omitted regarding operations that are similar to operations in the system of the first exemplary embodiment. Operations in input device 920 and matrix generator 130 up to the storage of matrix spatial data in matrix space storage 120 are equivalent to those of the first exemplary embodiment.

Users of rule analysis system 100 use test input device 940 to apply packets or ranges of packets as input to rule analysis system 100 with the purpose of testing which packets are passed by rule set 910. The packets or packet ranges that are applied as input in this case are not actual packets, but rather, the attributes of packets. Packets typically contain the payload, which is the content of packets, and in addition, the source address, source port, destination address, destination port, and protocol, which are the attributes of packets. Typically, only the attribute portion of packets is referred to and the payload portion is not referred to in packet filtering, and as a result, it is sufficient to supply only the attributes of packets for test data that are conferred to test input device 940.

Normally, the above-described packet attributes of packets that flow through the network all have a specific value. In other words, when five attributes are represented by five-dimensional space, the values are certain points. Test input device 940 applies these packet attributes as input to rule analysis system 100. Test input device 940 also applies the input to rule analysis system 100 regarding the packet attributes that are represented not as particular specific values but as particular ranges. When all or a portion of the attributes are represented as a particular range, displaying five attributes results in a region of equal to or fewer than five dimensions in five-dimensional space. For example, designating the range for only one particular attribute results in representation as a one-dimensional region (i.e., a line). Designating ranges for only two attributes results in representation as a two-dimensional region (i.e., a plane). Designating ranges for only three particular attributes results in representation as a three-dimensional region (i.e., a solid). Similarly, designating the ranges for only four or five attributes results in representation as a four-dimensional or five-dimensional region, respectively. In the following description, the attributes of packets that include the ranges of the packets are referred to as "test packets." Test input device 940 applies test packets as input to pass test unit 150.

Figure 15:
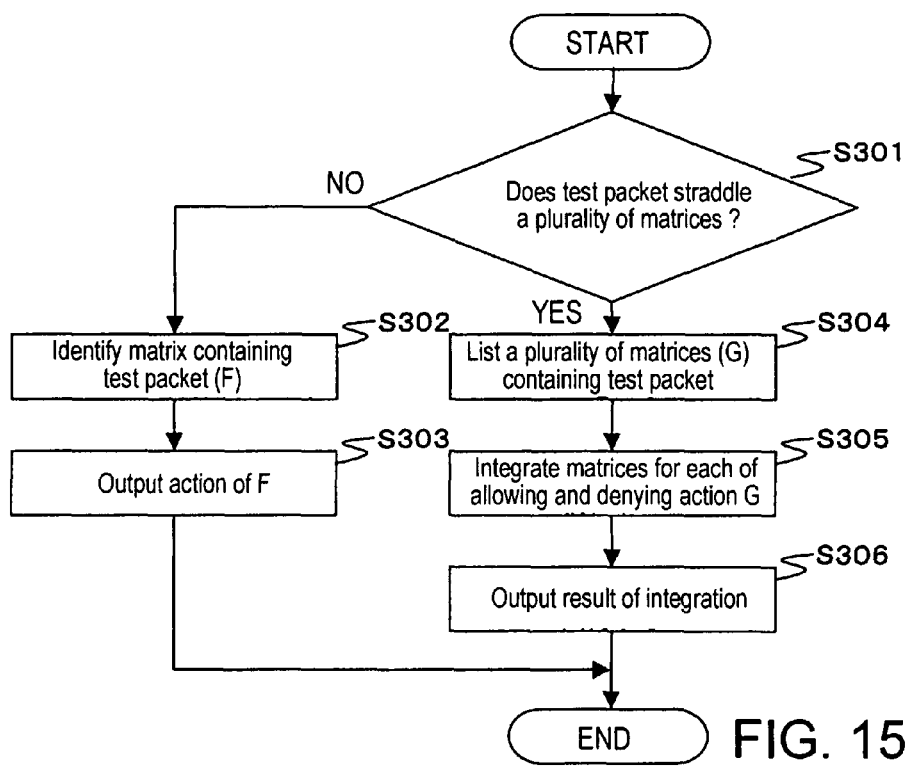
FIG. 15 is a flow chart showing an example of the testing process realized by the pass test unit.

Pass test unit 150 tests whether test packets that have been received as input are to be allowed to pass or denied passage by the rule set of rule set 910. FIG. 15 is a flow chart showing an example of the test process realized by this pass test unit 150. Upon input of a test packet by way of test input device 940, pass test unit 150 begins the test process.

In Step S301, pass test unit 150 first determines whether the region of the test packet, i.e., the region indicated by the attributes that have been received as a test packet, straddles a plurality of matrices of the matrix spatial data stored by matrix space storage 120. This determination process can be carried out as next described. Pass test unit 150 determines for each attribute whether the starting point and end point that designate the range of the attribute of a test packet fall between adjacent boundary points of the boundary points determined in Step S104 (see FIG. 2). In this case, the starting point and end point are determined as falling between adjacent boundary points even when the starting point and end point match adjacent boundary points. If the starting points and end points that designate the ranges of the attributes of a test packet fall between adjacent boundary points for all attributes, the region of the test packet are determined to fall within the region of one matrix. If the starting point and end point that designate the range of an attribute of the test packet do not fall between adjacent boundary points in any attribute, the region of the test packet is determined to straddle a plurality of matrices.

When the region of a test packet falls within the region of one particular matrix in Step S301, the process transitions to Step S302, and when the region of a test packet straddles a plurality of matrices, the process transitions to Step S304.

In Step S302, pass test unit 150 identifies the matrix that contains the test packet. The matrix identified in Step S302 is assumed to be F. Pass test unit 150 next refers to the matrix data of matrix F to identify the leading rule in the matrix data, and in Step S303, further refers to the action in the rule data of the leading rule to supply the content indicated by the action from output device 930 and thus completes processing.

In Step S304, pass test unit 150 lists up the plurality of matrices that contain the test packet, i.e., the plurality of matrices that the region of the test packet straddles. This set of matrices is identified as G. Pass test unit 150 identifies the action for each matrix contained in set G. The operation of identifying these actions may be carried out similarly to Step S303. In other words, pass test unit 150 may refer to the matrix data for each matrix contained in set G to identify the leading rules in these matrix data and then refer to the actions in the rule data of these leading rules. Pass test unit 150, having identified the actions for each matrix, classifies the matrices contained in set G for each action, and in Step S305, integrates the matrices classified by the same action and finds the regions of overlap between the integrated regions and the test packet region. The process of integrating matrices to find the regions of overlap with the test packet is also carried out for each action. In Step S306, pass test unit 150 then supplies the overlap regions that have been found for each action from output device 930 and ends the process.

In the present exemplary embodiment, no particular limitations apply to the mode of output in Steps S303 and S306. For example, display output may be effected on output device 930 realized by a display device, or output may be realized as a file.

The procedure of pass test unit 150 shown in FIG. 15 is only one example, and other procedures can be adopted to obtain the same results.

Explanation next regards the operations in the filtering rule analysis system of the second exemplary embodiment using a concrete example. In this case, rule set 910 is assumed to be a set of rules that is the object of examination as an entirety of rules to find which packets are allowed to pass and which packets are denied passage. The operations up to the application of rule set 910 as input to rule analysis system 100 and the storage as matrix spatial data in matrix space storage 120 are the same as in the first exemplary embodiment and explanation of these operations is therefore here omitted.

Matrix space storage 120 stores matrix spatial data derived from the rule set shown by way of example in FIG. 5. Test input device 940 is here assumed to apply test packet T1 to rule analysis system 100. The description format of the test packet is assumed to be the same as the initial values of matrix data (see FIG. 8) and to be of a format that lists pairs of starting point and end point for each attribute. Test packet T1 is assumed to be T1=(4, 5, 5, 6, omitted). Test input device 940 sends the test packet to pass test unit 150.

Pass test unit 150 operates according to the flow chart shown in FIG. 15 and begins processing upon the input of the test packet by way of test input device 940. In Step S301, pass test unit 150 first determines whether the region of the above-described test packet T1 that has been received as input straddles a plurality of matrices. The determination of whether the region of the test packet straddles a plurality of matrices can be realized by comparing the boundary values of each attribute that has been created and sorted by matrix generator 130 in Step S104 shown in FIG. 2 with the starting points and end points that designate the ranges of the attributes of the test packet. In the case of the rule set shown in FIG. 5, for example, the sorted boundary values of the first attribute are 0, 1, 3, 4, 5, 7, ... (omitted). The range of the first attribute of test packet T1 is 4 to 5. A matrix is determined by two adjacent boundary values, and "4 to 5" is therefore the region of one matrix. This comparison is carried out for all attributes, and if all attributes of test packet T1 are within one matrix region, the region of the test packet is determined to fall within the region of one matrix, and if not, the region of the test packet is determined to straddle a plurality of matrices. By means of this determination method, pass test unit 150 determines that test packet T1 falls within one matrix, whereby the process branches toward "NO" in Step S301.

FIG. 16 is a schematic view in which matrix data derived from the rule set shown in FIG. 5 are represented in two-dimensional space, the description proceeding only as far as the second attribute in the rule set shown in FIG. 5. FIG. 16 also shows test packet T1, and the description again proceeds only as far as the second attribute in the test packet. Out of expedience, the region of the test packet is represented by rectangles with rounded corners in FIG. 16.

After determining that test packet T1 falls within one matrix in Step S301, pass test unit 150 identifies the matrix that contains test packet T1 in Step S302. At this time, pass test unit 150 may identify a matrix that envelops the range of each attribute of the test packet. The matrix identified in Step S302 is F. As shown in FIG. 16, the matrix that contains test packet T1 in this example is M057, i.e., the fourth matrix from M053 shown in FIG. 16. M057 is therefore matrix F.

In the next Step S303, pass test unit 150 refers to the matrix data of matrix F (M057) to identify the leading rule in that matrix data. The matrix data of matrix F is M057=(4, 5, 5, 7, omitted, R1, R2, R8). The leading rule is therefore R1. Pass test unit 150 further refers to the action in the rule data of the leading rule R1 and supplies the content indicated by this action from output device 930. The rule data of R1 is R1=(3, 5, 5, 7, omitted, D, M056, M057), from which it is understood that the action is D (deny passage). The indication that passage is to be denied for test packet T1 is thus supplied from output device 930.

Explanation next regards operations when a test packet that straddles matrices is supplied as input. Pass test unit 150 is assumed to receive test packet T2 as input by way of test input device 940. In this case, test packet T2 is T2=(6, 9, 6, 9, omitted). Representing T2 on two-dimensional space with test packet T2 having attributes only up to the second attribute results in the representation of T2 shown in FIG. 16.

When it is determined in Step S301 that the region of test packet T2 straddles a plurality of packets, pass test unit 150 proceeds to Step S304 and lists the plurality of matrices that contain the test packet. Pass test unit 150 should here list all matrices in which any attribute contains a portion of an attribute of the test packet. The set of matrices listed in Step S304 is G. FIG. 17 is a schematic view showing the two-dimensional space in the vicinity of test packet T2. In this example, test packet T2 straddles each of the matrices M058 to M060, M071 to M073, and M084 to M086 shown in FIG. 17. The set of these matrices is therefore set G. In other words, G={M058, M059, M060, M071, M072, M073, M084, M085, M086}.

In Step S305, pass test unit 150 next identifies the action for each matrix contained in set G. The operation of identifying the action for each matrix may be carried out similar to the operation of identifying the action of matrix F in Step S303. In FIG. 17, matrices for which the action is A (allow passage) are shown as white regions, and matrices for which the action is D (deny passage) are shown with a pattern (a pattern depicted as a multiplicity of dots). Pass test unit 150 integrates M058, M059, M071, M072, M084, and M085, which are matrices for which the action is A, i.e., matrices that allow passage, to create a region. This region is represented by (5, 8, 5, 10, omitted). Pass test unit 150 similarly integrates M060, M073, and M086, which are matrices for which the action is D, i.e., matrices that deny passage, to create a region. This region is represented by (8, 9, 5, 10, omitted). Pass test unit 150 finds the region of overlap with test packet T2 for each of these two regions. The overlap region between T2 and the region (5, 8, 5, 10, omitted) for which the action is A is found to be (6, 8, 6, 9, omitted). The region of overlap between T2 and the region for which the action is D (8, 9, 5, 10, omitted) is found to be (8, 9, 6, 9, omitted).

In Step S306, pass test unit 150 next supplies the overlap regions that have been found for each action from output device 930. In other words, pass test unit 150 supplies, of the regions of test packet T2, the region in which passage is allowed and the region in which passage is not allowed.

No particular limitations apply to the output mode of the processing results, i.e., the test results, of pass test unit 150. For example, display output and aural output are both possible, or output as a file is also possible. Alternatively, output device 930 may be provided in another system that is connected to rule analysis system 100 by way of a communication network, and the test results may be supplied as output in this other system. In this case, the test results can be reported to users of the other system that is connected to rule analysis system 100 by way of a communication network. FIG. 18 shows an example of the display of the analysis results when output device 930 is a display device and supplies test results as display output. FIG. 18 shows an example of the display of results when the above-described test packets T1 and T2 are received as test packet input.

The above-described example showed a case in which test results are successively supplied as output in Steps S303 and S306, but the test results may also be displayed together after the completion of processing by pass test unit 150. In this case, pass test unit 150 may record the test results in a temporary storage device (not shown) in Steps S303 and S306. After completion of the processing shown in FIG. 15 by pass test unit 150, the test results that have been recorded in the temporary storage device may be supplied together by output device 930.

Explanation next regards the advantages of the filtering rule analysis system of the second exemplary embodiment. The filtering rule analysis system of the second exemplary embodiment enables comprehension of which packets are allowed to pass by the entirety of the rules regardless of the complexity of the filtering rules and regardless of the number of attributes of the filtering rules. This capability is realized because the application of any test packets as input results in testing of passage or non-passage of the test packets by the entirety of rules.

Third Exemplary Embodiment

Figure 19:
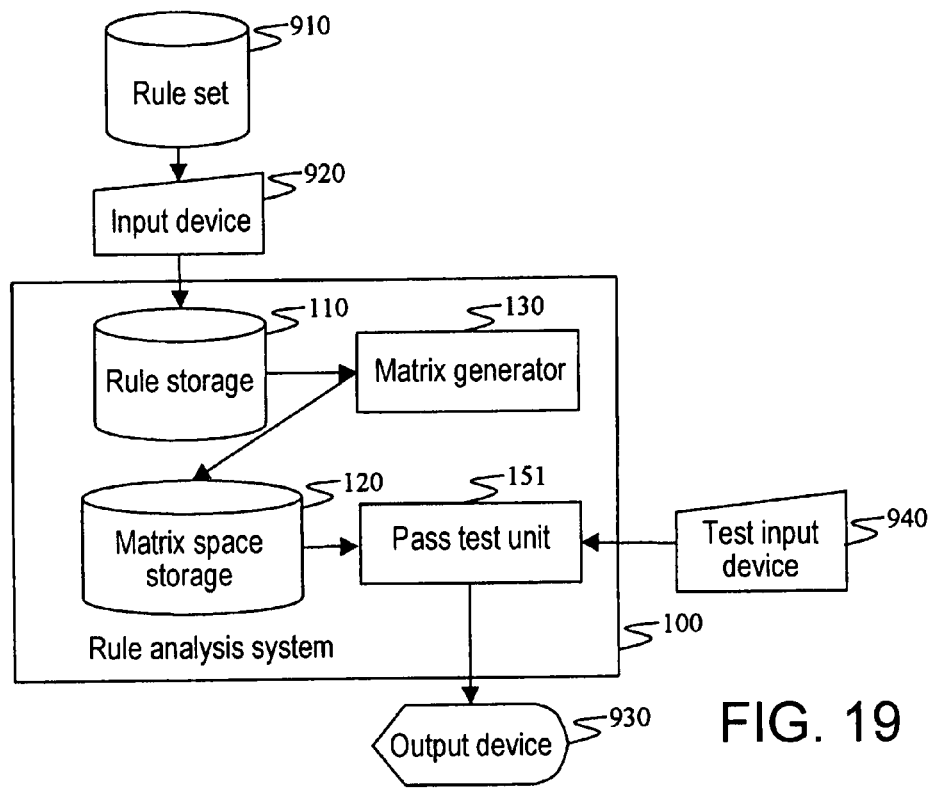
FIG. 19 is a block diagram showing the configuration of the filtering rule analysis system according to the third exemplary embodiment of the present invention.

Explanation next regards the filtering rule analysis system of the third exemplary embodiment of the present invention. In FIG. 19 that shows the filtering rule analysis system of the third exemplary embodiment, constituent elements that are the same as elements in the second exemplary embodiment are given the same reference numerals as in. FIG. 14, and redundant explanation of these elements is omitted. In the filtering rule analysis tools of the third exemplary embodiment, the operations of the pass test unit differ from the second exemplary embodiment, and different reference numerals that differ from those of the second exemplary embodiment are therefore given to the pass test unit.

The filtering rule analysis system of the third exemplary embodiment is provided with pass test unit 151. As the rule set in this filtering rule analysis system, a plurality of rule sets (i.e., rule sets that correspond to each of a plurality of network devices) are applied as input to rule analysis system 100 from input device 920. Matrix generator 130 creates matrix spatial data from this plurality of rule sets and stores these matrix spatial data in matrix space storage 120. The operations of matrix generator 130 are the same as in the first exemplary embodiment. Matrix space storage 120 stores the matrix spatial data that have been created from the plurality of rule sets. Based on these matrix spatial data and test packets, pass test unit 151 tests which type of packets are passed and which type of packets are not passed with respect to the entirety of the plurality of rule sets, or in other words, with respect to the entirety of the plurality of network devices. Pass test unit 151 is realized by, for example, a CPU that operates in accordance with a program. The program is stored in a program storage device (not shown) that is provided in rule analysis system 100.

Explanation Next Regards the Operations of the Filtering Rule Analysis System of the Present Exemplary Embodiment.

In the present exemplary embodiment, as previously described, a plurality of (two or more) rule sets are applied as input to input device 920. Even though input device 920 applies a plurality of rule sets as input to rule analysis system 100, the operation up to creating matrix spatial data and causing these data to be stored in matrix space storage 120 are the same as in the first exemplary embodiment and second exemplary embodiment. However, it is assumed that an order is established among the plurality of rule sets. Matrix generator 130 then creates matrix spatial data such that this order is also maintained in the matrix spatial data that are created based on each rule set. For example, it is assumed that packets flow through two firewalls in order. The rule set corresponding to the first firewall is R100, and the rule set corresponding to the second firewall is R200. In this case, an order is set in advance such that R100 is the first rule set and R200 is the second rule set, and rule sets R100 and R200 for which this order has been established are applied as input to input device 920.

Matrix generator 130 creates matrix spatial data from rule sets R100 and R200 such that the order of rule sets R100 and R200 is maintained without change. At this time, matrix generator 130 determines the order of the rule data of rule set R100 such that the order of each rule contained in rule set R100 is maintained. However, rule data of the default rule is assumed to be last in the rule data of rule set R100. Matrix generator 130 similarly determines the order of rule data of rule set R200 such that the order of each rule contained in rule set R200 is maintained. At this time as well, the rule data of the default rule is assumed to be last in the rule data of rule set R200. Matrix generator 130 further determines the order such that each item of rule data of rule set R200 follows the rule data of rule set R100. For example, it is assumed that the rules of R100 are R11, R12, and R13 wherein R13 is the default rule, and that the rules of R200 are R21 and R22 wherein R22 is the default rule. In this case, matrix generator 130 determines the order of the rule data as R11, R12, R13, R21, and R22 to create the matrix spatial data.

When the attributes indicated in the condition portions of the rules of rule set R100 are of five types and the attributes indicated in the condition portions of the rules of rule set R200 are of four types, matrix generator 130 creates matrix spatial data assuming that the attribute that is in a particular rule set R100 but not in rule set R200 is shown in the condition portion of the rules of rule set R200. In this case, the range of the attribute that is added to rule set R200 is assumed to be the entire obtainable range of that attribute. Thus, when the types of attributes are different in a plurality of rule sets, matrix generator 130 adds to a particular rule set those attributes that are in another rule set but not in the particular rule set.

In the following explanation, of the list of rules added to matrix data, a group of rules that belong to the same rule set is referred to as a "rule group."

Figure 20:
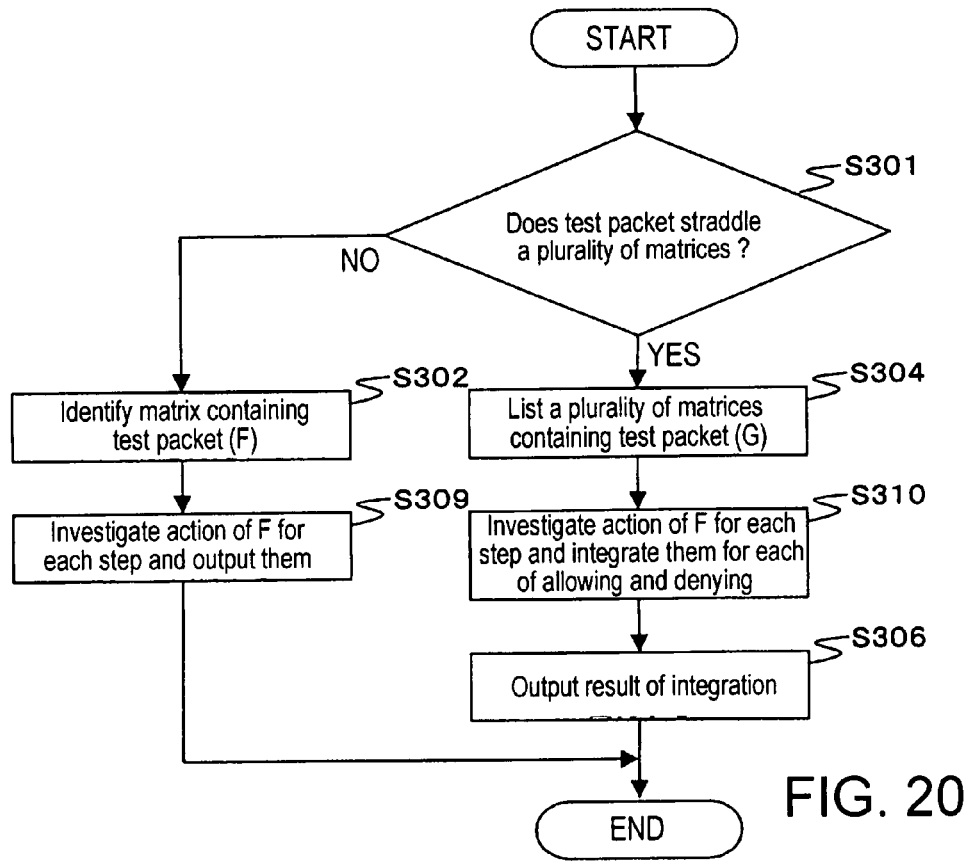
FIG. 20 is a flow chart showing an example of processing in the pass test unit.

FIG. 20 shows an example of the processing in pass test unit 151. Processes that are the same as processes realized by pass test unit 150 in the second exemplary embodiment are given the same reference numerals as used in FIG. 15, and detailed explanation of these processes is here omitted. In the present exemplary embodiment, the process of Step S309 (FIG. 20) is carried out in place of Step S303 (FIG. 15) in the second exemplary embodiment. In addition, the process of Step S310 (FIG. 20) is carried out in place of Step S305 (FIG. 15) in the second exemplary embodiment.

As in the second exemplary embodiment, pass test unit 151 determines whether the region of a test packet straddles a plurality of matrices in Step S301, and when the region falls within the region of one matrix, proceeds to Step S302 and identifies matrix F that contains the test packet. In Step S309 that follows Step S302, pass test unit 151 identifies the action of matrix F and supplies content indicated by this action as output from output device 930. However, the process for identifying the action of matrix F differs from Step S303 (see FIG. 15) in the second exemplary embodiment. In the present exemplary embodiment, pass test unit 151 identifies the action of matrix F as described hereinbelow.

Pass test unit 151 first refers to the matrix data of matrix F to identify the leading rule in the matrix data. This leading rule is the leading rule in the first rule group. Pass test unit 151 refers to the action in the rule data of this leading rule, and when the action is A, i.e., "allow passage," identifies the leading rule in the next rule group from among the list added to the matrix data. Pass test unit 151 refers to the action in the rule data of this leading rule, and when the action is A, further identifies the leading rule in the next rule group from among the list added to the matrix data. Pass test unit 151 repeats these operations, and when the action in the rule data is D, i.e., "deny passage," pass test unit 151 determines that the action of matrix F is D. On the other hand, when the leading rule in the last rule group is identified from among the list added to the matrix data and the action in the rule data of this rule is A, pass test unit 151 determines that the action of matrix F is A.

For example, when the rules added to the matrix data of matrix F are (R11, R13, R21, R22) and the action of R11 is A ("allow passage"), pass test unit 151 supplies the action of the leading rule of the next rule group in the rule data. In this example, the action of R21 is supplied. Where there are three or more rule sets, pass test unit 151 searches for the leading rule of the next rule group as long as the leading rules of the second and succeeding rule groups are "allow passage." When the action is D ("deny passage"), pass test unit 151 ends the process at that point and supplies that action. When the leading rules of all rule groups are "allow passage," pass test unit 151 supplies "allow passage." Explanation here regards a case in which the action of leading rule R11 is A, but when the action of R11 is D, pass test unit 151 supplies the message "deny passage."

When it is determined in Step S301 that a test packet straddles a plurality of matrices, pass test unit 151 lists the plurality of matrices that contain the test packet. This set of matrices is set G.

Next, in Step S310, pass test unit 151 identifies the action for each matrix contained in set G, and classifies the matrices contained in set G by action. Pass test unit 150 integrates the matrices that have been classified by the same action and finds the region of overlap between the integrated region and the region of the test packet. When actions are identified for each matrix that is contained in set G, the action of each matrix is identified as in Step S309. In other words, when the action of a particular matrix contained in set G is identified, pass test unit 151 carries out a process as described hereinbelow.

Pass test unit 151 first refers to the matrix data of the matrices to identify the leading rules in the matrix data. These leading rules are the leading rules in the first rule group. Pass test unit 151 refers to the actions in the rule data of these leading rules, and when the action is A, identifies the leading rule in the next rule group from among the list added to the matrix data. Pass test unit 151 refers to the action in these rule data of these leading rules, and when the action is A, identifies the leading rule in the next rule group from among the list added to the matrix data. Pass test unit 151 repeats these operations, and when there is an item in which the action in the rule data is D, i.e., "deny passage," pass test unit 151 determines that the action of matrix F is D. However, if the leading rule in the last rule group is identified from among the list added to matrix data and the action in the rule data of this rule is A, pass test unit 151 determines that the action of matrix F is A.

In the next Step S306, pass test unit 151 supplies the overlap regions that have been found for each action from output device 930.

The procedures of pass test unit 151 shown in FIG. 20 are only one example, and other procedures for obtaining the same result can be adopted.

Explanation next regards the operations of the filtering rule analysis system of the third exemplary embodiment using a concrete example. In this case, tests are carried out with router 820 and firewall 830 in a network configuration such as shown in FIG. 21 to determine the packets that are allowed to pass and the packets that are not allowed to pass by router 820 and firewall 830 as a whole. In the network configuration shown in FIG. 21, external network 810 such as the Internet, router 820, firewall 830, and PC (personal computer) 840 are connected together in that order. A packet sent from external network 810 to PC 840 will not arrive at PC 840 unless it passes through router 820, and further, passes through firewall 830. Rule set R100 (rules R11 to R13) shown in FIG. 22 is set in router 820. Similarly, rule set R200 (rules R21 and R22) shown in FIG. 22 is set in firewall 830. However, in FIG. 22, each rule is described in a format that does not depend on the network device. In FIG. 22, each rule is shown schematically as two-dimensional space. Further, FIG. 22 also shows the region of test packet T3 that is to be described.

Rule sets R100 and R200 shown in FIG. 22 are applied as input from input device 920 and stored in rule storage 110. Input device 920 may receive as input rules that are supplied by a rule conversion system (not shown) for collecting rules from router 820 or firewall 830 and converting these rules to rules described in a unique format.

Matrix generator 130 creates matrix spatial data from each of rule sets R100 and R200 that are stored by rule storage 110 and causes the created matrix spatial data to be stored in matrix space storage 120. At this time, matrix generator 130 sets the order of the rules as R11, R12, R13, R21, and R22 to create matrix spatial data. Accordingly, in the list of rules that are added to the matrix data, rules belonging to R100 are described first following which rules belonging to R200 are described. FIG. 23 shows an example of matrix data in which a list of rules is added in this way. A depiction of a schematic diagram of rules based on the created matrix spatial data results in the diagram shown in FIG. 22 in which two schematic diagrams are superposed.

Pass test unit 151 next receives test packet T3 by way of test input device 940. Test packet T3 is assumed to be T3=(4, 6, 4, 5, omitted). In this example, the region of test packet T3 does not straddle a plurality of matrices, and the process therefore proceeds to Step S302 after the determination of Step S301 (see FIG. 20). In this example, pass test unit 151 identifies the matrix that contains the test packet as MT01 (see FIG. 23) in Step S302. In other words, pass test unit 151 establishes MT01 as matrix F.

In Step S309, pass test unit 151 next identifies the leading rule in the matrix data of matrix F (MT01). This leading rule is R12 (see MT01 in FIG. 23), and pass test unit 151 refers to the action in the rule data of R12. This action is A ("allow passage"), and pass test unit 151 therefore searches for the leading rule of the next rule group in the matrix data of matrix F (MT01). This leading rule is R22 (see MT01 of FIG. 23). Pass test unit 151 refers to the action in the rule data of R22. This action is D ("deny passage"). Pass test unit 151 therefore determines that the action of matrix F is D ("deny passage") and supplies the message "deny passage" to the output device. At this time, information may be supplied regarding the rule sets by which passage is allowed in packet filtering and the rule sets by which passage is denied in packet filtering. In the present example, the action of the leading rule of the first rule group is A and the leading action of the next rule group is D, whereby the information may be supplied that passage is allowed in packet filtering based on the first rule set R100 and passage is denied in packet filtering based on the second rule set R200.

As a result, it is understood that test packet T3 does not reach as far as PC 440. It is further understood that test packet T3 is allowed to pass in router 820, which is the packet filtering device of R100 that is the first rule set, but test packet T3 is denied passage in firewall 830, which is the packet filtering device of R200, the second rule set.

The test packet received as input is assumed to be, for example, (3, 4, 2, 3, omitted). In this case as well, the process moves to Step S302 after Step S301 (see FIG. 20). In this example, pass test unit 151 identifies the matrix that contains the test packet as MT02 (see FIG. 23). In other words, pass test unit 151 makes MT02 matrix F. In Step S309, pass test unit 151 then identifies the leading rule in the matrix data of matrix F (MT02). As shown in FIG. 23, this leading rule is R11, and pass test unit 151 refers to the action in the rule data of R11. This action is D, whereby pass test unit 151 completes the process of identifying the action and supplies the message "deny passage."

It is next assumed that the test packet received as input is, for example, (4, 7, 1, 2, omitted). In this case as well, the process moves to Step S302, and in this example, pass test unit 151 identifies the matrix that contains the test packet as MT03 (see FIG. 23). In other words, pass test unit 151 makes MT03 matrix F. In Step S309, pass test unit 151 then identifies the leading rule in the matrix data of matrix F (MT03). As shown in FIG. 23, this leading rule is R12, and the action of R12 is A. Pass test unit 151 therefore searches for the leading rule in the next rule group. This leading rule is R21, and the action of R21 is A. There is no next rule group, and pass test unit 151 therefore ends the process of identifying actions at this point and supplies the message "allow passage."

No particular limitations apply to the mode of output of the processing results (test results) realized by pass test unit 151, and the results may be supplied as display output or audio output, or may be supplied as a file. Alternatively, output device 930 may be provided in another system connected to rule analysis system 100 by way of a communication network, and the test results may be supplied in this other system. In this case, test results can be reported to the users of the other system that is connected to rule analysis system 100 by way of a communication network. FIG. 24 shows an example of the display of the analysis results for a case in which output device 930 is a display device and the test results are supplied as display output. Still further, the test results that are to be supplied may be recorded in a temporary storage device (not shown) in Steps S309 and S306, and the test results that have been recorded in the temporary storage device then supplied by output device 930.

The preceding explanation regards a case in which the process moves to Step S302 after Step S301 of the flow chart shown in FIG. 20. An actual case is next shown in which the process moves from Step S301 to Step S310 and the matrix integrated. It is assumed that T4=(1, 4, 1, 4, omitted) is applied as the test packet. A schematic representation of T4 similar to FIG. 22 is shown in FIG. 25A. When test packet T4 is received as input, the region of T4 straddles a plurality of matrices. The process therefore moves to Step S304 after the determination of Step S301 shown in FIG. 20. As shown in FIG. 25B, it is assumed that test packet T4 straddles the nine matrices M001 to M009. In this case, pass test unit 151 lists each of the matrices M001 to M009 in Step S304. This set of matrices is set G.

In Step S310, pass test unit 151 identifies the actions for each of the matrices contained in set G. In this example, as shown in FIG. 25B, pass test unit 151 identifies the actions of M001, M002, M004, M007, and M008 as "D" based on rule R22 of rule set R200, the actions of M005 and M006 as "D" based on rule 11 of rule set R100, and the actions of M003 and M009 as "A" based on rule R21 of rule set R200. Pass test unit 151 integrates the matrices that are classified as the same actions. In this case, M001, M002, M004 to M006, M007, and M008 are integrated, but as shown in FIG. 25B, the region of these matrices is not rectangular, but rather, rectangular with a projecting portion. In this case, the integrated region cannot be expressed by listing the pairs of starting point and end point of each attribute. However, when integrating the matrices of the same action, the largest rectangular region within the region that is to be integrated is first identified, and this region is then represented by listing the pairs of starting point and end point of each attribute. In the present example, the largest rectangular region is obtained by M001, M002, M004, M005, M007, and M008, and this largest rectangular region is represented by listing the pairs of starting point and end point of each attribute. This region is represented as (1, 3, 1, 4, omitted). The steps of identifying the largest rectangular region and then representing by the pairs of starting point and end point of each attribute of the region are then repeated for the remaining region within the region to be integrated. In the present example, the remaining region is M006, and the region of this M006 should therefore be represented by the pairs of starting point and end point of each attribute. This region is represented as (3, 4, 2, 3, omitted). The results of integrating the matrices of action D are therefore (1, 3, 1, 4, omitted) and (3, 4, 2, 3, omitted).

The matrices M003 and M009 of action A exist separately, and pass test unit 151 therefore should represent the regions by pairs of starting point and end point of each attribute for each separately existing region, this being each matrix in this case.

In Step S306, pass test unit 151 then finds the regions of overlap with the test packet in each region of each action and supplies the regions of overlap that are found together with the actions.

Explanation next regards the advantages of the filtering rule analysis system of the third exemplary embodiment. The filtering rule analysis system of the third exemplary embodiment enables comprehension of packets for which passage is allowed by the entirety of a plurality of packet filtering devices regardless of the complexity of the filtering rules or regardless of filtering rules having a multiplicity of attributes in an environment in which filtering is effected by a plurality of packet filtering devices. This effect is realized because matrix spatial data are created from a plurality of rule sets and the passage or non-passage of test packets then tested based on these matrix spatial data.

Fourth Exemplary Embodiment

Figure 26:
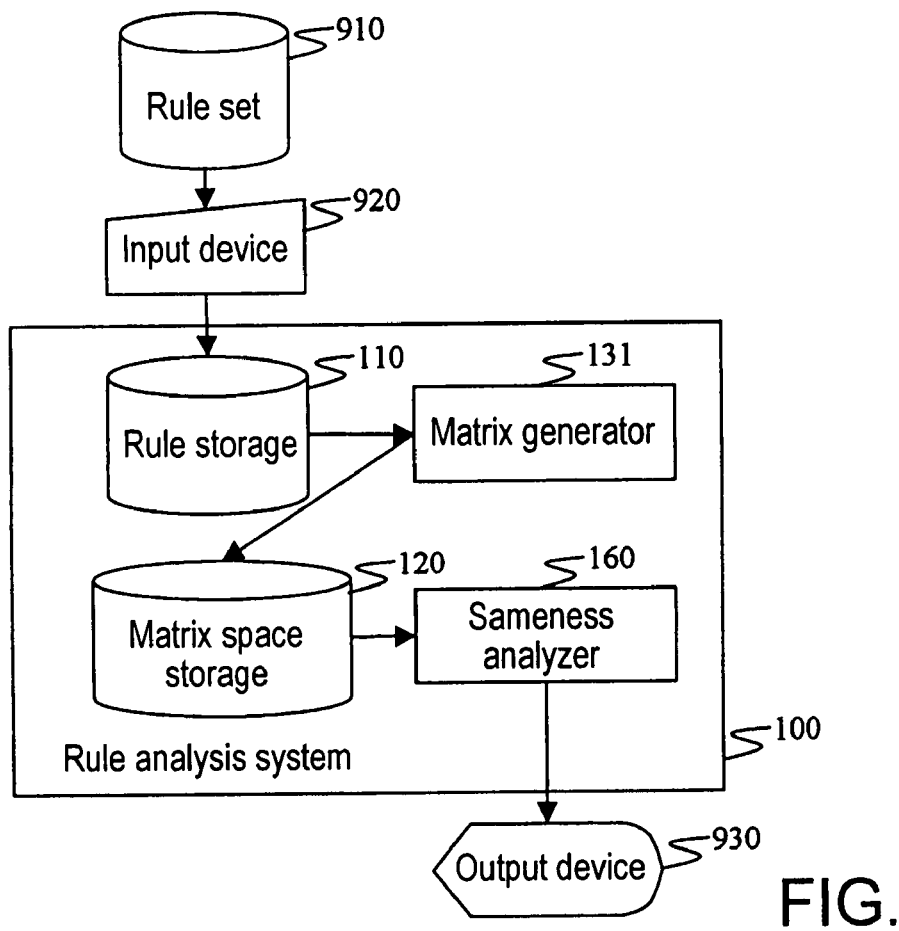
FIG. 26 is a block diagram showing the filtering rule analysis system according to the fourth exemplary embodiment of the present invention.

Explanation next regards the filtering rule analysis system of the fourth exemplary embodiment of the present invention. In FIG. 26 that shows the filtering rule analysis system of the fourth exemplary embodiment, constituent elements identical to elements in the first exemplary embodiment are given the same reference numerals as those in FIG. 1, and redundant explanation is omitted.

The filtering rule analysis system of the second exemplary embodiment is similar to the system shown in FIG. 1 but differs from the system shown in FIG. 1 in that sameness analyzer 160 is provided in place of the overlap analyzer in rule analysis system 100. In the filtering rule analysis tool of the fourth exemplary embodiment, the operation of the matrix generator differs from the case of the first exemplary embodiment, and different reference numerals are therefore given to the matrix generator than in the case of the first exemplary embodiment.

In the present exemplary embodiment, a plurality of rule sets is assumed to be stored in rule storage 110. Matrix generator 131 creates the same number of items of matrix spatial data as the number of that plurality of rule sets. In other words, matrix generator 131 both creates matrix spatial data for each of the rule sets and, when creating matrix spatial data that correspond to each rule set, uses all of the boundary points obtained from each rule set to create matrix data.

Sameness analyzer 160 analyzes whether the packet filtering operations based on each rule set are identical or not. Sameness analyzer 160 is realized by, for example, a CPU that operates in accordance with a program. This program is stored in, for example, a program storage device (not shown) that is provided in rule analysis system 100.

Explanation next regards the operations of the filtering rule analysis system of the present exemplary embodiment. As previously explained, a plurality of rule sets is stored in rule storage 110, but input device 920 may apply a plurality of rule sets as input to rule analysis system 100 and cause each of the rule sets to be stored in rule storage 110.

Figure 27:
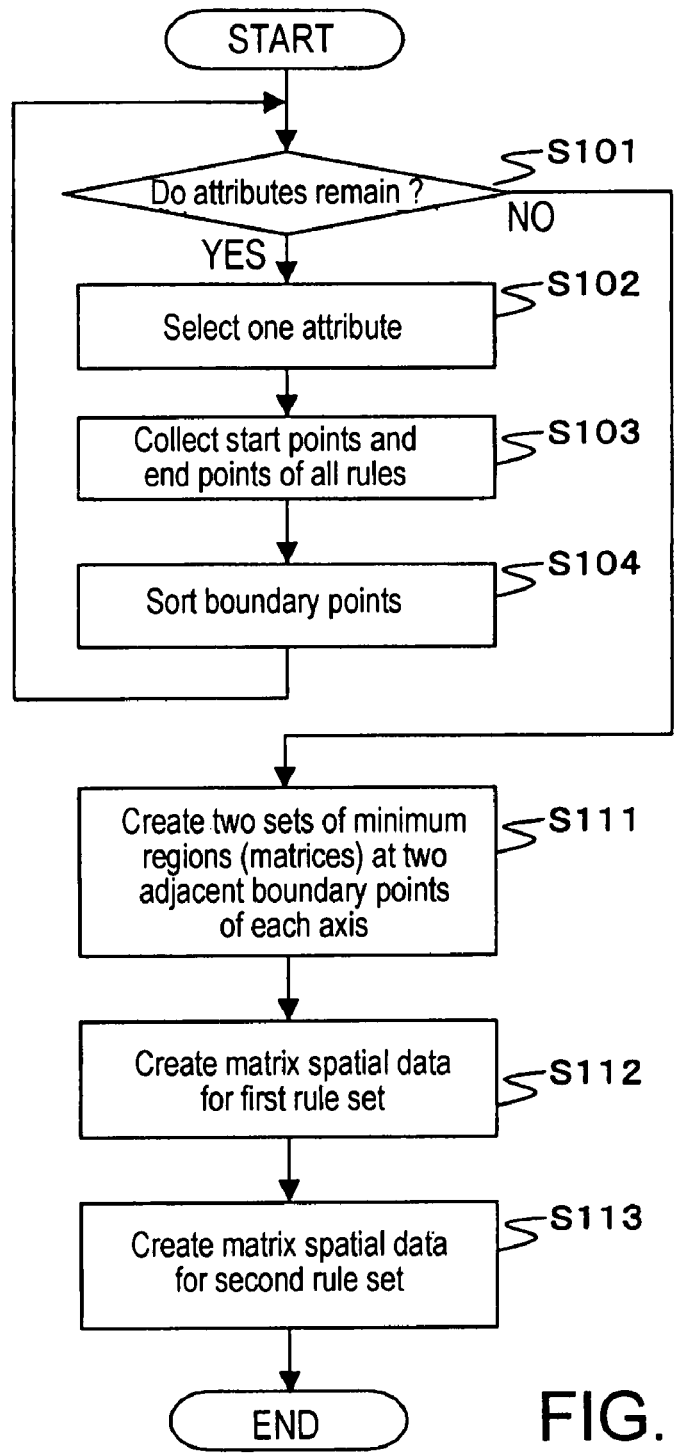
FIG. 27 is a flow chart showing an example of the matrix spatial data creation process realized by the matrix generator.

FIG. 27 shows an example of the matrix spatial data creation process realized by matrix generator 131. The process of Steps S101 to S104 shown in FIG. 27 is the same as the processes of Steps S101 to S104 (see FIG. 2) in the first exemplary embodiment. In Step S103 in the first exemplary embodiment, however, the starting points and end points relating to the attributes selected in Step S102 from the condition portions of all rules contained in one rule set were collected. In the fourth exemplary embodiment, matrix generator 131 in Step S103 collects the starting points and end points relating to the attributes selected in Step S102 from the condition portion of all rules contained in all rule sets stored in rule storage 110. In Step S104, matrix generator 131 then sorts the boundary points (starting points and end points) that have been collected from all rules contained in all rule sets. When there are redundant boundary points among the boundary points, i.e., when there are boundary points having the same values, the fourth exemplary embodiment is similar to the first exemplary embodiment regarding the deletion of boundary points having the same value and leaving only one of the boundary points having the same value.

When it is determined that no attributes remain in Step S101, the process moves to Step S111. In Step S111, matrix generator 131 creates matrix data for each rule set stored in rule storage 110. The process of creating matrix data corresponding to one rule set is similar to Step S105 (see FIG. 2) in the first exemplary embodiment. In the fourth exemplary embodiment, however, the boundary points sorted in Step S104 are used in the creation of matrix data. Further, although "produce two sets" is noted in Step S11 shown in FIG. 27, matrix data are created for each rule set even when the number of rule sets stored in rule storage 110 is three or more.

Matrix generator 131 next creates matrix spatial data for each rule set in Steps S112 and S113. In the example shown in FIG. 27, the process ends after the creation of the matrix spatial data for the second rule set, but as described above, matrix data are created for each rule set when three or more rule sets are stored in rule storage 110. In the process for creating matrix spatial data corresponding to one rule set shown in Steps S112 and S113, the processes of Steps S106 to S108 (see FIG. 2) should be executed repeatedly, as in the first exemplary embodiment.

When a plurality of sets of matrix spatial data are created having a one-to-one correspondence with each rule set, the number of items of rule data contained in each item of matrix spatial data may differ, but the number of items of matrix data contained in each item of matrix spatial data is common. This state is realized because boundary points (the starting points and end points of attributes) are collected from all rule sets and sorted, and all items of matrix data are created by using the boundary points obtained from these sorting results.

Sameness analyzer 160 investigates whether the plurality of rule sets recorded in rule storage 110 are rule sets having the same meaning. In other words, sameness analyzer 160 analyzes whether the packet filtering operations based on each rule set are the same operations or not.

Figure 28:
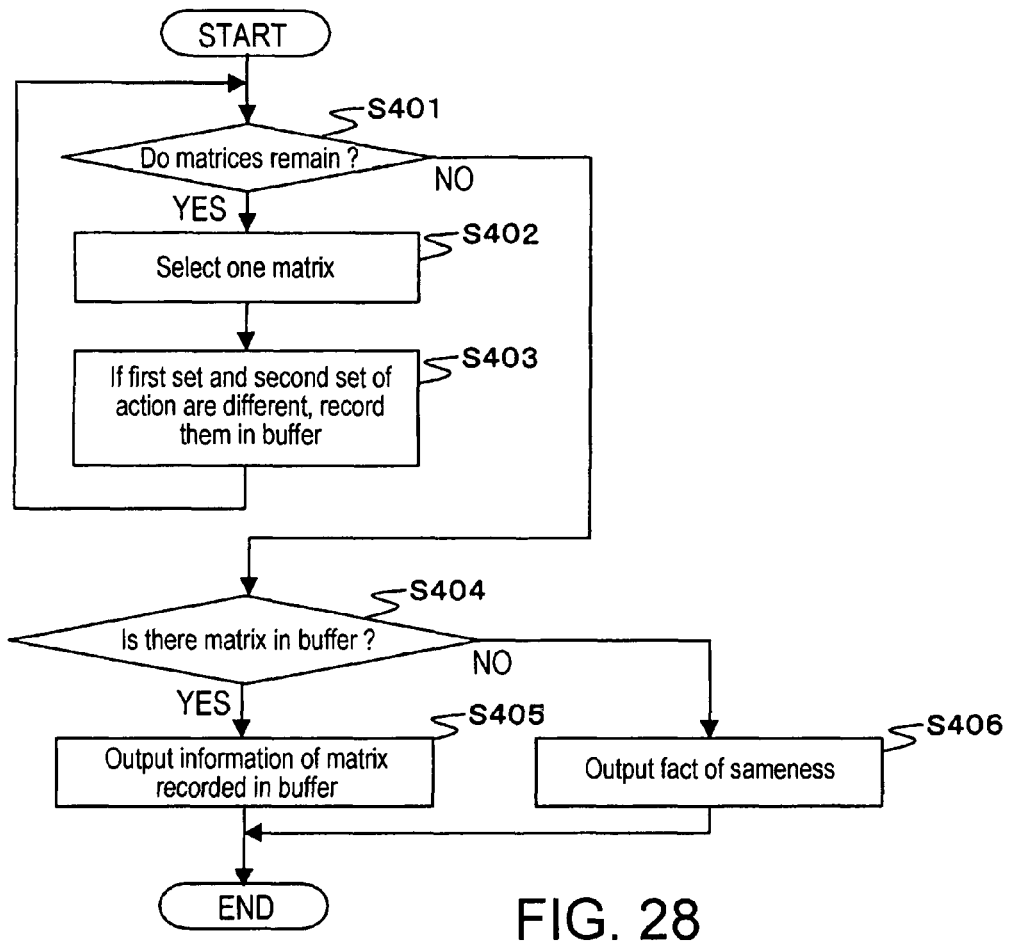
FIG. 28 is a flow chart showing an example of the process realized sameness analyzer.

FIG. 28 shows an example of processing realized by sameness analyzer 160. The existence of matrix spatial data corresponding to each rule set results in a plurality of sets of matrix spatial data. Explanation here regards a case of two sets of matrix spatial data in a one-to-one correspondence with each of two rule sets. Even though the numbers of items of rule data contained in these two sets of matrix spatial data differ, the numbers of items of matrix data are the same. The following explanation takes as a standard a matrix in the first set of matrix spatial data.

Sameness analyzer 160 carries out the loop process shown in Steps S401 to S403 while successively selecting all matrix data in the first set of matrix spatial data that are taken as a standard. In Step S401, sameness analyzer 160 first determines whether still unselected matrix data remain in the matrix spatial data that are taken as the standard. If checking has been completed for all matrix data, i.e., if all matrix data have been selected, the process moves to Step S404, but if still unselected matrix data remain, sameness analyzer 160 selects one item of unselected matrix data in the matrix spatial data that are taken as the standard in Step S402.

Sameness analyzer 160 next selects matrix data that correspond to the first set of selected matrix data from among the second set of matrix spatial data. In other words, sameness analyzer 160 selects, from among the second set of matrix spatial data, matrix data for which the pairs of boundary points in each attribute are shared with the first set of selected matrix data. In Step S403, sameness analyzer 160 investigates the actions of the leading rules in the two items of selected matrix data and records the actions in a buffer (not shown) if the actions are different. At this time, sameness analyzer 160 should record in the buffer information that can identify two items of matrix data for which the actions of leading rules are different. For example, if the thirteenth items of matrix data in each item of matrix spatial data are identified as M013 and the actions of the leading rules of each of M013 that are selected from the two items of matrix spatial data are different, sameness analyzer 160 should record "M013" in the buffer. Alternatively, sameness analyzer 160 may record in the buffer an entry in which the actions of the leading rules are added to the end of each item of selected matrix data. For example, an entry may be recorded in the buffer with the format of: "first M013=(14, 15, 0, 1, omitted, D), second M013=(14, 15, 0, 1, omitted, A)." If the actions of the leading rules of the two items of matrix data are the same, sameness analyzer 160 does not record in the buffer.

After Step S403, the process moves to Step S401. If still unselected matrix data remain among the matrix spatial data that are taken as the standard, the process following Step S402 is repeated.

When the process branches toward "NO" in Step S401, i.e., when still unselected matrix data do not remain in the matrix spatial data that are taken as standard, sameness analyzer 160 determines whether information of matrices is recorded in the buffer in Step S404. If information of matrices is not recorded in this case, sameness analyzer 160 in Steps S406 supplies output from output device 930 that the two rule sets recorded in rule storage 110 are rule sets having the same meaning. If information on matrices is recorded in Step S404, sameness analyzer 160 in Step S405 supplies output from output device 930 that there is a difference in the meaning held by the two rule sets, i.e., that the packet filtering operations based on each of the two rule sets are different. At this time, sameness analyzer 160 also supplies as output from output device 930 information on matrices that are recorded in the buffer and in which the actions of the leading rules are different. Sameness analyzer 160 may further display each of the different actions.

The procedure of matrix generator 131 shown in FIG. 27 is only one example, and other procedures for obtaining the same results can also be adopted. The procedures of sameness analyzer 160 shown in FIG. 28 are also only one example, and other procedures for obtaining the same result can be adopted. In the above-described example, explanation regarded the operations for a case of two rule sets, but the operations are similar for cases of any number of two or more rule sets.

Figure 29:
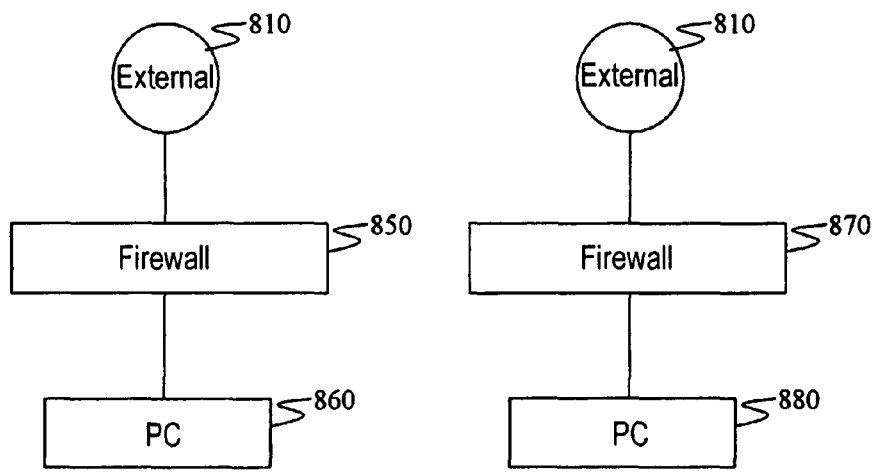
FIG. 29 is a view showing an example of the network configuration.

Explanation next regards operations of the filtering rule analysis system of the fourth exemplary embodiment using a specific example. Explanation regards a case of the analysis of the sameness of packet filtering operations of router 820 and firewall 830 contained in a network such as shown in FIG. 21 or the sameness of packet filtering operations of two firewalls 850 and 870 provided between external network 810 and PCs 860 and 880 such as shown in FIG. 29. It is here assumed that rule set R300 (rules R31 to R22) and rule set R400 (rules R41 to R45) shown in FIG. 30 are established as the filtering rules in router 820 and firewall 830, respectively, shown in FIG. 21. It is further assumed that rule set R300 (rules R31 to R33) and rule set R400 (rules R41 to R45) shown in FIG. 30 are established in each of firewalls 850 and 870, respectively, shown in FIG. 29. In FIG. 30, rules are described similarly to FIG. 22, and rules are shown schematically.

It is assumed that each of rule sets R300 and R400 shown in FIG. 30 are applied as input from input device 920 and stored in rule storage 110. In addition, rules that are supplied by a rule conversion system (not shown) that collects rules from, for example, router 820 and firewall 830 shown in FIG. 21 or collects rules from firewalls 850 and 870 shown in FIG. 29 and converts these rules to rules described in a unique format may be applied as input to input device 920.

In the case of the network configuration shown in FIG. 21, it is assumed that filtering rules are set that implement processes that are absolutely identical in router 820 and firewall 830 to realize multiple protection and robust security. This type of configuration is referred to as multistage protection. In the case of the network configuration shown in FIG. 29, on the other hand, it is assumed that the load of a PC is dispersed by preparing a plurality of completely identical environments. This type of configuration is referred to as multiplex. In either case, the same processes must be carried out in the filtering process. In this example, the sameness of this type of filtering process is investigated.

In the configuration shown by way of example in FIG. 29, the use of firewalls of identical device type (or identical software) as firewall 850 and firewall 870 enables the use of the same rules. In this case, sameness can be investigated by collating rule character strings. However, even firewalls of identical device type (or identical software) may have different rule configuration due to the person that created the rule or the time of creation of the rule. Not only can one particular rule be written in a plurality of ways, but a plurality of rules may also carry the same meaning as a single rule, and sameness therefore cannot be investigated by merely collating rule character strings. The filtering rule analysis system of the present exemplary embodiment examines sameness for such cases.

The processes by which matrix generator 131 produces two sets of matrix spatial data corresponding to rule sets R300 and R400 and records the matrix spatial data in matrix space storage 120 are substantially identical to the first exemplary embodiment. The fourth exemplary embodiment differs from the first exemplary embodiment in that starting points and end points (boundary points) are collected from all rules contained in the two rule sets R300 and R440 in Step S107, and these boundary points are then sorted in Step S104 to create matrix spatial data. In the first exemplary embodiment, boundary points are collected from only one rule set.

When matrix spatial data are created from the two rule sets R300 and R400 shown in FIG. 30, the first set of matrix spatial data contains three items of rule data (R31 to R33) and thirty items of matrix data. The second item of matrix spatial data contains five items of rule data (R41 to R45) and thirty items of matrix data. The boundary points in the first dimension (first attribute) are (0, 1, 2, 4, 7, 8), resulting in five minimum regions that can be realized by two adjacent boundary points. The boundary points in the second dimension (second attribute) are (0, 1, 2, 3, 4, 5, 7), resulting in six minimum regions that can be realized by two adjacent boundary points. The number of items of matrix data is therefore 5×6=30. In the interest of simplifying this explanation, the third and succeeding attributes are ignored.

After matrix generator 131 records the two sets of matrix spatial data in matrix space storage 120, sameness analyzer 160 uses these two sets of matrix spatial data to carry out an analysis. Each item of matrix spatial data created from the two rule sets shown in FIG. 30 contains thirty items of matrix data. As a result, sameness analyzer 160 repeats the loop of Steps S401 to S403 thirty times in the flow chart shown in FIG. 28. The following explanation takes the item of matrix spatial data corresponding to the first rule set R300 as a standard.

In Step S401, sameness analyzer 160 determines whether still unselected matrix data remain in the matrix spatial data that are taken as a standard. When first moving to Step S401, thirty items of matrix data remain, and the process therefore branches toward "YES" at Step S401 and sameness analyzer 160 thus selects one of these matrix data in Step S402. For example, sameness analyzer 160 selects the leading item of matrix data (0, 1, 0, 1, omitted, R33).

Sameness analyzer 160 next selects the data that correspond to the matrix data from the second set of matrix spatial data in Step S403. In this case, the data that correspond to the matrix data are the matrix data that share the pairs of boundary points in each attribute with the selected first set of matrix data. The matrix data here selected are the leading matrix data in the second set, i.e., (0, 1, 0, 1, omitted, R45). Sameness analyzer 160 refers to the rule data of the leading rule in the selected matrix data to investigate the action of the leading rule. In this case, sameness analyzer 160 refers to the rule data of leading rules R33 and R45 to investigate the actions. Since the actions are both D in the rule data of leading rules R33 and R45, sameness analyzer 160 makes no record in the buffer regarding the leading matrices. If the actions are different, sameness analyzer 160 records in the buffer information that can identify the two items of matrix data for which the actions of the leading rules differ. Sameness analyzer 160 successively selects and carries out this process for all matrix data in the matrix spatial data that are taken as the standard.

Sameness analyzer 160 then determines in Step S404 whether information of matrices has been recorded in the buffer. If the processes of Steps S401 to S403 have been repeated using the two sets of matrix spatial data created based on the example of the rule sets shown in FIG. 30, nothing is recorded in the buffer, and the process therefore moves to Step S406 and sameness analyzer 160 supplies from output device 930 an indication that the two rule sets R300 and R400 are rule sets having the same meaning.

No particular limitations apply to the mode of output of the processing results, i.e., the sameness analysis results, that are realized by sameness analyzer 160; and the results may be, for example, display output or audio output, or may be supplied as a file. Alternatively, output device 930 may be provided in a separate system that is connected to rule analysis system 100 by way of a communication network, and the sameness analysis results may be supplied as output in this separate system. In this case, the sameness analysis results can be reported to users of the separate system that is connected to rule analysis system 100 by way of a communication network. FIG. 31 shows an example of the display of the analysis results for a case in which output device 930 is a display device and the sameness analysis result are supplied as display output.

The sameness analysis results that are to be supplied may also be recorded in a temporary storage device (not shown) in Steps S405 and S406 and the sameness analysis results that have been recorded in the temporary storage device then supplied by output device 930.

The above-described specific example relates to a case in which an indication is supplied as output that two rule sets are rule sets carrying the same meaning. A case is next shown for output indicating that the two rule sets are rule sets having different meanings. It will be assumed that rule set R800 (R81 to R83) and rule set R900 (R91 to R95) shown in FIG. 32 are stored in rule storage 110 and that matrix spatial data created by matrix generator 131 based on these two rule sets R800 and R900 are stored in matrix space storage 120. It is further assumed that FIG. 32 shows a schematic representation of rules in which rules are described similarly to FIG. 30. In this case, matrix spatial data that correspond to rule set R800 are taken as the standard.

Sameness analyzer 160 successively selects matrix data from the matrix spatial data that correspond to rule set R800 and repeats the processes of Steps S401 to S403. If sameness analyzer 160 has selected the matrix data (2, 3, 1, 2, omitted, R82, R83) from the matrix spatial data of rule set R800 in Step S402, sameness analyzer 160 next selects the matrix data (2, 3, 1, 2, omitted, R95) from the matrix spatial data of rule set R900 in subsequent Step S403. Sameness analyzer 160 refers to the rule data of the leading rules in the selected matrix data to investigate the actions of the leading rules. In this case, sameness analyzer 160 refers to the rule data of leading rules R82 and R95 to investigate the actions. The action is A in the rule data of leading rule R92, and the action is D in the rule data of R95. The actions are therefore different, and sameness analyzer 160 records in the buffer information of these matrices and information of the actions in a format such as "first set (2, 3, 1, 2, omitted, A), second set (2, 3, 1, 2, omitted, D)."

When the loop process shown in Steps S401 to S403 has been completed for each item of matrix data and the process moves to Step S404, the buffer is recorded as shown above. In this case, sameness analyzer 160 supplies in Step S405 from output device 930 a report indicating, for example, that the filtering actions based on rule sets R800 and R900 are different, the information on matrices recorded in the buffer, and the rule sets for which the action is A and the rule sets for which the action is D. FIG. 33 shows an example of these output results.

Explanation next regards the advantages of the filtering rule analysis system of the fourth exemplary embodiment. The filtering rule analysis system of the fourth exemplary embodiment enables reporting of whether a plurality of filtering devices carry out completely identical filtering processes regardless of the complexity of filtering rules that have been set in a plurality of packet filtering devices. This effect is realized because the filtering processes realized by each of the rule sets are compared in matrix units without relation to the rules to check whether the actions are identical.

Fifth Exemplary Embodiment

Figure 34:
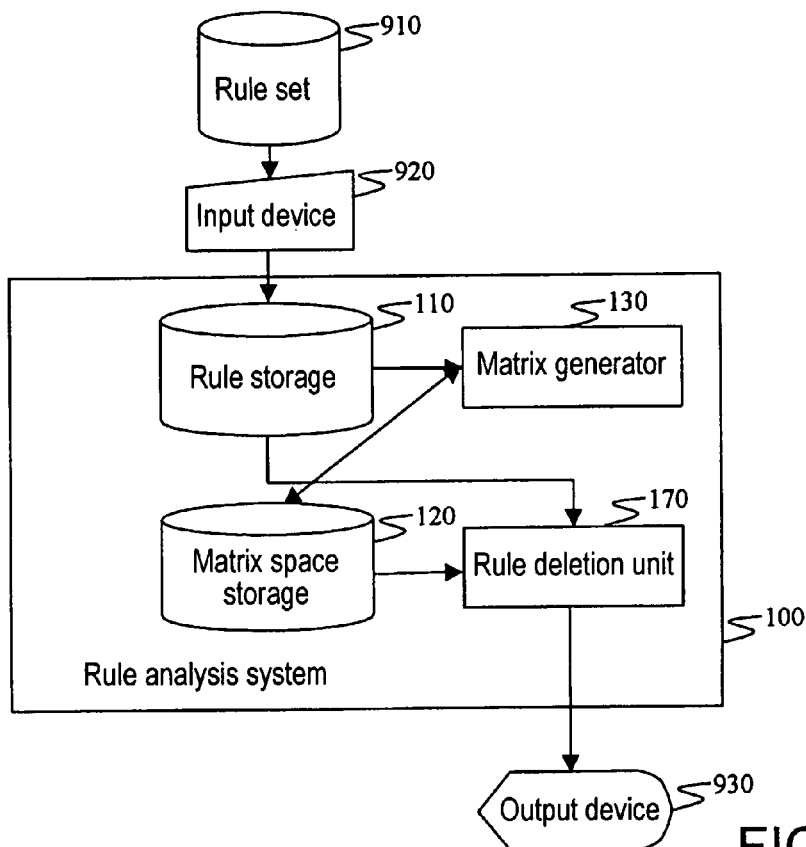
FIG. 34 is a block diagram showing the filtering rule analysis system according to the fifth exemplary embodiment of the present invention.

Explanation next regards the filtering rule analysis system of the fifth exemplary embodiment of the present invention. In FIG. 34 that shows the filtering rule analysis system of the fifth exemplary embodiment, constituent elements identical to elements in the first exemplary embodiment are given reference numerals identical to those in FIG. 1, and redundant explanation is omitted.

The filtering rule analysis system of the fifth exemplary embodiment is similar to the system shown in FIG. 1, but differs from the system shown in FIG. 1 in that rule deletion unit 170 is provided in rule analysis system 100 in place of the overlap analyzer. Rule deletion unit 170 refers to the matrix spatial data and deletes, of the rules in the rule sets stored in rule storage 110, those rules for which deletion has been determined to be possible. When rule deletion unit 170 determines that the range of an attribute described in the condition portion of a rule is redundant description, rule deletion unit 170 amends the description of the rule. Rule deletion unit 170 is realized by, for example, a CPU that operates in accordance with a program. The program is stored in a program storage device (not shown) provided in rule analysis system 100.

Explanation next regards the operations of the filtering rule analysis system of the present exemplary embodiment. Detailed explanation regarding operations that are similar to the first exemplary embodiment is here omitted. The operations of input device 920 and matrix generator 130 up to the storage of matrix spatial data in matrix space storage 120 are the same as in the first exemplary embodiment.

Figure 35:
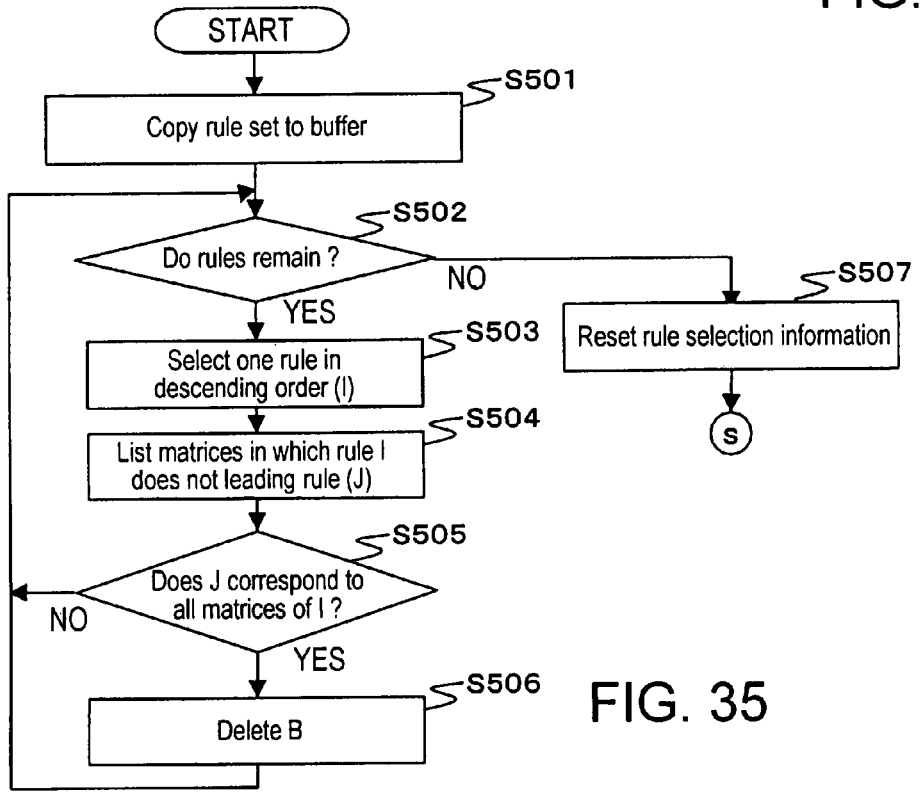
FIG. 35 is a flow chart showing an example of the progression of the rule deletion and rule amendment processes realized by the rule deletion unit.
Figure 36:
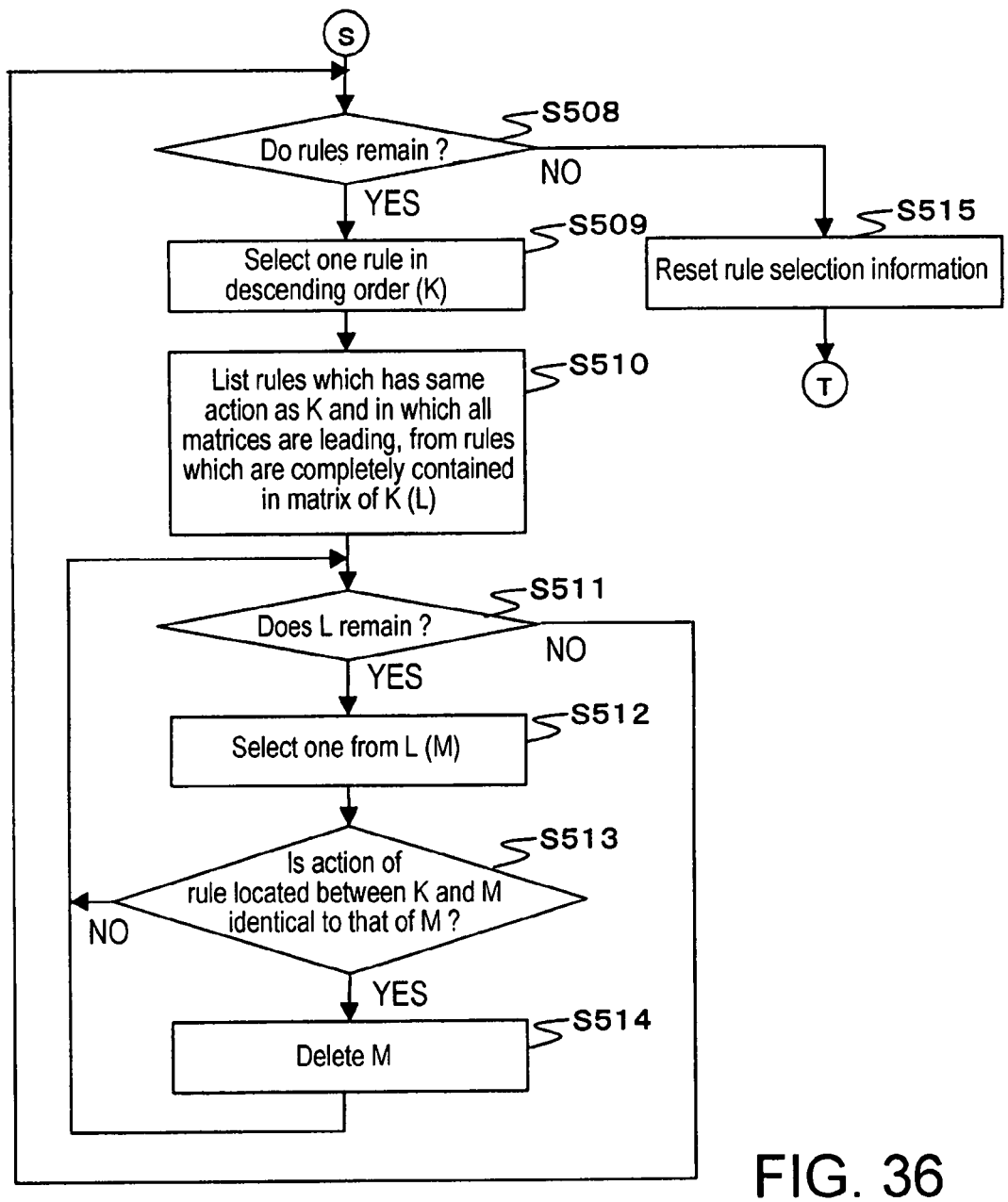
FIG. 36 is a flow chart showing an example of the progression of the rule deletion and rule amendment processes realized by the rule deletion unit.
Figure 37:
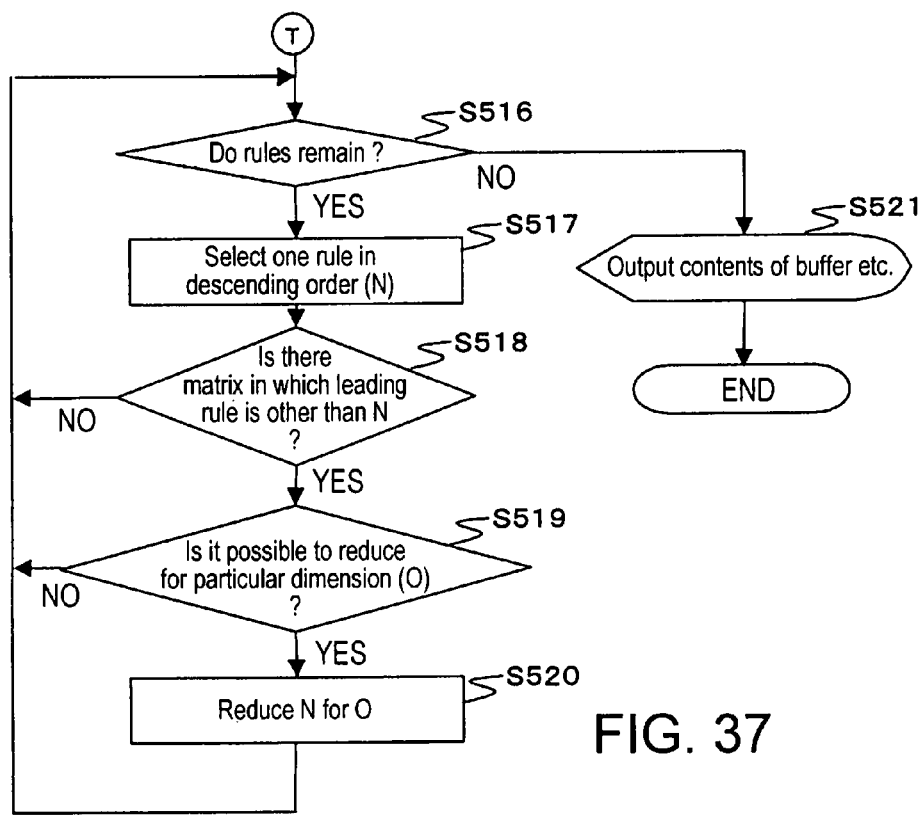
FIG. 37 is a flow chart showing an example of the progression of the rule deletion and rule amendment processes realized by the rule deletion unit.

After matrix generator 130 stores matrix spatial data in matrix space storage 120, rule deletion unit 170 executes the above-described rule deletion process and rule amendment process. FIGS. 35 to 37 show examples of the rule deletion and rule amendment procedures realized by rule deletion unit 170.

Rule deletion unit 170 first copies the rule sets stored in rule storage 110 to a buffer (not shown) in Step S501, and then proceeds to subjecting all rules other than the default rule of the rule sets copied to the buffer to the loop process of Steps S502 to S506. In this loop process, rule deletion unit 170 determines in Step S502 whether still unselected rules remain among the rules other than the default rule in the rule sets copied to the buffer. If such rules remain, rule deletion unit 170 selects in Step S503 one still unselected rule other than the default rule in descending order, i.e., in an order starting from rules having a lower order of priority. The rule selected in Step S503 is assumed to be "I."

In Step S504, rule deletion unit 170 next lists, of the matrix data that correspond to matrices that make up rule I, matrix data in which the leading rule is not rule I. The set of matrix data listed in Step S504 is J. In Step S505, rule deletion unit 170 next determines whether set J of matrix data matches the set of matrix data that correspond to the matrices that make up rule I. If these two sets match, the process moves to Step S506. Matching of set J of matrix data and the set of matrix data that correspond to the matrices that make up rule I means that the leading rules in all matrix data of matrices that make up rule I are other than rule I, and that rule I is completely concealed by one or more other rules of a higher order of priority, as with "concealed" that was explained in the first exemplary embodiment. When the process moves to Step S506, rule deletion unit 170 deletes rule I that is in a concealed state, completely hidden by other rules. On the other hand, if the two rule sets do not match in Step S505, the process moves to Step S502 without the deletion of rule I. The loop process of these Steps S502 to S506 results in the deletion of concealed rules from the rule sets copied to the buffer.

If the process branches toward "NO" in Step S502, i.e., if it is determined that, of the rules other than the default rule, still unselected rules do not remain, rule deletion unit 170 in Step S507 resets the checks appended to each rule in the rule sets stored in the buffer. "Check" here refers to information indicating that an item has been selected. When the rule process of Step S502 and succeeding steps has been carried out and all rules other than the default rule have been selected, checks are appended to each of these rules, and these checks are therefore reset, i.e., removed, in Step S507.

Rule deletion unit 170 next proceeds to subjecting all of the rules that have not been deleted from the buffer other than the default rule to a loop process (see FIG. 36) that begins from Step S508 and returns to Step S508. In Step S508, rule deletion unit 170 first determines whether still unselected rules remain among the rules other than the default rule in the rule sets stored in the buffer. If such rules remain, rule deletion unit 170 in Step S509 selects one still unselected rule other than the default rule in a descending order, i.e., in order from rules having a lower order of priority. The rule selected in Step S509 is K.

In Step S510, rule deletion unit 170 next lists the rules that satisfy the following three conditions. The first condition is: "The rule is completely contained in matrices that make up rule K and is a rule having a higher order of priority than rule K." Here, "The rule is completely contained in matrices that make up rule K" signifies a state in which "The range indicated by attributes indicated by each item of the entirety of matrix data that correspond to the rule falls within the range of the attributes indicated by each item of the entirety of matrix data that correspond to rule K." The second condition is: "The rule is itself the leading rule in each of all matrix data that correspond to the rule." The third condition is: "The action of the rule is identical to the action of rule K." Rule deletion unit 170 lists all rules that satisfy all of the first to third conditions. The set of rules listed in Step S510 is L.

Rule deletion unit 170 next proceeds to subjecting all rules contained in rule set L to the loop process of Steps S511 to S514. In this loop process, rule deletion unit 170 first determines in Step S511 whether still unselected rules remain among the rules contained in rule set L. If still unselected rules remain, rule deletion unit 170 selects one unselected rule in rule set L in Step S512. The rule selected in Step S512 is M. Rule deletion unit 170 next searches for rules for which the order of priority is between rule K and rule M and for which the ranges indicated by attributes described in the condition portion even partially overlap with the ranges indicated by the attributes described in the condition portion of rule M. If such a rule exists, rule deletion unit 170 determines in Step S513 whether the action of rule M matches with the action of a rule having an order of priority that is lower by 1 than that of rule M in each of the matrices that make up rule M. In other words, rule deletion unit 170 determines whether the action of rule M matches the action of the rule succeeding rule M in the rule list of all matrix data of each of the matrices that make up rule M. A rule having an order of priority lower by 1 than that of rule M may differ by matrix. When a match is determined in Step S513, rule deletion unit 170 in Step S514 deletes rule M from rules recorded in the buffer. When it is determined that a match does not occur in Step S513, the process moves on to Step S511.

Figure 38:
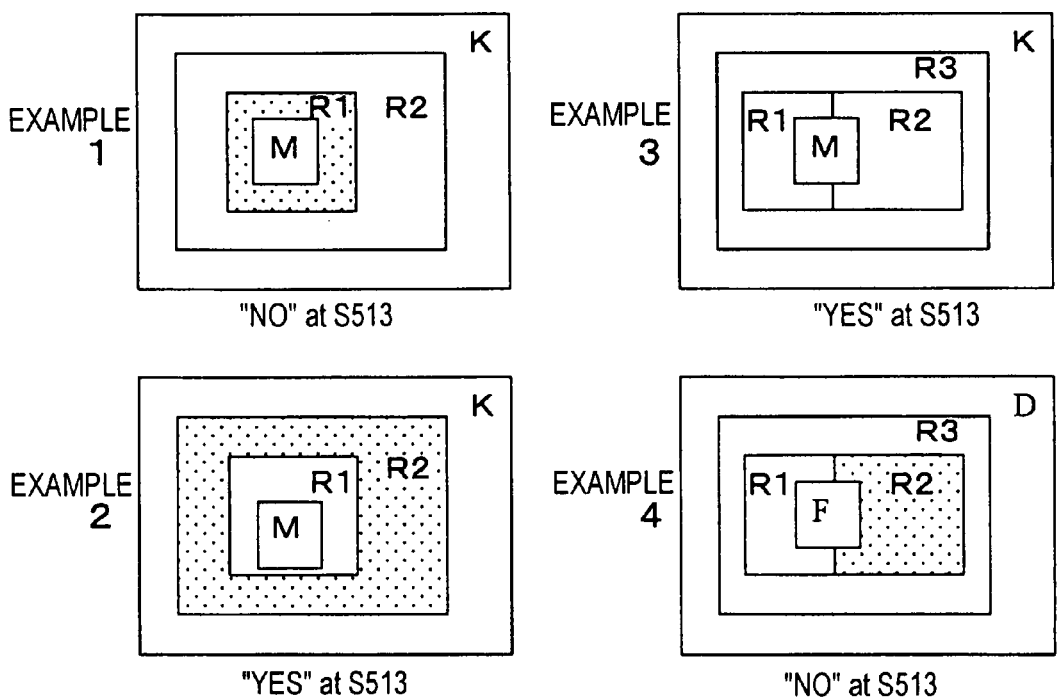
FIG. 38 is a view showing an example of the determination realized by the rule deletion unit.

Explanation here regarded an example of the determination of Step S513 that used rules schematically represented in two-dimensional space. FIG. 38 is a schematic explanatory view showing an example of the determination in Step S513. In FIG. 38, rules in which the action is A are shown as white regions, and rules in which the action is D are shown as regions having a pattern in which a multiplicity of dots are depicted.

Example 1 shown in FIG. 38 shows the existence of R1 and R2 as rules for which the order of priority is between rule K and rule M and for which the ranges shown by attributes described in the condition portion even partially overlap with the range of attributes described in the condition portion of rule M. At this time, R1 is a rule for which the order of priority is lower by 1 than that of rule M in each of the matrices that make up rule M. The action of rule M is A, and the action of rule R1 is D. As a result, rule deletion unit 170 determines that the actions do not match, branches toward "NO" in Step S513, and moves on to Step S511 without deleting rule M.

Example 2 shown in FIG. 38 shows the existence of R1 and R2 as rules for which the order of priority is between that of rule K and rule M, and for which the ranges shown by the attributes described in the condition portion even partially overlap with the ranges shown by attributes described in the condition portion of rule M. At this time, R1 is a rule having an order of priority lower by 1 than that of rule M in each of the matrices that make up rule M. The action of rule M is A, and the action of rule R1 is also A. Accordingly, Rule deletion unit 170 determines that the actions match, branches toward "YES" in Step S513, and deletes rule M in Step S514.

Example 3 in FIG. 38 shows rules R1 to R3 that exist as rules for which the order of priority is between that of rule K and rule M, and for which the ranges shown by the attributes described in the condition portion even partially overlap with the ranges shown by the attributes described in the condition portion of rule M. At this time, R1 or R2 is the rule for which the order of priority is lower by 1 than that of rule M in each of the matrices that make up rule M. The action of rule M is A, and the actions of rules R1 and R2 are also A. As a result, rule deletion unit 170 determines that the actions match, branches toward "YES" in Step S513, and deletes rule M in Step S514.

Example 4 of FIG. 38 shows rules R1 to R3 that exist as rules for which the order of priority is between that of rule K and rule M and for which the ranges shown by attributes described in the condition portion even partially overlap with the ranges shown by the attributes described in the condition portion of rule M. At this time, R1 or R2 is a rule for which the order of priority is lower by 1 than that of rule M in each of the matrices that make up rule M. The action of rule M is A, and the action of R2 is D. Accordingly, the actions do not match in a portion of the matrices that make up rule A, and rule deletion unit 170 therefore moves on to Step S511 without deleting rule M.

If the loop process of Step S511 and succeeding steps is completed for all rules of rule set L, the process branches toward "NO" in Step S511 and the process moves to Step S508. The loop process that begins from this Step S508 and returns to Step S508 results in the deletion from the buffer of rules that are determined to be unnecessary due to the existence of rules having a lower order of priority.

When it is determined in Step S508 that still unselected rules do not remain among the rules other than default rules in the rule sets stored in the buffer, the process moves to Step S515. In Step S515, rule deletion unit 170 resets the checks that have been appended to each rule in the rule sets stored in the buffer. This process is similar to the process of Step S507.

Rule deletion unit 170 next subjects all rules other than default rules of the rules not deleted from the buffer to the loop process (see FIG. 37) that begins from Step S516 and returns again to Step S516. In this loop process, rule deletion unit 170 first determines in Step S516 whether still unselected rules remain among the rules other than default rules in the rule set stored in the buffer. If such rules remain, rule deletion unit 170 selects in Step S517 one still unselected rule other than default rules in a descending order, i.e., from rules having a lower order of priority. The rule selected in Step S517 is N. In Step S518, rule deletion unit 170 next determines whether matrix data exist in which the leading rule is other than rule N in the matrix data of matrices that make up rule N. If such matrix data do not exist, the process moves to Step S516. If such matrix data exist in Step S518, rule deletion unit 170 lists these matrix data and moves to Step S519.

In Step S519, rule deletion unit 170 investigates whether regions represented by matrix data of matrices that make up rule N and in which the leading rule is a rule other than rule N can be reduced for a particular dimension O, i.e., whether rule N can be reduced for a particular dimension O. If reduction is not possible, the process moves on to Step S516, and if reduction is possible, the process moves on to Step S520.

Figure 39:
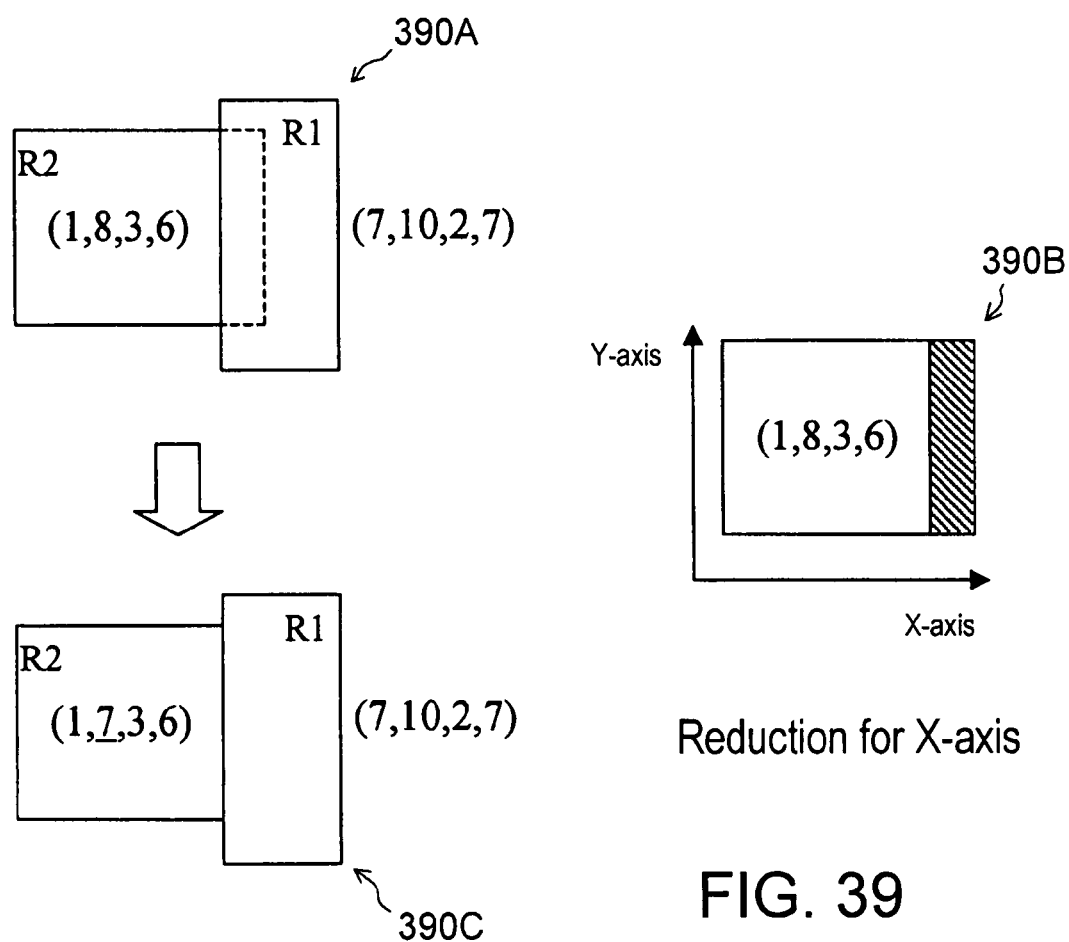
FIG. 39 is a view showing a concrete example of reduction.

To explain reduction, dimension O signifies any attribute described in the condition portion of a rule, and reducing rule N for dimension O means altering the attribute of the condition portion of rule N by narrowing the range of the attribute indicated by dimension O. Explanation next regards a specific example. FIG. 39 is an explanatory view showing a specific example of reduction. In FIG. 39, rules R1 and R2 are represented schematically. As shown by example 390A, R1 has a higher order of priority than R2. The range of the first attribute indicated by the condition portion of rule R1 is "7 to 10," and the range of the second attribute is "2 to 7." Similarly, the range of the first attribute shown by the condition portion of rule R2 is "1 to 8," and the range of the second attribute is "3 to 6." In this case, rule R1 is first applied to packets that fall within the range of the attribute indicated by the area of slanted lines in graph 390B, and rule R2 is not applied. Unnecessary regions within rule R2 that are not applied can be eliminated as shown in example 390C by amending to narrow the range of the first attribute of rule R2 from "1 to 8" to "1 to 7." This amendment of the range of an attribute corresponds to "reduction." In this example, the first attribute corresponds to dimension O, and rule R2 is reduced for the first attribute. The meaning of the entirety of rules R1 and R2 does not change despite this implementation of reduction. In other words, the packet filtering operation does not change.

Figure 40:
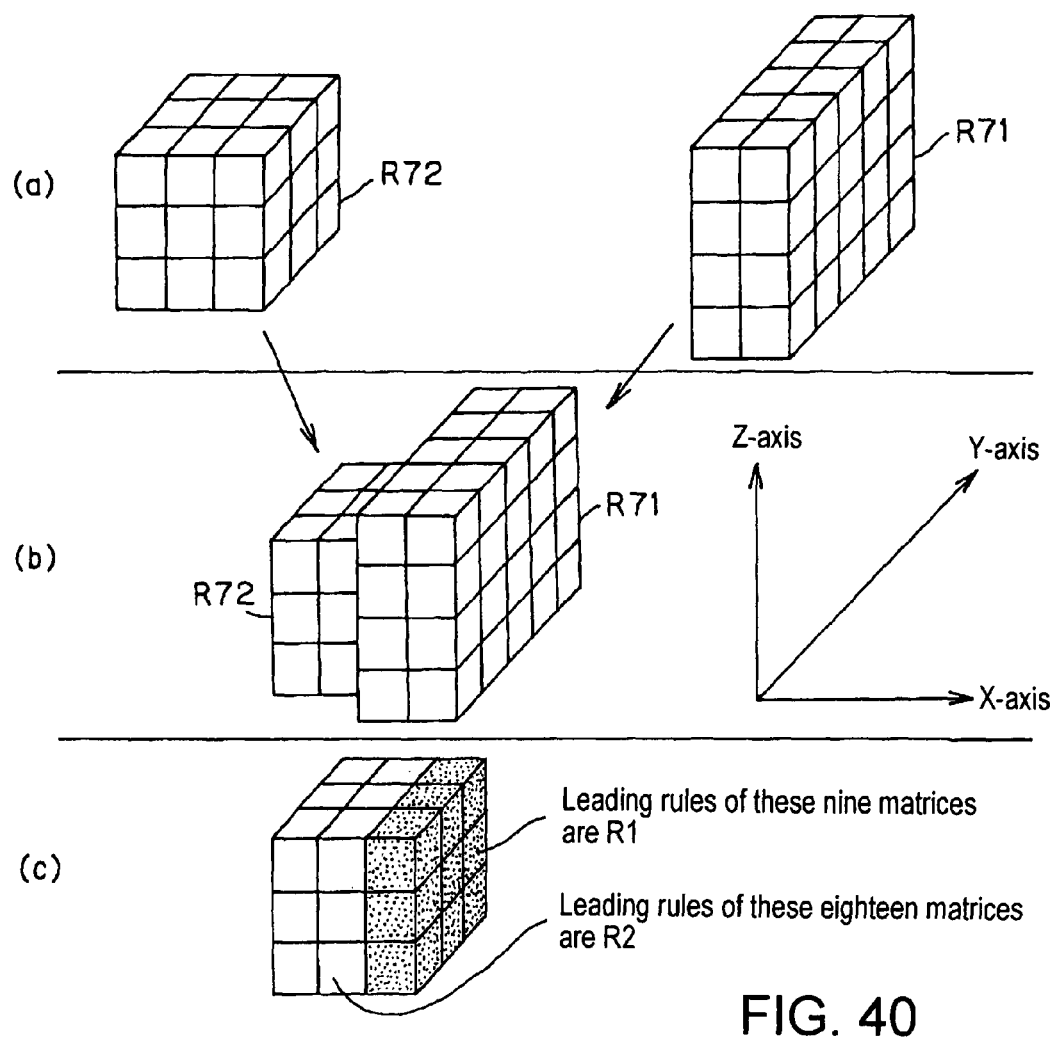
FIG. 40 is a view showing a concrete example of reduction.

In FIG. 39, explanation employed a schematic representation in two-dimensional space, but the reduction process can be carried out similarly even when there are three or more attributes. FIG. 40 is also an explanatory view showing a specific example of reduction. FIG. 40 gives a schematic representation of matrices that are represented by the ranges of each attribute from the first attribute to the third attribute. In FIG. 40, the two rules R72 and R71 shown in (a) are assumed to exist. The order of priority of R71 is here assumed to be higher than that of R72. Further, as shown in (b), a portion of the ranges shown by the attributes of the condition portions of each of rules R71 and R72 are assumed to overlap. In (c), R72 is shown with a pattern realized by depicting a multiplicity of dots in the range of overlap between the range indicated by the attributes of the condition portion of rule R72 and the range indicated by the attributes of the condition portion of rule R1. The region to which this pattern is added overlaps with rule R71, and because rule R71 has a higher order of priority, packets that fall within this region are not subject to the application of rule R72. As a result, reduction of R72 can be realized by narrowing the range of, of the attributes indicated by the condition portion of rule R71, the first attribute, i.e., the attribute that corresponds to the X-axis shown in FIG. 40.

In FIG. 39 and FIG. 40, explanation used a schematic representation in two-dimensional space and three-dimensional space. When the attributes are the five types of source address, source port, destination address, destination port, and protocol, the ranges shown by the attributes of the condition portions of the rules are the ranges in five-dimensional space. In the interest of simplifying the following explanation, explanation regards the ranges in two-dimensional space or three-dimensional space.

A case in which reduction is possible and a case in which reduction is not possible are next compared and described.

If, of the ranges of attributes indicated by the condition portion of a particular rule, the region obtained by eliminating the region of overlap with the ranges of the attributes of other rules is in a rectangular state, this rule can be reduced. In this case, a rectangular state means a state in which the range of each attribute is represented by pairs of starting point and end point. In other words, a rectangular state means a state in which the ranges of each attribute can be represented as: (A1, A2, B1, B2, C1, C2, D1, D2, E1, E2, ... ). FIG. 41A shows a state that can be reduced, and FIG. 41B shows a case in which reduction is not possible.

A portion (7, 9, 3, 10, omitted) of the region of rule R52 shown in FIG. 41A is concealed by R51, the region (1, 7, 3, 10, omitted) apart from this portion being in a rectangular state. In other words, the region can be represented by pairs of starting point and end point (1, 7, 3, 10). In this case, the range of the second attribute in the region (1, 7, 3, 10, omitted) matches with the range of 3 to 10 of the second attribute that has been designated by the original rule. It is further assumed that matching occurs in the third and subsequent attributes. In this case, rule R52 can be reduced for the first attribute, and more specifically, the region of R52 can be reduced to (1, 7, 3, 10, omitted). The range of the first attribute is here amended from "1 to 9" to "1 to 7." A portion (7, 9, 3, 8, omitted) of the region of rule R62 shown in FIG. 41B is concealed by R61, but the region of R62 apart from this portion is not in a rectangular state. In other words, the region cannot be represented by pairs of starting point and end point (A1, A2, B1, B2, ... ). In the example shown in FIG. 41B, rule R62 cannot be reduced.

The region of overlap of rules R71 and R72 shown in FIG. 40 is assumed to be region 250 shown in FIG. 42. In FIG. 42, the leading rules in the matrix data of the matrices shown by the white regions are R72. On the other hand, the leading rules in the matrix data of matrices shown by regions with a pattern are R71. Of the range of the attributes shown by the condition portion of rule 72, the region apart from overlap region 250 with the range of the attribute of the other rule is not in a rectangular state. In other words, the region cannot be represented by pairs of starting point and end point as in (A1, A2, B, B2, ... ). As a result, in the example shown in FIG. 42, rule 72 cannot be reduced. On the other hand, in the example shown in (c) in FIG. 40, of the range of the attribute shown by the condition portion of rule 72, the region of overlap with the range of the attribute of other rules is in a rectangular state. In other words, the range of the attribute can be represented in the format (A1, A2, B1, B2, ... ). As a result, R72 can be reduced in the example shown in (c) in FIG. 40.

Figure 43:
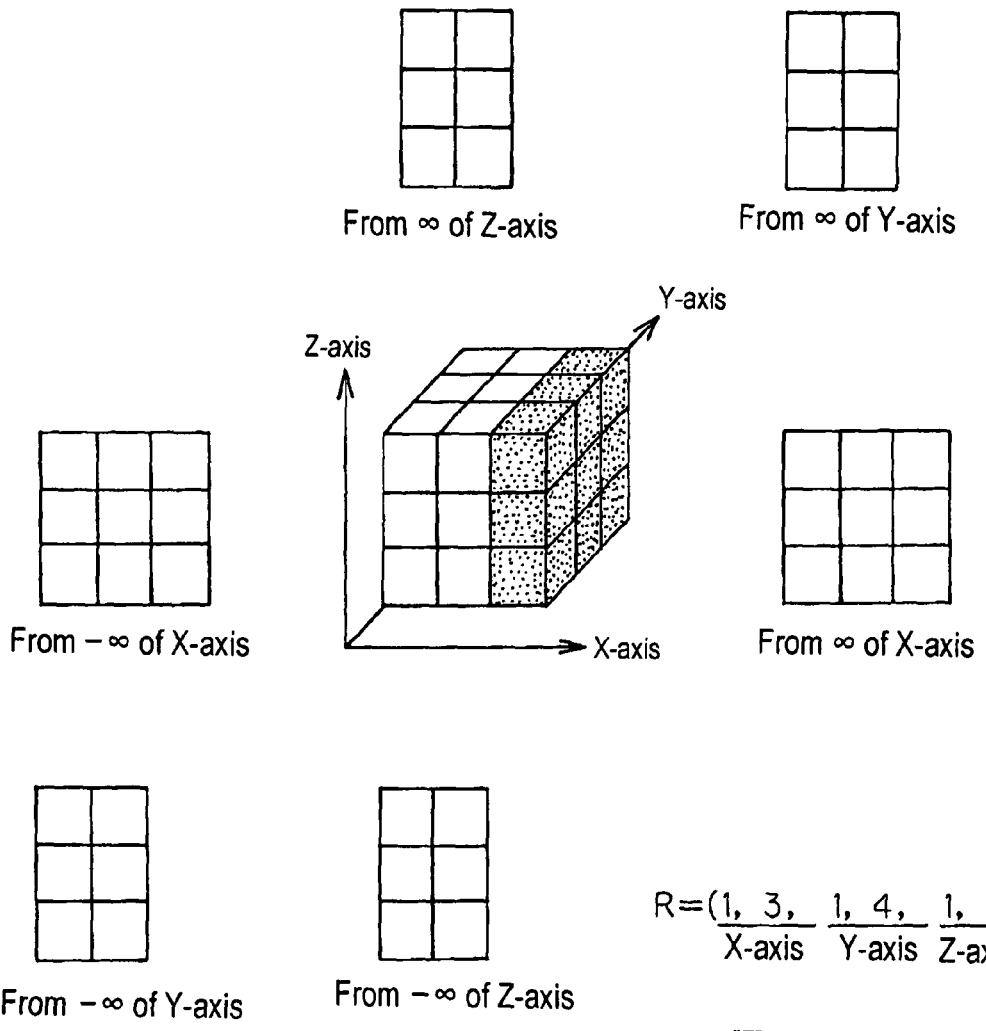
FIG. 43 is a view showing the state of viewing the remaining region from the direction of infinity and infinitesimal of each axis when the remaining region is rectangular.
Figure 44:
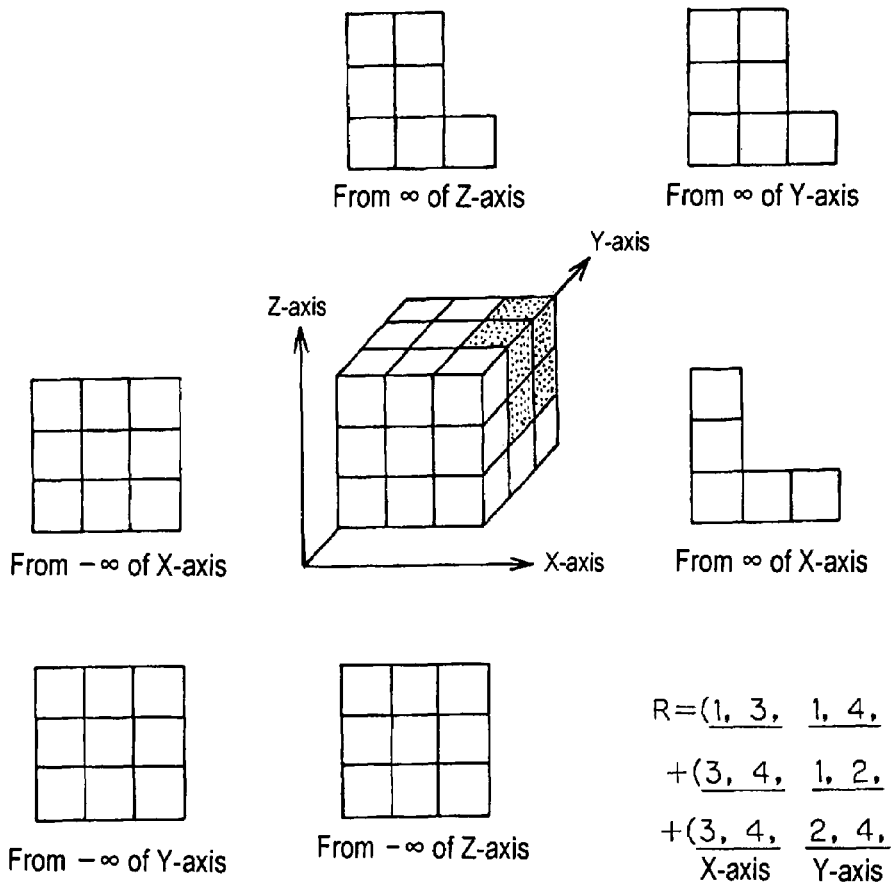
FIG. 44 is a view showing the state of viewing the remaining region from the direction of infinity and infinitesimal of each axis when the remaining region is not rectangular.

Of the ranges of the attributes shown by the condition portion of a particular rule, the region apart from the overlap region with the ranges of attributes of other rules is referred to as the "remaining region." When this remaining region is in a rectangular state, and when the remaining region is viewed from the direction of infinity and the direction of infinitesimal of each axis, all are in a rectangular state. FIG. 43 is an explanatory view showing the state in which the remaining region is in a rectangular state and the remaining region is viewed from the directions of infinity and infinitesimal of each axis. In the example shown in FIG. 43, the remaining region is represented by (1, 3, 1, 4, 1, 4). As shown in FIG. 43, the remaining region is in a rectangular state regardless of the direction from which it is viewed. For example, the ranges of two attributes corresponding to the Y-axis and Z-axis (alternatively, the X-axis and Y-axis, or the X-axis and Z-axis) are in a state that can be represented by pairs of starting point and end point. FIG. 44 is an explanatory view showing the state in which the remaining region is not in a rectangular state and the remaining region is viewed from the directions of infinity and infinitesimal of each axis. In the example shown in FIG. 44, the remaining region cannot be expressed by arranging pairs of starting point and end point and can only be expressed as, for example, a combination of the regions: for example, (1, 3, 1, 4, 1, 4), (3, 4, 1, 2, 1, 4), and (3, 4, 2, 4, 1, 2). In this case, the remaining region is not in a rectangular state when viewed from the direction of infinity of each of the X-axis, Y-axis, and Z-axis, as shown in FIG. 44.

When investigating in Step S519 whether rule N can be reduced for a particular dimension O, the investigation should be implemented as next described. Rule deletion unit 170 should examine whether, in the overlap region, i.e., the region represented by matrix data that are the matrix data of the matrices that make up rule N and in which the leading rules are rules other than rule N, there is a range in which all attributes other than the attribute that corresponds to dimension O match with the range of attributes originally designated by original rule N. If such a range exists, the range of the attribute that corresponds to dimension O can be narrowed such that this region is eliminated and the rule reduced.

The filtering rules describe conditions by the combinations of starting points and end points for all attributes (dimensions), and each attribute must therefore also be described by the combination of starting point and end point in the condition portion of rules after reduction. At this time, when any two attributes are extracted from among the attributes contained in the condition portion of rules after reduction, these two attributes are in a rectangular state. In other words, assuming that the axes, such as the above-described X-axis and the Y-axis, that correspond to these two attributes are mutually orthogonal, the two extracted attributes form a rectangle.

Figure 45:
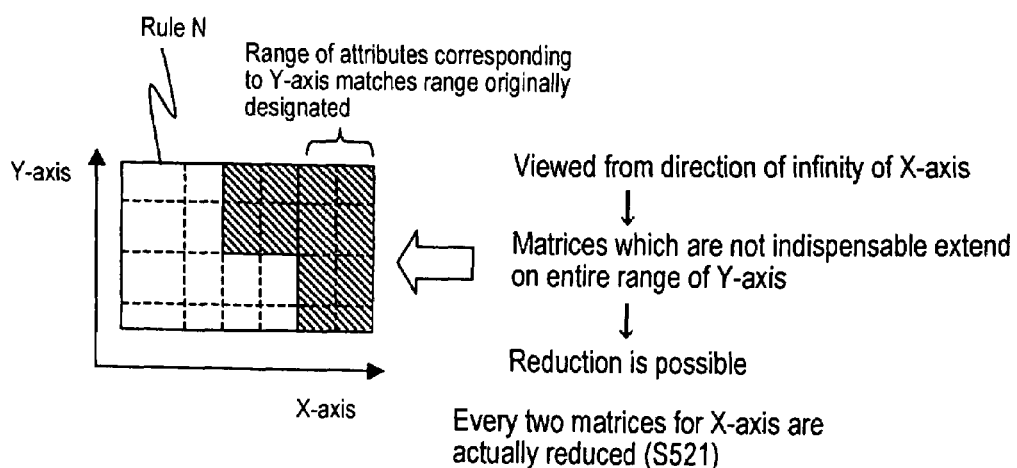
FIG. 45 is an explanatory view giving a schematic view in two-dimensional space of a case in which the rule deletion unit determines whether a rule can be reduced or not and reduces the rule.

In Step S520, rule deletion unit 170 amends, i.e., reduces, rule N such that the range of the attributes in this rule N is narrowed. Rule deletion unit 170 then exchanges rule N originally stored in the buffer for the amended rule. FIG. 45 is an explanatory view that schematically shows in two-dimensional space a case in which rule deletion unit 170 determines whether a rule can be reduced and reduces the rule. In FIG. 45, the overlap portion of the rule is shown by slanted lines. Rule deletion unit 170 determines the overlap portion (the slanted line portion shown in FIG. 45) with other rules in rule N. This overlap portion includes a portion in which attributes other than the attribute that corresponds to the X-axis, in this case the attributes that correspond to the Y-axis, match with the range of attributes originally designated by rule N. In other words, the ranges that correspond to the Y-axis match with the ranges originally designated by rule N in the matrices of the two columns on the right side shown in FIG. 45. Accordingly, rule deletion unit 170 determines that reduction is possible and then amends rule N by narrowing the range of attributes that correspond to the X-axis such that the matrices of the two columns on the right of FIG. 45 are eliminated.

Figures 46, 47:
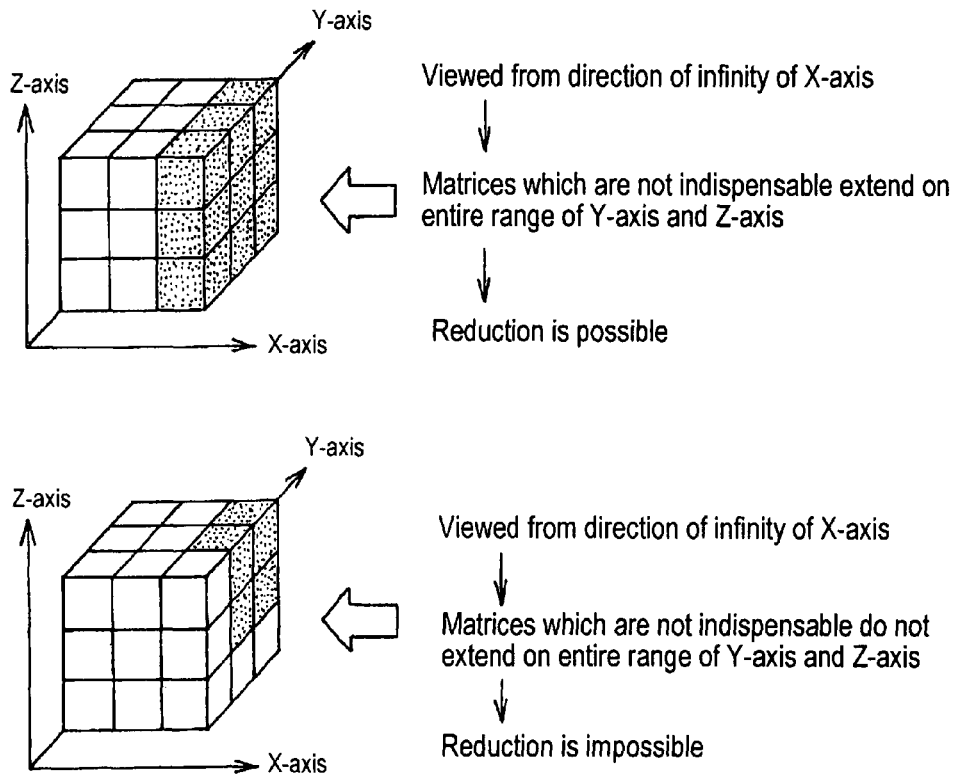
FIG. 46 gives a schematic view in three-dimensional space of a case in which rule deletion unit determines whether a rule can be reduced or not and reduces the rule.
FIG. 47 is a view showing an example of a rule set.

FIG. 46 is an explanatory view schematically showing in three-dimensional space a case in which rule deletion unit 170 determines whether a rule can be reduced and then reduces the rule. In FIG. 46, the overlap portion of the rule is represented by a pattern in which a multiplicity of dots is depicted. Explanation first regards the rule shown schematically in the upper level of FIG. 46. Rule deletion unit 170 determines the portion of overlap with other rules in this rule. In this overlap portion, all attributes other than the attributes that correspond to the X-axis, in this case attributes corresponding to each of the Y-axis and Z-axis, match with the range of attributes originally designated by rule N. Accordingly, rule deletion unit 170 determines that reduction is possible. Rule deletion unit 170 then amends rule N by narrowing the range of the attributes corresponding to the X-axis such that matrices shown with the pattern are eliminated in the upper level of FIG. 46. Explanation next regards rules shown schematically in the lower level of FIG. 46. In this case, there are no regions in which all attributes other than attributes corresponding to the X-axis, in this case attributes corresponding to each of the Y-axis and Z-axis, match with the ranges of attributes originally designated by rule N in the overlap portion. Accordingly, rule deletion unit 170 determines that reduction is not possible and moves to Step S516 without carrying out the reduction process of Step S520.

Of the overlapped rules, those rules that can be reduced are exchanged in the buffer by the repetition of the loop process shown in FIG. 37 that starts from Step S516 and returns to Step S516.

If it is determined in Step S516 that no unselected rules remain among the rules other than the default rule among the rule sets stored in the buffer and the process branches toward "NO," rule deletion unit 170 in Step S521 supplies from output device 930 information of the content of the buffer, specifically information on the sets of rules and deleted rules and information of the reduced rules.

The procedures of rule deletion unit 170 shown in FIGS. 35 to 37 are only one example, and other procedures can be adopted to obtain similar results. In this case, explanation of operations regarded an example in which there is one rule set, but any two or more rule sets may exist as in the third exemplary embodiment. The deletion and reduction of rules may then be carried out for each of the plurality of rule sets.

Figure 48:
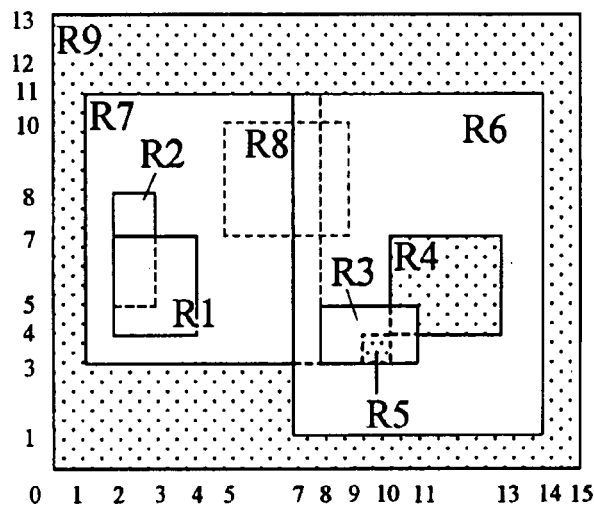
FIG. 48 is a schematic view showing a rule set in two-dimensional space.

Explanation next regards the operation of the filtering rule analysis system of the fifth exemplary embodiment using a specific example. In this case, it will be assumed that as the rule set, a rule set made up of R1 to R9 shown in FIG. 47 is applied as input and stored in rule storage 110, and that matrix spatial data are created based on this rule set and stored in matrix space storage 120. The processes up to the storage of the matrix spatial data in matrix space storage 120 are similar to the first exemplary embodiment. FIG. 48 is an explanatory view in which the rule set shown in FIG. 47 is shown schematically in two-dimensional space.

Explanation next regards the processing of rule deletion unit 170 using the rule set shown by way of example in FIGS. 47 and 48. In Step S501, rule deletion unit 170 first copies the rule set stored in rule storage 110 to a buffer, and if there are still unselected rules in the eight rules other than R9, which is the default rule (see FIG. 47), moves to Step S503 after Step S502 and selects one still unselected rule in descending order. In other words, in the loop process that begins from Step S502, rules are selected one at a time in the order R8, R7, . . . , R1 each time the process moves to Step S503. The rule selected in Step S503 is rule I. When first proceeding to Step S503 and selecting a rule, rule deletion unit 170 selects rule R8, and rule R8 therefore becomes rule I. In Step S504, rule deletion unit 170 lists, of the matrix data corresponding to the matrices that make up rule I (R8), the matrix data in which the leading rule is not rule R8. In the matrix data corresponding to the matrices that make up rule 8, all of the leading rules are either R6 or R7. Accordingly, rule deletion unit 170 branches toward "YES" in Step S505 and deletes rule I (in this case R8) in Step S506.

When rule deletion unit 170 again proceeds to Step S503 and selects rule R7, an item of matrix data exists in which the leading rule is R7 among the matrix data corresponding to the matrices that make up rule R7. Rule deletion unit 170 therefore branches toward "NO" in Step S505 and proceeds to Step S502. The process is similar when rule deletion unit 170 again proceeds to Step S503 and selects rule R6.

Figure 49:
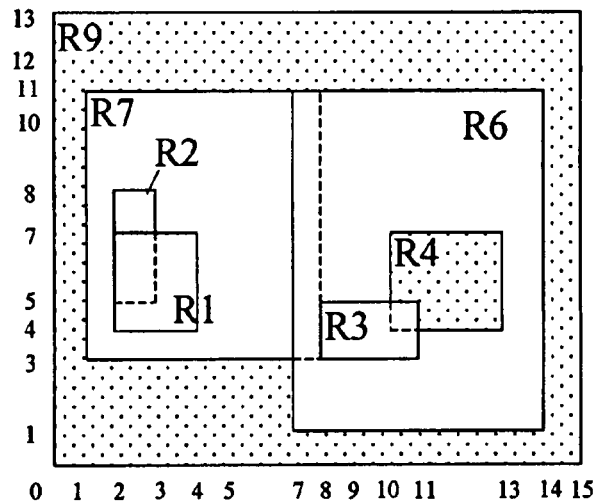
FIG. 49 is a schematic view showing the change of a rule set that accompanies the processing of the rule deletion unit.

When rule deletion unit 170 again proceeds to Step S503 and selects rule R5, the leading rules in all matrix data that correspond to the matrices that make up rule R5 are rules other than R5, specifically, the leading rules being rule R3. Accordingly, rule deletion unit 170 branches toward "YES" in Step S505 as with the selection of R8 and deletes R5 in Step S506. When R4 to R1 are subsequently selected in Step S503, rule deletion unit 170 branches toward "NO" in Step S505 as when R7 was selected and proceeds to Step S502. After R1 is selected and the process again proceeds to Step S502, no rules remain and the process therefore moves to Step S507. Rule deletion unit 170 then resets the checks of the rules that are not deleted. In the process up to this point, rules R8 and R5 have been deleted, and rules R1 to R4, R6, R7, and R9 remain. Schematically representing this rule set (R1 to R4, R6, R7, R9) results in FIG. 49. After Step S507, the process moves on to Step S508.

In Step S508, rule deletion unit 170 proceeds to Step S509 if a still unselected rule remains among the six rules other than default rule R9 of the seven rules contained in this rule set. Each time the process moves to Step S509, rule deletion unit 170 selects one of the six rules in descending order, this being the order R7, R6, R4, R3, . . . in this case. The rule selected in Step S509 is rule K. Upon first proceeding to Step S509 and selecting a rule, rule deletion unit 170 selects rule R7, and rule R7 therefore becomes rule K. In Step S510, rule deletion unit 170 next lists rules that satisfy the first condition "The rule is completely contained in matrices that make up rule K," the second condition "The rule is itself the leading rule in each of all matrix data that correspond to the rule," and the third condition "The action of the rule is identical to the action of rule K." When rule R7 is rule K, rules R1 and R2 are rules that satisfy the first condition. Of these, R2 does not satisfy the second condition. R1 satisfies both the second and third conditions. Accordingly, rule deletion unit 170 selects R1 in this case. As a result, only rule R1 is contained in set L of rules that are enumerated in Step S510.

When rule deletion unit 170 next carries out the determination of Step S511, rule R1 remains unselected in rule set L, and rule deletion unit 170 therefore branches toward "YES" and selects one rule, rule R1, from rule set L in Step S512. The rule selected in Step S512 is M. In the next Step S513, rule deletion unit 170 searches for a rule for which the order of priority is between that of rule K (R7 in this case) and rule M (R1 in this case) and for which the range indicated by attributes described in the condition portion even partially overlaps with the range indicated by the attributes described in the condition portion of rule M. In this case, R2 is found. Rule deletion unit 170 then determines whether the action of rules having an order of priority lower by 1 than rule M matches with the action of rule M in each of the matrices that make up rule M. In this case, of each of the matrices that make up rule M (R1), R2 is a rule for which the order of priority is lower by 1 than rule M in a portion of the matrices and R7 is a rule for which the order of priority is lower by 1 than rule M among the remaining matrices (see FIG. 49). The actions of rules R2 and R7 both match the action of rule M (R1). Accordingly, rule deletion unit 170 branches toward "YES" in Step S513, deletes rule R1 in Step S514, and proceeds to Step S511. Still unselected rules do not remain in rule set L, and the process therefore branches toward "NO" in Step S511 and moves to Step S508.

Rule deletion unit 170 next selects R6 in Step S509 and sets R6 as rule K. In Step S510, rule deletion unit 170 next lists rules that satisfy the first condition "The rule is completely contained in matrices that make up rule K," the second condition "The rule is itself the leading rule in each of all matrix data that correspond to the rule," and the third condition "The action of the rule is identical to the action of rule K." When rule R6 is rule K, R3 and R4 are rules that satisfy the first condition. Of these, R4 does not satisfy the second condition. R3 satisfies both the second and third conditions. As a result, only rule R3 is contained in set L of rules that are listed in Step S510.

When rule deletion unit 170 next carries out the determination of Step S511, rule R3 remains unselected in rule set L, and the process therefore branches toward "YES" and one rule, rule R3, is selected from rule set L in Step S512. In the next Step S513, rule deletion unit 170 searches for rules for which the order of priority is between that of rule K (R6 in this case) and rule M (R3 in this case) and for which the range indicated by the attributes described in the condition portion even partially overlaps with the range indicated by the attributes described in the condition portion of rule M. In this case, R4 is found. Rule deletion unit 170 then determines whether the action of the rule for which the order of priority is lower by 1 than rule M matches with the action of rule M in each of the matrices that make up rule M. In this case, of the matrices that make up rule M (R3), R4 is the rule having an order of priority lower by 1 than rule M in a portion of the matrices (see FIG. 49), and the action of rule R4 does not match the action of rule R3. Rule deletion unit 170 therefore branches toward "NO" in Step S513 and proceeds to Step S511 without deleting rule M (R3). Since there are no unselected rules remaining in rule set L, the process branches toward "NO" in Step S511 and then proceeds to Step S508.

In Step S509, when rule deletion unit 170 next selects rule R4 and sets R4 as rule K, there are no rules that satisfy the first condition "The rule is completely contained in matrices that make up rule K," the second condition "The rule is itself the leading rule in each of all matrix data that correspond to the rule," and the third condition "The action of the rule is identical to the action of rule K." As a result, set L of rules obtained by the process of Step S510 is an empty set. Accordingly, in Step S511, rule deletion unit 170 determines that no rules remain in rule set L, branches toward "NO," and again proceeds to Step S508. The operations when R3 and R2 are selected in Step S509 are similar to the operations when R4 is selected. In addition, R1 has already been deleted and R1 is therefore not selected in Step S509.

Figure 50:
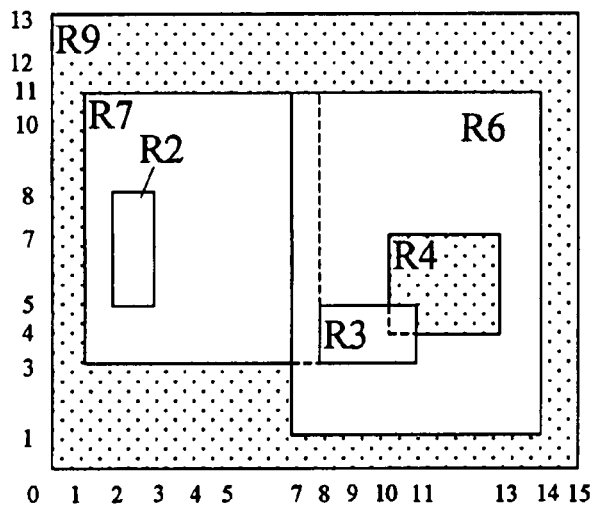
FIG. 50 is a schematic view showing the change of a rule set that accompanies the processing of the rule deletion unit.

After rule R2 is selected as rule K and the process again moves to Step S508, no unselected rules remain and the process of rule deletion unit 170 therefore moves to Step S515. In Step S515, rule deletion unit 170 resets the checks of the rules that are not deleted in the loop process that begins from Step S508. FIG. 50 shows a schematic representation of the rule set (R2 to R4, R6, R7, R9) that is stored in the buffer upon the completion of Step S515. After Step S515, the process moves on to Step S516.

In Step S516, if any still unselected rules remain among the five rules other than default rule R9 of the rules contained in this rule set, the process of rule deletion unit 170 branches toward "YES" and proceeds to Step S517. With each transition to Step S517, rule deletion unit 170 selects one of these five rules in descending order, this being in the order R7, R6, R4, R3, and R2 in this case. The rule selected in Step S517 is N. When the process first transitions to Step S517 and a rule is selected, rule R7 is selected and rule R7 therefore becomes rule N. In Step S518, rule deletion unit 170 next determines whether rules other than rule N are the leading rules in the matrix data of matrices that make up rule N (R7 in this case). Because matrix data that take R1, R2, and R6 as leading rules exist within the matrix data of rule R7, the process branches toward "YES" in Step S518 and proceeds to Step S519.

In Step S519, rule deletion unit 170 determines whether rule N can be reduced for a particular dimension (attribute). For example, rule deletion unit 170 should investigate whether, in the region represented by matrix data that are the matrix data of the matrices that make up rule N and for which rules other than rule N are the leading rules, i.e., the overlap region, a range exists in which all attributes other than attributes that correspond to a particular dimension O match with the range of attributes originally designated by rule N. If such a range exists, rule N can be reduced for dimension O. Focusing attention on the region (7, 8, 3, 11, omitted) that is represented by matrix data that are the matrix data of matrices that make up rule N (R7) and for which rule R6, which is other than rule N, is the leading rule: the range of the second attribute in this region is 3 to 11, and this matches with 3 to 11 that has been originally designated as the range of the second attribute in R7. It is assumed that matching similarly occurs regarding the third and succeeding attributes. This being the case, the range of region (7, 8, 3, 11, omitted) relating to all attributes other than the first attribute matches with the range originally designated in R7. As a result, rule deletion unit 170 determines in Step S519 that R7 can be reduced for the first attribute, branches toward "YES," and proceeds to Step S520. In Step S520, rule deletion unit 170 amends the range of the first attribute of rule R7 from the original "1 to 8" to "1 to 7" such that the above-described region (7, 8, 3, 11, omitted) is eliminated. As a result, rule R7 is reduced for the first attribute. The process then proceeds to Step S516.

When R6 is next selected in Step S517, the process branches toward "YES" in the determination of Step S518. However, in the region represented by matrix data that are the matrix data of matrices that make up rule R6 and for which rules other than rule R6 are the leading rules, i.e., the overlap region, there are no regions in which all attributes other than a particular attribute match with the range of the attributes originally designated in rule R6. The process therefore branches toward "NO" in Step S519 and proceeds to Step S516 without the carrying out the reduction of R6. The operations when R4 is next selected in Step S517 are similar to those when R6 is selected.

When rule deletion unit 170 selects R3 in Step S517, there are no rules in which rules other than rule N (R3 in this case) are the leading rules in the matrix data of the matrices that make up rule N. The process therefore branches toward "NO" in Step S518 and proceeds to Step S516 without carrying out reduction of R3. The operations when R2 is next selected in Step S517 are similar to the operations when R3 is selected.

FIG. 51 shows a schematic representation of the rule set (R2, R3, R4, R6, R7, R9) at the time of completion of the above-described process.

Since there are no remaining rules when the process proceeds to Step S516 after R2 has been selected, rule deletion unit 170 branches toward "NO" in Step S516, supplies from output device 930 information on the rule sets stored in the buffer and the deleted rules and information on rules that have been reduced, and ends the process. FIG. 52 shows an example of the display when output device 930 is a display device and information on the sets of rules stored in the buffer and the deleted rules and information on rules that have been reduced are supplied as display output.

No particular limitations apply to the mode of output of the processing results of rule deletion unit 170, i.e., the rule sets remaining in the buffer, information on the rules that have been deleted, and information on the rules that have been reduced; and these results may be supplied as display output or as audio output, or may be supplied as a file. Alternatively, output device 930 may be provided in a separate system connected to rule analysis system 100 by way of a communication network, and the processing results realized by rule deletion unit 170 may be supplied in this separate system. In this case, the processing results can be reported to users of the separate system connected to rule analysis system 100 by way of the communication network.

In the above-described example, rule R2 is not deleted, as shown in FIGS. 51 and 52. Properly, R2 should be deleted for the same reason that rule R1 is deleted. In the procedure of rule deletion unit 170 shown in FIGS. 35 to 37, R2 cannot be deleted. However, the loop process that begins from Step S508 and returns to Step S508 may be repeated until rules that can be deleted no longer exist, and when the process branches toward "NO" in Step S516, the process may be again started from Step S502 and the processes of Step S502 and succeeding steps repeated until the deletion or amendment of rules can no longer be carried out. Repeating the processes of rule deletion unit 170 in this way enables the easy deletion of rules that remain such as R2 shown in FIG. 51.

Explanation next regards the advantages of the filtering rule analysis system of the fifth exemplary embodiment. The filtering rule analysis system of the fifth exemplary embodiment enables the deletion of unnecessary rules and the amendment of redundant rules regardless of the complexity of the filtering rules. This capability is realized because the rules are converted to matrix spatial data and the matrices that make up any rule are exhaustively investigated, whereby rules that are completely concealed by other rules are deleted and rules that are partially concealed by other rules are amended.

In the reduction method in the fifth exemplary embodiment, the number of rules does not change. For example, FIG. 50 shows rules before reduction, and FIG. 51 shows rules after reduction, but in either case, the number of rules is six and the number of rules before and after reduction of R7 does not change. Rule deletion unit 170 may obtain the same result as reduction by dividing one rule for each matrix that makes up that the rule to generate a plurality of rules and then delete rules that are concealed by other rules. FIG. 53 is an explanatory view showing an example of this case.

A portion of the region of rule R3 is concealed by rules R1 and R2 that have a higher order of priority. The ranges of each of the attributes in the overlap region between R3 and R1 do not match the ranges of the attributes designated by original R3. As a result, R3 cannot be reduced such that the overlap region between R3 and R1 is eliminated in the already described reduction method. Similarly, R3 cannot be reduced such that the overlap region between R3 and R2 is eliminated.

However, rule deletion unit 170 may divide rule R3 for each of the matrices that make up rule R3. In the example shown in FIG. 53, rule R3 is made up of nine matrices, and rule deletion unit 170 therefore creates nine rules from rule R3. Of these nine rules, one rule is concealed by R1, and another rule is concealed by R2. Of the divided rules, rule deletion unit 170 should delete those rules that are concealed by other rules, whereby R3 is reduced such that, of the regions of rule R3, the regions of overlap with R1 and R2 are eliminated. However, dividing rule R3 to create nine rules and then deleting two of these rules leaves seven rules as the rule that was originally R3, and this reduction method therefore increases the number of rules.

Sixth Exemplary Embodiment

Figure 54:
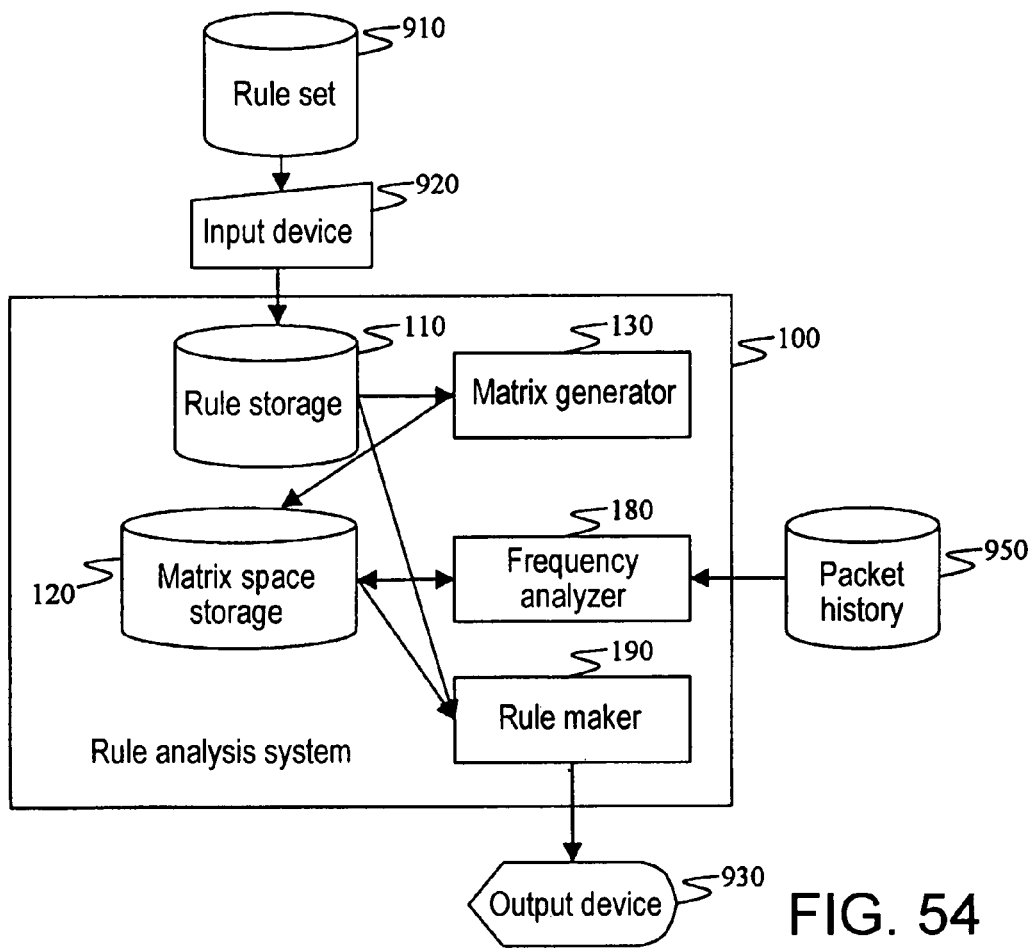
FIG. 54 is a block diagram showing the filtering rule analysis system according to the sixth exemplary embodiment of the present invention.

Explanation next regards the filtering rule analysis system of the sixth exemplary embodiment of the present invention. In FIG. 54 that shows the filtering rule analysis system of the sixth exemplary embodiment, constituent elements that are the same as elements in the first exemplary embodiment are given the same reference numbers as in FIG. 1, and redundant explanation is here omitted.

The filtering rule analysis system of the sixth exemplary embodiment is similar to the system shown in FIG. 1, but differs from the first exemplary embodiment in that frequency analyzer 180 and rule maker 190 are provided in place of the overlap analyzer in rule analysis system 100. Packet history 950 is also applied as input to rule analysis system 100. Packet history 950 is history information regarding packets that have become the object of packet filtering process in the network system that is actually implementing packet filtering processes, or in other words, packets that have actually arrived in devices that perform packet filtering processes in a network system. However, this packet history 950 (the history information of packets) may include information on attributes of each packet that has actually become the object of a packet filtering process and need not include information regarding the payload portion of each packet. Packet history 950 may include information on packets of a fixed amount that have actually become the objects of the packet filtering process.

Frequency analyzer 180 receives packet history 950 as input and refers to the attributes of packets that have actually become the objects of the packet filtering process. Frequency analyzer 180 adds to matrix data that have been generated information on the frequency of packets that indicates the number of packets contained in the ranges of attributes of the matrix data.

Based on the matrix data to which frequency information has been added, rule maker 190 creates rules that accord with the packets that have actually become the objects of the packet filtering process. Then, using these rules, rule maker 190 creates a new rule set.

Frequency analyzer 180 and rule maker 190 may be realized by, for example, a CPU that operates in accordance with a program. The program may be stored in, for example, a program storage device (not shown) provided in rule analysis system 100.

Explanation next regards the operations of the filtering rule analysis system of the sixth exemplary embodiment. Detailed explanation is omitted regarding operations that are similar to the first exemplary embodiment. The operations of input device 920 and matrix generator 130 up to the storage of matrix spatial data in matrix space storage 120 are the same as in the first exemplary embodiment.

Figure 55:
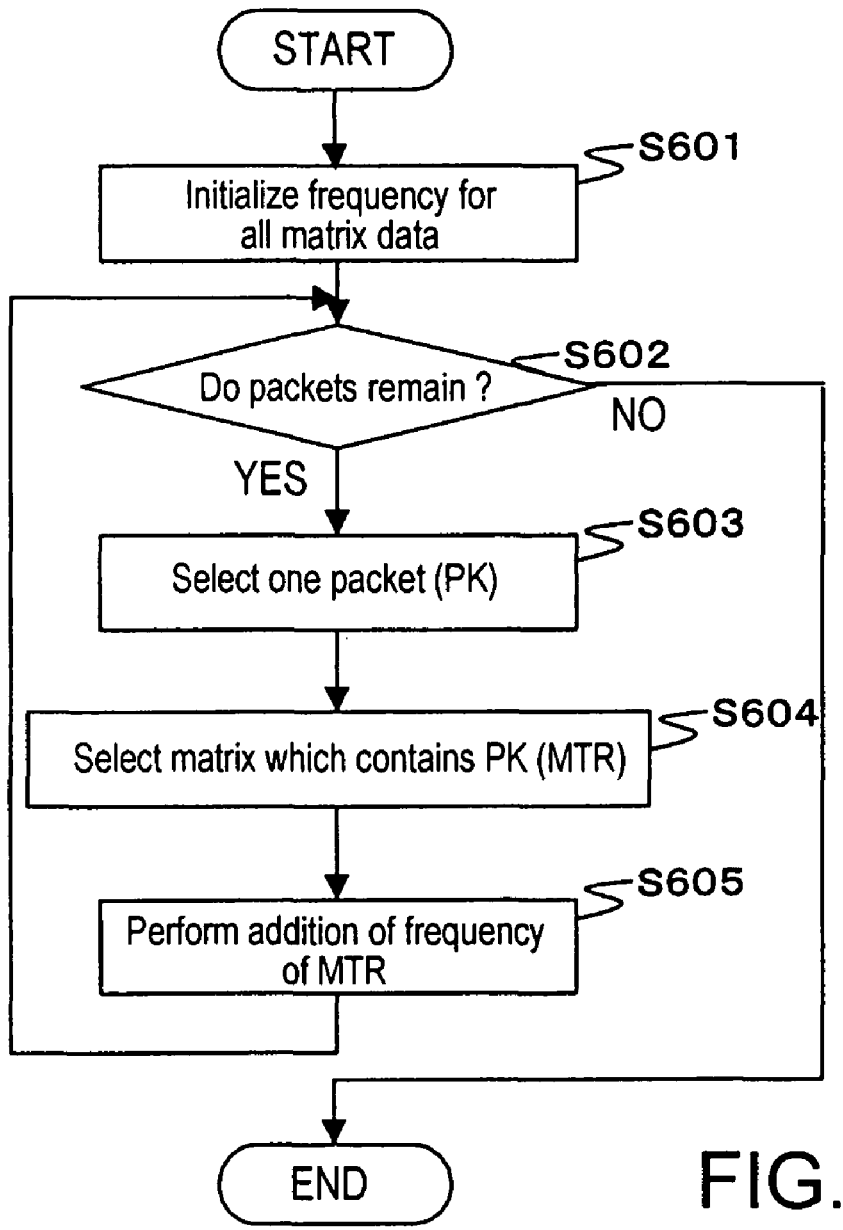
FIG. 55 is a flow chart showing an example of the process realized by the frequency analyzer.

After matrix spatial data have been stored in matrix space storage 120, frequency analyzer 180 receives in order information of each of the packets contained in packet history 950. Frequency analyzer 180 examines each packet contained in packet history 950, and more specifically, examines the attributes one at a time of each packet, and adds frequency information to the matrix data. FIG. 55 shows an example of the process realized by frequency analyzer 180. In Step S601, frequency analyzer 180 first adds an initial value of frequency information to all matrix data that are contained in the matrix spatial data recorded in matrix space storage 120. Frequency analyzer 180 should here add "0" as the initial value of the frequency information at the end of all matrix data.

Frequency analyzer 180 next selects packets one at a time from packet history 950 to carry out the series of processes of Steps S602 to S605 and repeats to subject all packets contained in packet history 950 to the series of processes.

In Step S602, frequency analyzer 180 determines whether still unselected packets remain in packet history 950. If packets remain, frequency analyzer 180 selects a still unselected packet from among packet history 950 in Step S603. The packet selected in Step S603 is PK. In Step S604, frequency analyzer 180 selects matrices that contain packet PK, i.e., matrix data that contain attributes of packet PK in the range of attributes, from among the matrix spatial data. The matrix data that are selected in Step S604 is MTR. In Step S605, frequency analyzer 180 then adds 1 to the frequency information of selected matrix data MTR and proceeds to Step S602. However, if it is determined in Step S602 that packets do not remain, frequency analyzer 180 ends the process.

In the above-described process, information indicating how many packets are contained in each matrix, or in other words, the quantity of packets in which attributes are contained within the range of the attributes of each item of matrix data is added as frequency information to the end of the matrix data.

Figure 56:
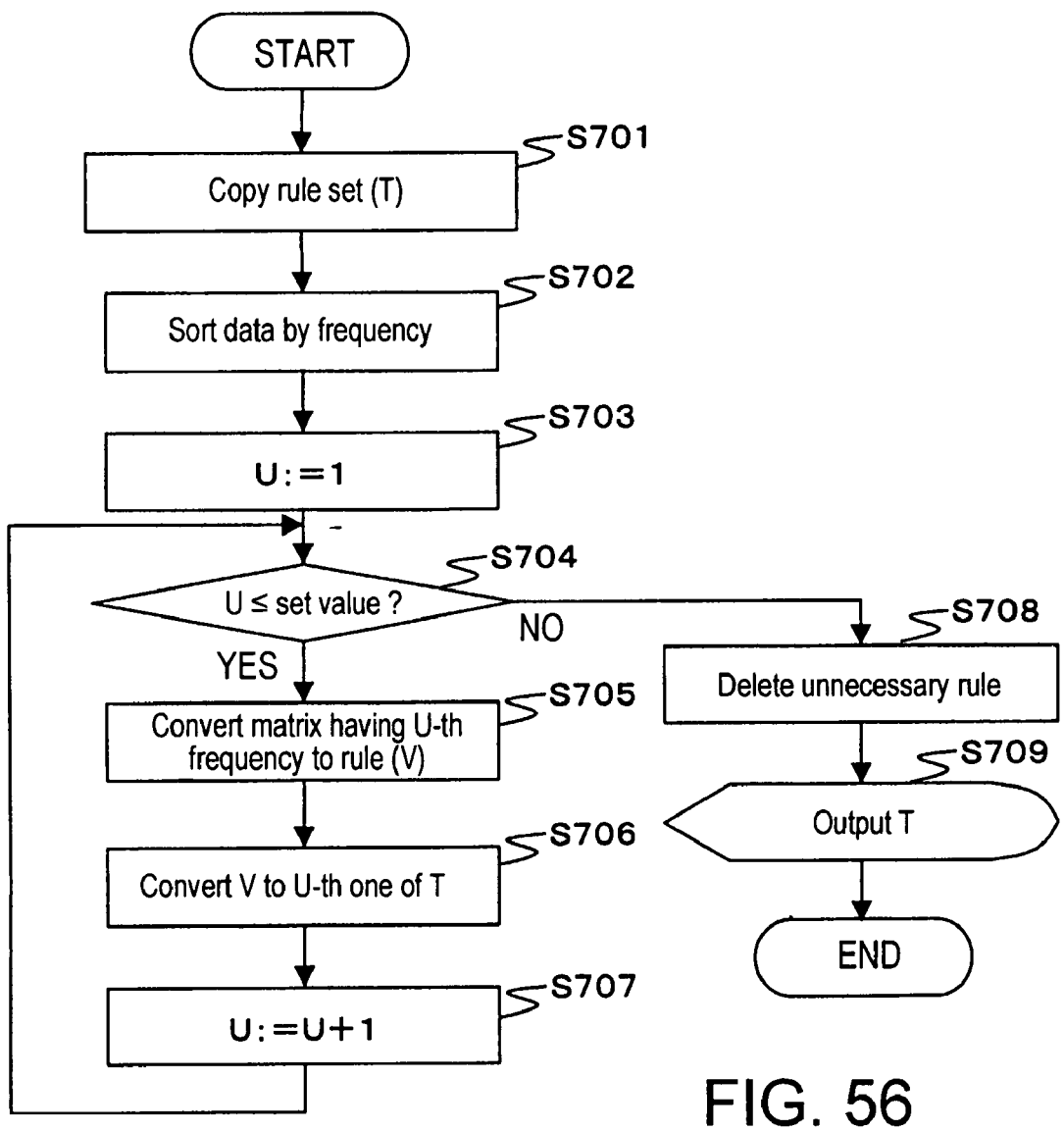
FIG. 56 is a flow chart showing an example of the new rule set creation process realized by the rule maker.

When frequency information is added to the matrix data by frequency analyzer 180, rule maker 190 next creates a new rule set. Two types of different methods are here presented as the methods for the process of creating new rule sets realized by rule maker 190. These methods are shown in FIGS. 56 and 57. However, the process realized by rule maker 190 is not limited to these two types of methods, and rule maker 190 may create rule sets by other methods.

FIG. 56 shows an example of the process for creating a new rule set that is realized by rule maker 190. In this method, rule-maker 190 first copies a rule set stored in rule storage 110 to a buffer (not shown) in Step S701. The rule set that is copied to the buffer in Step S701 is T. In Step S702, rule maker 190 next sorts the matrix data stored in matrix space storage 120 in the order of larger frequency information values, and next, in Step S703, sets the initial value of variable U to 1. Variable U is a variable used for extracting matrix data up to a prescribed order from among matrix data that have been sorted in order from greater frequency information values. When the value of variable U does not exceed a predetermined set value, rule maker 190 repeats the loop process of Steps S704 to S707. This predetermined set value is a value that indicates the above-described prescribed order and is determined as a value under the total number of items of matrix data. This set value is set in advance by the user of rule analysis system 100 or by rule analysis system 100.

In the loop process of Steps S704 to S707, rule maker 190 first determines whether variable U does not exceed the predetermined set value in Step S704. If variable U does not exceed the set value, rule maker 190 selects the U$^{th}$ item of matrix data from among the matrix data that have been sorted in Step S702 and converts the selected matrix data into the rule format. The rule obtained by the conversion of Step S705 is V. Matrix data are described by the format of (region, rule list, frequency). Rules are described by the format of (region, action). Accordingly, in Step S705, rule maker 190 should extract the region of the matrix data, i.e., the range portion of each attribute, and then create rule V by adding the action of the leading rule of the rule list to the region. In Step S706, rule maker 190 next inserts rule V as the U$^{th}$ rule of rule set T and successively shifts back by 1 the order of each rule that was U$^{th}$ and succeeding rules before the insertion. In Step S707, rule maker 190 next adds 1 to variable U and proceeds to Step S704.

If variable U exceeds the set value in Step S704, i.e., if the process branches toward "NO" in Step S704, the process transitions to Step S708. In Step S708, unnecessary rules are deleted from the rules contained in the original rule set T, i.e., the rule set T in the state that was copied in Step S701. The conditions for deleting rules that exist from the time of copying in Step S701 are as follows: Rules (R_original) that exist from the time of copying in Step S701 are deleted under the condition that new rules are created from the matrix data of all matrices that make up R_original, and all of these newly created rules are inserted as rules having a higher order of priority than R_original. Rule maker 190 determines for each of the rules whether the above-described deletion conditions are met from the time of copying in Step S701 and deletes rules that meet the deletion conditions. In Step S709, rule maker 190 then supplies from output device 930 rule set T from which unnecessary rules have been deleted in Step S708.

FIG. 57 shows another example of the process of creating a new rule set that is realized by rule maker 190. In the method shown in FIG. 57, the same number of rules is created as the total number of items of matrix data. In the method shown in FIG. 57, processes of the method shown in FIG. 56 such as copying of the rule set (Step S701) and the deletion of rules (Step S708) are not carried out. In the method shown in FIG. 57, rule maker 190 first sorts in Step S801 the matrix data stored in matrix space storage 120 in the order of greater frequency information values. This process is the same as Step S702 of FIG. 56. In Step S802, rule maker 190 next prepares rule set W, which is an empty set. In Step S803, rule maker 190 then converts each of the matrix data in the order of the sorting results in Step S801, i.e., in the order of greater frequency information values, to create new rules, and adds these rules to rule set W in the order of their creation. The process of creating new rules in Step S803 is similar to the process of creating rule V in Step S705 of FIG. 56. After creating rules based on all matrix data and adding each of the created rules to rule set W, rule maker 190 supplies rule set W from output device 902 in Step S804.

The procedures of frequency analyzer 180 shown in FIG. 55 are only one example. Other procedures can be adopted for obtaining similar results. The procedures of rule maker 190 shown in FIGS. 56 and 57 are also only examples, and other procedures can be adopted for obtaining similar results. Rule maker 190 may obtain similar results to the procedures shown in FIGS. 56 and 57 by procedures that differ from FIGS. 56 and 57.

In the processes of rule maker 190 shown in FIGS. 55 and 57, rule making is carried out in matrix data units as shown in Step S705 and Step S803. Before carrying out rule making, a plurality of items of matrix data, which are matrix data of matrices that are adjacent to each other and which have close frequency information values, may be combined to create new matrix data, and rules may be created from the newly created matrix data. The process of creating rules from matrices that have been combined is similar to the process of creating rule V in Step S705. When combining matrix data, combining should be implemented under the condition that, for example, the following three conditions are satisfied. As the first condition, each attribute of matrices obtained by combining matrices that are adjacent to each other are represented by pairs of boundary points. As the second condition, the values of the frequency information of each item of matrix data that is to be combined are close. In other words, the difference between the maximum value and minimum value of frequency information of each item of matrix data that is to be combined is no greater than a prescribed threshold value. As the third condition, the action of the leading rules of each item of matrix data to be combined must be shared.

For example, in the case of two-dimensional matrices shown in FIG. 58, matrices 1 and 2 are adjacent, and when the matrix data of matrices 1 and 2 are combined, each attribute can be represented by pairs of boundary points. In this example, the attributes can be represented by the pair of "0" and "2" and the pair of "1" and "2," and matrices 1 and 2 therefore satisfy the first condition. If the difference in frequency information values of the matrix data of matrices 1 and 2 is no greater than a prescribed threshold value, the second condition is satisfied. If the actions of the leading rules of the matrix data of matrices 1 and 2 are shared, the third condition is satisfied. If all three conditions are satisfied, rule maker 190 may combine the matrix data of matrices 1 and 2 and may create rules from the matrix data obtained by this combination. Matrix 3 shown in FIG. 58 is not adjacent to either of matrices 1 and 2 or matrix 4, and therefore does not satisfy the third condition. Matrix 3 therefore cannot be combined with matrices 1 and 2 or matrix 4. Similarly, matrix 4 shown in FIG. 58 cannot be combined with matrices 1 and 2 or with matrix 3.

In the present exemplary embodiment, the number of rules that are finally created may be limited, and rules may be created by combining matrix data in these ranges.

Explanation next regards the operations of the filtering rule analysis system of the sixth exemplary embodiment using a concrete example. It is here assumed that a rule set composed of rules R1 and R2 shown in FIG. 59 by way of example is applied as rule set 910 (see FIG. 54) and stored in rule storage 110. It is further assumed that matrix spatial data are created based on this rule set and stored in matrix space storage 120. The processes up to the storage of matrix spatial data in matrix space storage 120 are the same as in the first exemplary embodiment. Each rule is shown schematically in FIG. 59. In the present example, frequency analyzer 180 is assumed to receive as input the packet history shown in FIG. 60 by way of example. The packet history contains information of attributes of the packets that are the actual objects of the packet filtering process. Accordingly, the information of these attributes shows the values of each attribute and do not indicate the range of each attribute such as the first attribute. In the example shown in FIG. 60, the values of the first attribute and second attribute are shown. In this example, packet information of this type is assumed to include 1000 items from H1 to H1000.

Figures 62, 63, 64:
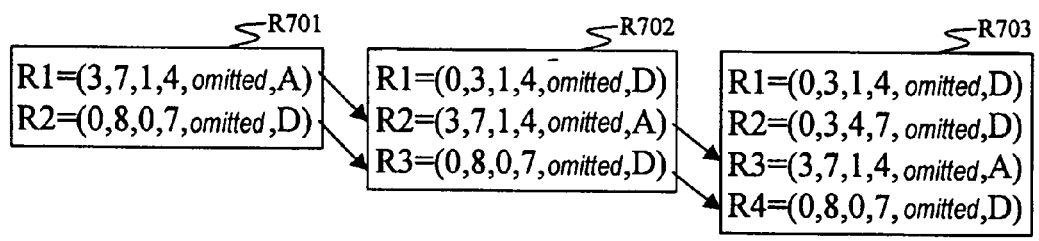
FIG. 62 is a view showing an example of matrix data obtained by the processing of the frequency analyzer.
FIG. 63 is a view showing the change of a rule set copied to a buffer.
FIG. 64 is a view showing an example of a newly generated rule set.

FIG. 61 is a schematic view showing matrix data that have been created based on the rule set shown in FIG. 59 represented on a two-dimensional plane. The created matrix data correspond to the nine matrices M1 to M9 shown in FIG. 61. Frequency analyzer 180 uses the nine items of matrix data that were created and the packet history (see FIG. 60) that was received as input to execute the processes shown in FIG. 55. FIG. 62 shows an example of the matrix data obtained as a result of these processes. In the processes shown in FIG. 55, frequency analyzer 180 adds the frequency information to the end of each item of matrix data as shown by the underlining in FIG. 62.

Rule maker 190 copies the rule set to the buffer in Step S701 shown in FIG. 56. Rule maker 190 then sorts the matrix data based on the frequency information shown by the underlined portions in FIG. 62, and in Step S702 shown in FIG. 56, orders each item of the matrix data. This order is also shown in FIG. 62. In the present example, the set value used in the determination of Step S704 is assumed to be "2."

FIG. 63 shows the change in rule set T that is copied to the buffer. When copied in Step S701, rule set T is in state R701 shown in FIG. 63.

The value of variable U when the process first moves to Step S704 is "1." The set value of variable U is therefore no greater than 2, whereby the process branches toward "YES" in Step S704, and rule maker 190 generates rule V from the matrix data having the order of "1" (the value of variable U) in Step S705. The matrix data for which the order is first, i.e., the matrix data for which the frequency information value is greatest, is M4 shown in FIG. 62 in this case. When rule V is created based on this matrix data M4, rule V=(0, 3, 1, 4, omitted, D). This rule V is created by extracting the information (0, 3, 1, 4, . . . ) of the region (i.e., the range of each attribute) from matrix data M4 and adding action D of leading rule R2 (see FIG. 59). Rule maker 190 next inserts rule V as the first rule into rule set T, and in Step S706, shifts one place back each of the rules that were first and in succeeding places before the insertion. The state of rule set T at this time is state R702 shown in FIG. 63. In Step S707, rule maker 190 next adds "1" to variable U to set the value to "2."

When the process next moves to Step S704, the value of variable U is "2," and because this value is not greater than the set value 2, the process branches toward "YES" in Step S704, and rule maker 190 creates rule V from the matrix data for which the order is 2 (the value of variable U) in Step S705. Matrix data for which the order is second, i.e., matrix data for which the frequency information value is the second largest, is M7 shown in FIG. 62. When rule V is created based on these matrix data M7, rule V=(0, 3, 4, 7, omitted, D). Rule maker 190 inserts this rule V into rule set T as the second rule in Step S706 and shifts back by one place each of the rules that were in second and succeeding places before the insertion. The state of rule set T at this time is state R703 shown in FIG. 63. Rule maker 190 adds "1" to variable U to make the value of U "3" in Step S707.

When the process next moves to Step S704, the value of variable U is "3," which exceeds the set value "2," whereby the process moves to Step S708. In Step S708, rule maker 190 determines whether to delete rules R1 and R2 (see FIG. 59) that have existed from the time of copying in Step S701 and deletes the rules for which deletion is determined from rule set T. New rules are created from the matrix data of all matrices that make up R1, and because all of these newly created rules are not to be inserted as rules having a higher order of priority than R1, R1 is not deleted. Similarly, R2 is also not deleted. Thus, in the present example, rules are not deleted in Step S703.

The value of the frequency information in matrix data M5 is high and it is here assumed that data created based on matrix data M5 have been inserted as rules having a higher order of priority than rule R1, whereupon a new rule is created from matrix data M5 of all matrices that make up rule R1 and the rule is inserted as a rule having a higher order of priority than R1. All matrices in this case are just one matrix. In this case, rule maker 190 determines to delete R1 in Step S708 and deletes R1. In this case, the rule that was created based on matrix data M5 and inserted is a rule identical to R1 that originally existed. In this explanation, a case is shown in which the region of matrix data M5 is identical to the region of rule R1, but even when there are a plurality of matrices that make up rules, rules R_original are similarly deleted if the above-described condition "New rules are created from matrix data of all matrices that make up rules R_original that have existed from the time of copying in Step S701 and all of these newly created rules are inserted as rules having a higher order of priority than R_original" is satisfied.

Rule maker 190 supplies rule set T from output device 930 after Step S708. In the present example, rule maker 190 supplies rule set T of state R703 shown in FIG. 63.

In the preceding explanation, the process of Step S708 is included in the procedure shown in FIG. 56, but a process may be carried out similar to the process by which rule deletion unit 170 deletes concealed rules in the fifth exemplary embodiment in place of the process of Step S708.

When executing the process shown in FIG. 57 instead of the process shown in FIG. 56, rule maker 190 sorts each item of matrix data shown in FIG. 62 in Step S801. The order of each item of matrix data in the result of this sorting is as shown in FIG. 62. In Step S803, rule maker 190 creates the first rule R1=(0, 3, 1, 4, omitted, D) from the first item of matrix data M4 and adds this to rule set W, and similarly, creates the second rule R2=(0, 3, 4, 7, omitted, D) from the second item of matrix data M7 and adds this to rule set W. In the same way, rule maker 190 subsequently creates the ninth rule R9 from the ninth item of matrix data and adds to rule set W. FIG. 64 shows rule set W that is the result obtained by this process. In Step S804, rule maker 190 supplies rule set W shown in FIG. 64 from output device 930.

No particular limitations apply to the output mode of the processing results realized by rule maker 190, i.e., the rule set that has been created, the output being possible as display output or audio output or by output as a file. Alternatively, output device 930 may be provided in a separate system connected to rule analysis system 100 by way of a communication network, and the rule set may be supplied as output in this separate system. In this case, the rule set can be reported to users of the separate system that is connected to rule analysis system 100 by way of a communication network.

Explanation next regards the advantages of the filtering rule analysis system of the sixth exemplary embodiment. The filtering rule analysis system of the sixth exemplary embodiment enables a high-speed filtering process regardless of the complexity of the filtering rules. This capability is achieved because the rules are converted to matrix spatial data, the frequency of these matrices calculated from packet history, and the order of matrices then altered according to the order of frequency, whereby rule sets are amended and each of the rules re-created to produce new rule sets such that packets having attributes similar to those of packets that have arrived in the past in numerous network devices that implement packet filtering processes can be matched by rules having a high order of priority.

Seventh Exemplary Embodiment

Explanation next regards the filtering rule analysis system of the seventh exemplary embodiment of the present invention. This filtering rule analysis system is of a configuration similar to that of the filtering rule analysis system of the first exemplary embodiment shown in FIG. 1, but the operations of matrix generator 130 differ. Explanation of the filtering rule analysis system of the seventh exemplary embodiment is presented with reference to FIG. 1. In addition, each constituent element other than matrix generator 130 is the same as the case of the first exemplary embodiment, and explanation is therefore here omitted.

In the present exemplary embodiment, matrix generator 130 executes the processes of Steps S101 to S108 similar to the case of the first exemplary embodiment, but also executes a process of deleting matrix data in which only the default rule, and more specifically, only a rule name of the default rule, is added as a rule list from among the matrix spatial data that have been created. The seventh exemplary embodiment differs from the first exemplary embodiment in this point of implementing a process for deleting matrix data.

Figure 65:
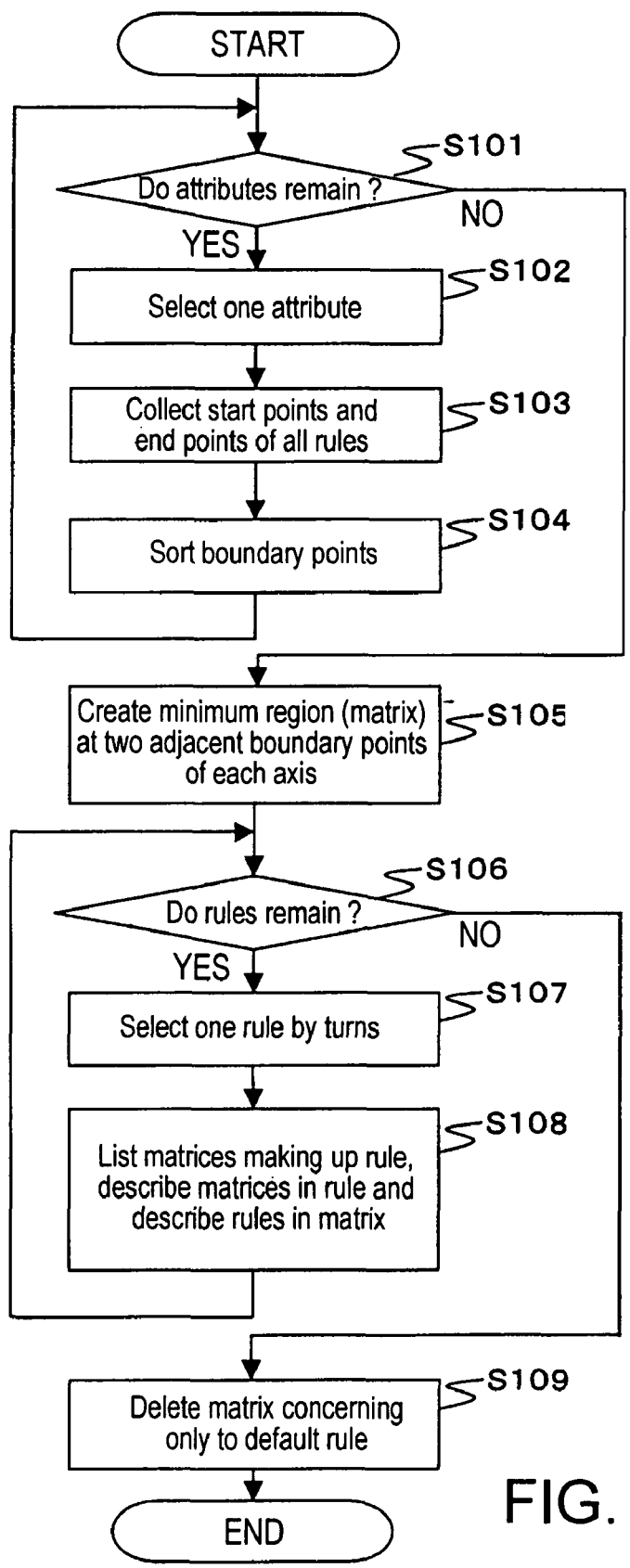
FIG. 65 is a flow chart showing an example of the operations of the matrix generator in the filtering rule analysis system according to the seventh exemplary embodiment of the present invention.

FIG. 65 shows an example of matrix generator 130 in the seventh exemplary embodiment. Matrix generator 130 uses the rule set stored in rule storage 110 to create matrix spatial data as shown in Steps S101 to S108. The processes of Steps S101 to S108 for creating matrix spatial data are processes similar to Steps S101 to S108 (see FIG. 2) explained in the first exemplary embodiment. When it is determined in Step S106 that no rules remain, the process branches toward "NO" in Step S106, and matrix generator 130 in Step S109 deletes, from among matrix data created up to the determination that no rules remain, those matrix data to which only the default rule has been added as a rule list. For example, if it is assumed that the rule list added to matrix data M001 is {R1, R7, R8}, the rule list added to matrix data M002 is {R8}, the rule list added to matrix data M003 is {R6, R8}, and the rule name of the default rule is R8, then the matrix data to which only the default rule has been added as a rule list are M002, and matrix generator 130 therefore deletes matrix data M002 from among the matrix data that have been created up to the determination that rules no longer remain. If other matrix data exist in which only the default rule has been added as a rule list, matrix generator 130 also deletes these matrix data.

Matrix generator 130 causes the matrix spatial data that have been obtained as a result of the processes from Steps S101 to S109 shown in FIG. 65 to be stored in matrix space storage 120. After matrix generator 130 causes the storage of matrix spatial data in matrix space storage 120, overlap analyzer 140 refers to the matrix spatial data that have been stored in matrix space storage 120, discovers the overlap between rules, and uses the output device 930 to supply these results as output. These processes of overlap analyzer 140 are similar to the case of the first exemplary embodiment and explanation is therefore here omitted.

Explanation next regards the operations of the filtering rule analysis system of the seventh exemplary embodiment using a concrete example. Explanation regards a case explained in the first exemplary embodiment in which the rule set shown in FIG. 5 is stored in rule storage 110. As shown in the example shown in the first exemplary embodiment, matrix generator 130 subjects the rule set shown in FIG. 5 to the processes of Steps S101 to S108, whereby rule data shown in FIG. 9 and the matrix data shown in FIG. 10 are generated. Upon determining that rules no longer remain in Step S106, matrix generator 130 in the present exemplary embodiment in Step S109 deletes the matrix data to which only the default rule has been added as a rule list.

Figures 66, 67:
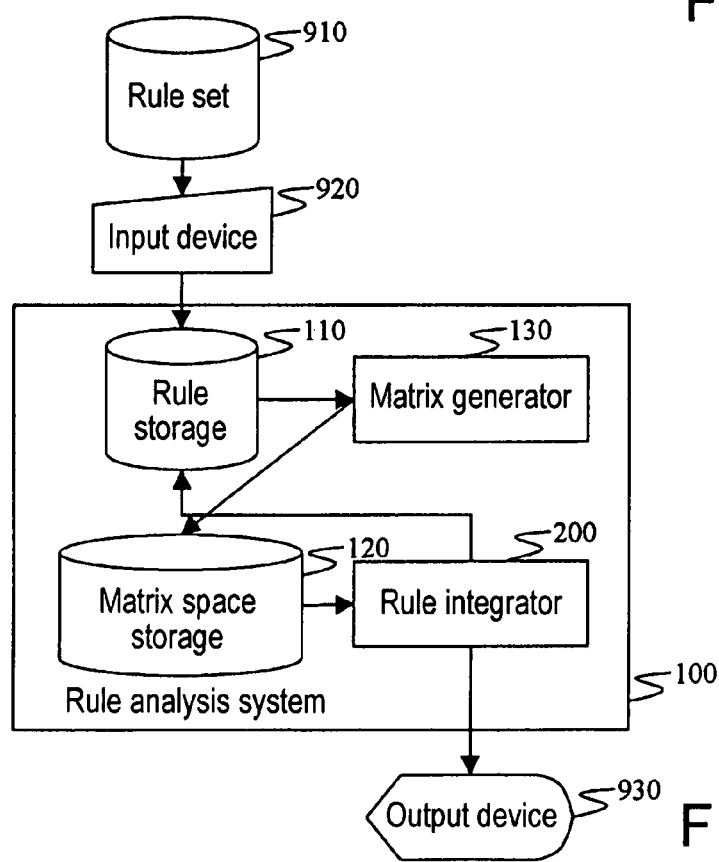
FIG. 66 is a view showing an example of matrix data to be deleted.
FIG. 67 is a block diagram showing the filtering rule analysis system according to the eighth exemplary embodiment of the present invention.

FIG. 66 shows an example of matrix data that are deleted. Among the matrix data shown by way of example in FIG. 66, matrix data to which only the default rule (R8 in this case) has been added as a rule list are M001, M013, M014, M130, and so on. Matrix generator 130 refers to the rule list of each item of matrix data and deletes these matrix data to which only the default rule has been added. The matrix data shown in FIG. 66 are a portion of all items of matrix data, and FIG. 66 does not show all matrix data that are deleted.

Explanation next regards the advantages of the filtering rule analysis system of the seventh exemplary embodiment. The filtering rule analysis system of the seventh exemplary embodiment enables the comprehension of the relations between each of the rules even when rule sets have a multiplicity of complex filtering rules. This capability is achieved because matrix data that are related only to the default rule that has no relation to comprehending the relations between rules are deleted from generated matrix data, thereby enabling a reduction of the number of items of matrix data despite the inclusion of a multiplicity of rules in the rule sets. Because the number of items of matrix data can be reduced, the consumption of computer memory can also be reduced.

In the seventh exemplary embodiment, a case has been shown in which the process of Step S109 is added to the matrix spatial data creation process in the first exemplary embodiment. In the explanation of the above-described fifth exemplary embodiment and sixth exemplary, the operations of matrix generator 130 are similar to the first exemplary embodiment, but matrix generator 130 may also execute the process of Step S109 as shown in FIG. 65 in the matrix spatial data creation process in the fifth exemplary embodiment and sixth exemplary embodiment. In the second exemplary embodiment as well, matrix generator 130 may add the process of Step S109 of FIG. 65 to the matrix spatial data creation process. In this case, however, pass test unit 150 (see FIG. 14) determines before the process of Step S301 (see FIG. 15) if all matrix data of matrices that contain test packets remain without being deleted, if only a portion is deleted and the remaining portion is maintained, or if all are deleted. When pass test unit 150 determines that all matrix data of matrices containing test packets remain without being deleted, pass test unit 150 may then simply execute the processes of Step S301 and succeeding steps (see FIG. 15).

Upon determining that only a portion of the matrix data of matrices that contain test packets are deleted and a portion remains, pass test unit 150 may execute the processes of Step S301 and succeeding steps (see FIG. 15) taking as objects the items of matrix data that remain undeleted. Pass test unit 150 may display which packets of the test packets are to be passed or not passed according to the action of the default rule for regions in which matrix data do not remain. For example, it is assumed that the matrix data that remain undeleted are subjected to the processes of Step S301 and succeeding steps, and that the display "the regions of (6, 8, 6, 9, omitted) are to be passed" and "the regions of (8, 9, 6, 9, omitted) are not to be passed" is carried out. Of the test packets in this case, pass test unit 150 may display, for example, "other regions" for regions in which matrix data do not remain, "passage for other regions" when the action of the default rule is "A," and "no passage for other regions" when the action of the default rule is "D."

Upon determining that all matrix data of matrices that contain test packets are deleted, pass test unit 150 may display, for example, "test packets pass" if the action of the default rule is "A," and may display "test packets do not pass" if the action of the default rule is "D."

In the third exemplary embodiment as well, matrix generator 130 may add the process of Step S109 shown in FIG. 65 to the matrix spatial data creation process. In the third exemplary embodiment, however, because the rules of a plurality of rule sets are added as a rule list as shown by way of example in FIG. 23, when the process of Step S109 is added to the matrix spatial data creation process in the third exemplary embodiment, matrix generator 130 deletes matrix data in which only the default rule of each of the plurality of rule sets used in the creation of matrix spatial data has been added to rule lists. For example, it is assumed that the plurality of rule sets used in the creation of matrix spatial data are rule sets R100 and R200 shown in FIG. 22. The default rule of rule set R100 is R13, and the default rule of rule set R200 is R22. Accordingly, in the present example, matrix generator 130 should delete the matrix data in which only R13 and R22 have been added as rule lists.

When the process of Step S109 is added in the third exemplary embodiment, pass test unit 151 (see FIG. 19) determines before the process of Step S301 (see FIG. 20) whether all matrix data of matrices that contain test packets remain without being deleted, whether only a portion have been deleted and a portion remains, or whether all have been deleted. If all matrix data of matrices that contain test packets remain without being deleted, pass test unit 151 should simply execute the processes of Step S301 and succeeding steps (see FIG. 20).

On the other hand, if it determines that only a portion of the matrix data of matrices that contain test packets has been deleted and a portion remains, pass test unit 151 should execute the processes of Step S301 and succeeding steps (see FIG. 20) taking as objects the matrix data that remain undeleted and should implement display such as shown by way of example in FIG. 24 regarding the regions of these matrix data. Pass test unit 151 then proceeds by referring to the action of the default rule of each rule set in order of the rule sets for regions for which matrix data do not remain of the test packets. When the action of the default rule is "A," pass test unit 151 refers to the action of the next default rule. If the action of the default rule is "D," pass test unit 151 should stop referring to the action of default rule at this point and implement the display of "no passage for other regions in the test packets" and so on. When referring to the default rule of the final rule set, pass test unit 151 should display, for example, "passage for other regions in test packets" if the action of the default rule is "A," and should display, for example, "no passage for other regions in test packets" if the action of the default rule is "D."

Upon determining that all matrix data of matrices that contain test packets have been deleted, pass test unit 151 proceeds by referring to the action of the default rule of each rule set in the order of rule sets. When the action of the default rule is. "A," pass test unit 151 refers to the action of the next default rule. When the action of the default rule is "D," pass test unit 151 should stop referring to the action of the default rule at that point and display, for example, "no passage for test packets." When referring to the default rule of the final rule set, pass test unit 151 should display, for example, "test packets pass" if the action of the default rule is "A," and should display, for example, "test packets do not pass" if the action of the default rule is "D."

In the fourth exemplary embodiment as well, matrix generator 131 may add the process of Step S109 of FIG. 65 to the matrix spatial data creation process. In the fourth exemplary embodiment, in the process of creating matrix spatial data that correspond to one rule set, for example, Steps S112 and S113 shown in FIG. 27, the loop process of Steps S106 to S108 are repeated. Matrix generator 131 may execute a process similar to Step S109 shown in FIG. 65 at the end of the process for creating matrix spatial data that correspond to the one rule set.

When the process of Step S109 is added in the fourth exemplary embodiment, matrix data that correspond to the first selected set of matrix data in some cases cannot be selected from the second set of matrix spatial data in Step S403. This inability occurs because the addition of the process of Step S109 causes a portion of the matrix data to be deleted from the second set of matrix spatial data. In this case, sameness analyzer 160 should refer to the action of the default rule of the rule set that corresponds to the second set of matrix spatial data and investigate whether this action is identical to the action of the leading rule of the first set of matrix data that has been selected. The process following the determination of whether these two actions are identical is similar to Step S403. In some cases, a portion of the matrix data in the matrix spatial data that is taken as a standard is deleted by the process of Step S109. Accordingly, if it is determined that no rules remain in Step S401, sameness analyzer 160 takes as standard a still unselected item of the matrix data of the second set of matrix spatial data and repeats the process of Steps S401 to S403. However, the matrix data of the first set of matrix spatial data that correspond to a still unselected item of the matrix data of the second set of matrix spatial data are deleted by the process of Step S109, and sameness analyzer 160 should therefore, in Step S403, refer to the action of the default rule of the rule set that corresponds to the first set of matrix spatial data and investigate whether the action is identical to the action of the leading rule of the second selected set of matrix data that has been selected.

Eighth Exemplary Embodiment

Explanation next regards the filtering rule analysis system of the eighth exemplary embodiment of the present invention. In FIG. 67 that shows the filtering rule analysis system of the eighth exemplary embodiment, constituent elements identical to elements in the first exemplary embodiment are given the same reference numbers as in FIG. 1, and redundant explanation is here omitted. The filtering rule analysis system of the eighth exemplary embodiment is similar to the system shown in FIG. 1, but differs from the first exemplary embodiment in that a rule integrator is provided in place of the overlap analyzer in rule analysis system 100.

Rule integrator 200 refers to the matrix spatial data and, of the rules in the rule sets stored in rule storage 110, integrates the rules that are determined to be integratable. Rule integrator 200 is realized by, for example, a CPU that operates in accordance with a program. The program is stored in, for example, a program storage device (not shown) provided in rule analysis system 100.

Explanation next regards the operations of the filtering rule analysis system of the eighth exemplary embodiment. Detailed explanation is omitted regarding the operations that are similar to those of the first exemplary embodiment. The operations of input device 920 and matrix generator 130 are similar to the case of the first exemplary embodiment up to the storage of matrix spatial data in matrix space storage 120.

Figures 68, 69:
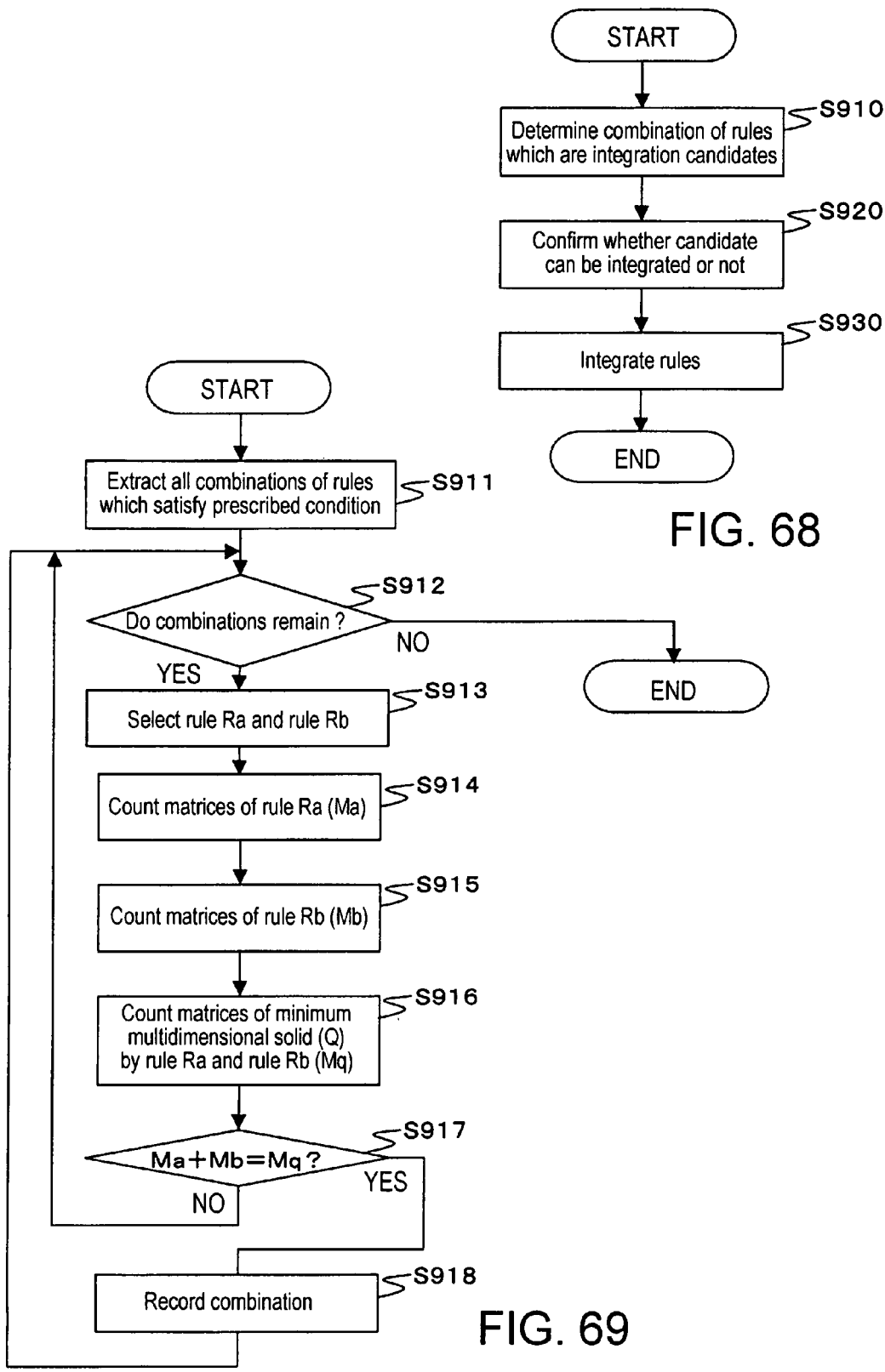
FIG. 68 is a flow chart showing an example of the progression of the rule integration process realized by the rule integrator.
FIG. 69 is a flow chart showing an example of the progression of the process of finding candidates for integration.

In this filtering rule analysis system, matrix generator 130 causes matrix spatial data to be stored in matrix space storage 120, and rule integrator 200 then executes processes for integrating rules. FIGS. 68 to 70 show an example of the procedure of integrating rules realized by rule integrator 200.

As shown in FIG. 68, rule integrator 200 first searches for combinations of rules that are potentially integratable in Step S910, i.e., searches for integration candidates, and then checks whether the combinations of rules that have been taken as integration candidates in Step S910 can be integrated. In Step S920, rule integrator 200 then integrates the combinations of rules that can be integrated in Step S930 and amends the rule set.

FIG. 69 shows an example of the procedure of the process of searching for integration candidates of Step S910. When seeking combinations of rules that are potentially integratable, i.e., integration candidates, rule integrator 200 first refers to the rule data stored in matrix space storage 120 to extract all combinations of rules (rule data) that satisfy prescribed conditions in Step S911. The combinations of rules that are here extracted are all combinations of two rules. As the prescribed conditions, the rules must not contain the rule data of the default rule, and the two items of rule data must have the same action. In other words, in Step S911, rule integrator 200 extracts all combinations of two rules that are not the default rule and that have the same action in common.

In Step S912, rule integrator 200 next determines whether combinations that still have not been selected in Step S913 remain among the combinations extracted in Step S911. If still unselected combinations are determined to remain, the process moves on to Step S913, and if it is determined that no still unselected combinations remain, the process of seeking combinations as integration candidates is completed.

In Step S913, rule integrator 200 selects one combination of the still unselected combinations. In other words, rule integrator 200 selects two rules (rule data) that make up one combination among the still unselected combinations. The two rules selected in Step S913 are Ra and Rb. Neither of rules Ra and Rb is the default rule, and the two rules have the same action in common.

In Step S914, rule integrator 200 next counts the number of matrices that make up rule Ra. A matrix list is recorded at the end of the rule data. Accordingly, to count the number of matrices that make up any rule, the number of matrix names in the matrix list recorded in the rule data should be counted. The number of matrices that make up rule Ra, i.e., the number of matrices counted in Step S914, is assumed to be Ma. In Step S915, rule integrator 200 counts the number of matrices that make up rule Rb as in Step S914. The number of matrices that make up rule Rb, i.e., the number of matrices counted in Step S915, is assumed to be Mb.

In Step S916, rule integrator 200 next provisionally constructs the minimum multidimensional solid Q that can be realized by rule Ra and rule Rb and finds the number of matrices that make up the minimum multidimensional solid Q. In this case, the minimum multidimensional solid Q realized by rule Ra and rule Rb is the region that is determined by the starting point and end point that have been selected for each attribute when, as the starting point of each attribute, the starting point is selected that has the smaller value of the starting points of the attribute that corresponds to rules Ra and Rb, and as the end point of each attribute, the end point is selected that has the larger value of the end points of attributes that correspond to rules Ra and Rb. For example, the starting point having the smaller value of the starting points of the first attribute of rules Ra and Rb is selected as the starting point of the first attribute, and the end point having the larger value of the end points of the first attribute of rules Ra and Rb is selected as the end point of the first attribute. The starting points and end points of the second and succeeding attributes are similarly selected. The regions established by the starting points and end points of each of the attributes that have been thus selected form a minimum multidimensional solid. This is here described as a "minimum multidimensional solid" for the sake of convenience, but minimum multidimensional solid Q is not limited to a solid (a solid existing within three-dimensional space) in the strict sense. For example, if there are only two attributes for each of rules Ra and Rb, minimum multidimensional solid Q is a two-dimensional region. If there are four or more attributes for each of rules Ra and Rb, the minimum multidimensional solid Q is a region in four (or more)-dimensional space.

The matrices that make up minimum multidimensional solid Q are the matrices that overlap with the region of minimum multidimensional solid Q. The number of matrices that make up minimum multidimensional solid Q can be calculated using the boundary points found by matrix generator 130. Rule integrator 200 finds the numbers of regions (ranges) for each attribute that are obtained as a result of dividing the ranges from the starting points to the end points of the attributes of minimum multidimensional solid Q by boundary points and then calculates the product of the these numbers that have been found for each attribute, and thus can find the number of matrices that make up minimum multidimensional solid Q. A specific example is shown below.

It is here assumed that the attributes described in each item of rule data are of two types, and that the starting points and end points of the first attribute and second attribute are described in each item of rule data. The boundary points on the X-axis (corresponding to the first attribute) are 0, 10, 40, 60, 80, and 100; and the boundary points on the Y-axis (corresponding to the second attribute) are 0, 10, 20, 50, 70, 80, 90, and 100. The rule data of rule Ra are (10, 60, 20, 90, omitted); and the rule data of rule Rb are (40, 80, 50, 100, omitted). The range of the minimum multidimensional solid Q is therefore (10, 80, 20, 100). The number of regions obtained as a result of dividing the range from the starting point "10" to end point "80" of the first attribute of minimum multidimensional solid Q by the boundary points 10, 40, 60, and 80 on the X-axis is "3." More specifically, these ranges are the range of 10 to 40, the range of 40 to 60, and the range of 60 to 80. The number of regions obtained as a result of dividing the range from the starting point "20" to end point "100" of the second attribute of minimum multidimensional solid Q by the boundary points 20, 50, 70, 80, 90, and 100 on the Y-axis is "5." More specifically, these five ranges are the range of 20 to 50, the range of 50 to 70, the range of 70 to 80, the range of 80 to 90, and the range of 90 to 100. The number of matrices that make up minimum multidimensional solid Q in this example is therefore found to be: 3×5=15. The number of matrices found in Step S916, i.e., the number of matrices that make up minimum multidimensional solid Q, is assumed to be Mq.

After finding Mq, rule integrator 200 determines in Step S917 whether the sum of Ma found in Step S914 and Mb found in Step S915 is equal to Mq found in Step S916. If the sum of Ma and Mb is Mq, i.e., if Ma+Mb=Mq is obtained, rule integrator 200 in Step S918 stores the combination of rules Ra and Rb that have been selected in Step S913 in a buffer (not shown). After Step S918, the process of Step S912 and succeeding steps is repeated. If the sum of Ma and Mb is not Mq in Step S917, i.e., if Ma+Mb=Mq is not obtained, rule integrator 200 repeats the process of Step S912 and succeeding steps without proceeding to Step S918.

The combinations of rules stored in the buffer at the time it is determined that still unselected combinations do not remain in Step S912 are combinations of rules that are potentially integratable, i.e., integration candidates. The combinations of rule data stored in matrix space storage 120 are stored in the buffer as integration candidates. In Step S930 (see FIG. 68), however, rules contained in the rule sets stored in rule storage 110 are integrated together.

FIG. 70 shows an example of the procedure of the processes shown as Step S920 in FIG. 68 to check whether integration is possible and that are carried out upon the combinations of rules that have been taken as integration candidates. After Step S910, and more specifically, after it is determined that still unselected combinations do not remain in Step S912, rule integrator 200 begins the process of checking combinations of rules that have been taken as integration candidates to determine whether integration is possible. In Step S921, rule integrator 200 first determines whether combinations remain that have not been selected in Step S922 (to be described) among the combinations of rules stored in the buffer. If no unselected combinations remain in the buffer, the process ends. If unselected combinations remain in the buffer, rule integrator 200 proceeds to Step S922.

In Step S922, rule integrator 200 selects combinations of rules that still have not been selected from the buffer. It is assumed that the rules that make up the combinations that are selected here are Ra and Rb. In Step S922, rule integrator 200 determines whether all of the apices of minimum multidimensional solid Q realized by rule Ra and rule Rb are related to rule Ra or rule Rb. Here, the apices are the points determined by the combinations of starting points or end points of each attribute. Accordingly, the apices of minimum multidimensional solid Q are points determined by combinations of starting points or end points of each attribute that establish minimum multidimensional solid Q; the apices being, for example, points determined by combinations of the starting point of the first attribute, the end point of the second attribute, the starting point of the third attribute, and so on. The above-described "Apices are related to rule Ra or rule Rb" means that the description of rule Ra or rule Rb is included in the rule list of the matrix data of apex matrices that contain apices. Accordingly, "All apices of minimum multidimensional solid Q realized by rule Ra and rule Rb are related to rule Ra or rule Rb" means that the description of rule Ra or rule Rb is contained in the rule list of matrix data of each apex matrix that contains each of the apices of minimum multidimensional solid Q. In other words, each apex matrix that contains each apex of minimum multidimensional solid Q is a matrix that makes up rule Ra or a matrix that makes up rule Rb. The apex matrices of minimum multidimensional solid Q are the matrices that contain the apices of minimum multidimensional solid Q among the matrices that make up minimum multidimensional solid Q.

When determining whether all apices of minimum multidimensional solid Q are related to rule Ra or rule Rb, rule integrator 200 should determine whether the description of rule Ra or rule Rb is included in the rule list of the matrix data of all apex matrices of minimum multidimensional solid Q. If the description of rule Ra or rule Rb is included in the rule list of the matrix data of all apex matrices of minimum multidimensional solid Q, all apices of Q are related to rule Ra or rule Rb. If the description of either of rule Ra and Rb does not exist in the rule list of matrix data of any apex matrix, there is no relation. Rule integrator 200 should identify, from among each of the matrices that make up minimum multidimensional solid Q, those matrices that contain apices of minimum multidimensional solid Q to identify the apex matrices of minimum multidimensional solid Q.

If all apices of minimum multidimensional solid Q are related to rule Ra or rule Rb, the starting points of each of the attributes of minimum multidimensional solid Q are either the starting points of the attributes that correspond to rule Ra or the starting points of attributes that correspond to rule Rb. The end points of each of the attributes of minimum multidimensional solid Q are either end points of attributes that correspond to rule Ra or end points of attributes that correspond to rule Rb.

If all of the apices of minimum multidimensional solid Q realized by rule Ra and rule Rb are determined in Step S922 to be related to rule Ra or rule Rb, the process proceeds to Step S923. In Step S923, rule integrator 200 records the combinations of rules selected in Step S922 in a buffer (not shown).

This buffer is a different buffer than the buffer for recording combinations in Step S910, and more specifically, Step S918. At least, the memory area for recording combinations in Step S918 should differ from the memory area for recording combinations in Step S923. In the following explanation, the buffer for recording combinations in Step S923 is referred to as the "rule integration buffer." After Step S923, the process proceeds to Step S921. If all apices of minimum multidimensional solid Q that is realized by rule Ra and rule Rb are determined to have no relation to rule Ra or rule Rb in Step S922, the process proceeds to Step S921 without carrying out the recording of combinations of Step S923.

Upon determining that no unselected combinations remain in Step S921, each of the combinations stored in the rule integration buffer represents two rules for which rule integration has been confirmed as possible.

After Step S920 and after the determination that no unselected combinations remain in Step S921 shown in FIG. 70, rule integrator 200 in Step S930 integrates the two rules stored in rule storage 110 for each of the combinations for which rule integration has been confirmed to be possible. In this Step S930, rule integrator 200 may execute the following process. Rule integrator 200 refers to each of the combinations stored in the rule integration buffer after Step S920 and identifies the two rules indicated by each combination from among the rule sets stored in rule storage 110. Rule integrator 200 then integrates the two rules for each set of two rules. In the following explanation, the rules that are represented by each of the combinations stored in the rule integration buffer after Step S920 and that are identified from among the rule sets stored in rule storage 110 are assumed to be Ra and Rb.

After identifying integratable rules Ra and Rb from among the rule sets stored in rule storage 110, rule integrator 200 should select from among starting points of attributes that correspond to rule Ra and starting points of attributes that correspond to rule Rb those starting points having the smaller value as the starting points of each attribute of new rules, select from among end points of attributes that correspond to rule Ra and end points of attributes that correspond to rule Rb the end points having the greater value as the end points of each attribute of new rules, and thus determine the starting points and end points of each attribute of new rules, i.e., rules obtained by integrating Ra and Rb. When the starting points, or the end points, of attributes corresponding to rules Ra and Rb are the same, rule integrator 200 should take these equal values as the starting points, or end points, of a new rule. Rule integrator 200 should determine actions that are shared by rules Ra and Rb as the actions of a new rule, i.e., a rule realized by integrating Ra and Rb.

As an example, rules Ra and Rb that are the object of integration are assumed to be (20, 90, 50, 120, A) and (90, 140, 50, 120, A), respectively. As the starting point of the first attribute of the new rule in which Ra and Rb are integrated, rule integrator 200 selects starting point "20" that is the smaller value of the starting point "20" of the first attribute of rule Ra and starting point "90" of the first attribute of rule Rb and makes this selected value the starting point of the first attribute of the new rule. As the end point of the first attribute of the new rule, rule integrator 200 selects end point "140" that is the larger of the end point "90" of the first attribute of rule Ra and end point "140" of the first attribute of rule Rb, and makes this selected value the end point of the first attribute of the new rule. As described above, when the starting points, or end points, of an attribute corresponding to rules Ra and Rb are equal to each other, rule integrator 200 should take these equal values as the starting point or end point of the new rule. In this example, the starting points of the second attribute are "50" for both Ra and Rb, and the end points of the second attribute are "120" for both Ra and Rb. Accordingly, in this example, rule integrator 200 sets the starting point and end point of the second attribute of the new rule as "50" and "120," respectively. In this example, rule integrator 200 sets action "A" that is shared by Ra and Rb as the action of the new rule. Thus, in the case of this example, rule integrator 200 adds to the rule set stored in rule storage 110 the rule (20, 140, 50, 120, A) as the new rule in which rules Ra and Rb are integrated.

In Step S930, rule integrator 200 deletes the two rules that were the objects of integration from the rule set stored in rule storage 110. In other words, when integrating two rules in Step S930, rule integrator 200 carries out a process of deleting the two rules that are the objects of integration from the rule set and a process of creating a new rule in which these two rules have been integrated and adding this new rule to the rule set. Rule integrator 200 carries out these processes for each set of integratable rules Ra and Rb.

In the foregoing explanation, combinations of two rules that can be integrated are selected and these two rules then integrated to create a new rule. By repeating these processes, three or more rules can also be integrated. As an example, two rules Ra and Rb may be first integrated to produce Rc, following which the processes of Step S910 and succeeding steps are carried out to produce a new rule in which Rc and another rule are integrated. In this case, not only must the rule set be amended, but the matrix spatial data must also be amended. For example, matrix generator 130 should use the rule set to which integrated rules have been added to create new matrix spatial data, and then again carry out the processes of Step S910 and succeeding steps. When the integration process is repeated in this way, rule integrator 200 repeats the process until a combination of rules that can be integrated cannot be identified. In other words, when no combinations are recorded in the buffer at the time the process branches toward "NO" in Step S912, or when no combinations are recorded in the buffer at the time the process branches toward "NO" in Step S921, the repetition of the integration process should terminate.

Even when the above-described integration process is not repeated, matrix generator 130 may use the rule set to which integrated rules have been added to newly produce matrix spatial data for the purpose of establishing conformity between the matrix spatial data and the rule set that is stored in rule storage 110 after rule integration.

Explanation next regards the advantages of the filtering rule analysis system of the eighth exemplary embodiment. The filtering rule analysis system of the eighth exemplary embodiment enables integration of two rules that can be integrated regardless of the complexity of the filtering rules. This capability is achieved because the present exemplary embodiment: allows matrix spatial data to be generated from rules, allows the number of matrices that make up two rules that satisfy prescribed conditions to be compared with the number of matrices that make up a minimum multidimensional solid realized by these two rules to thus find integration candidates, and relating to these integration candidates, allows determination of whether all apices of the minimum multidimensional solid Q are related to rule Ra or rule Rb to investigate the potential for integration.

If rules are integrated, the number of rules can be reduced, thereby allowing an administrator to more easily comprehend the rules. When establishing the order of new rules, for example, the administrator should check the rules following integration and then determine the order of these rules. However, the method of determining the order of the rules after integration is not limited to the method by which the administrator checks and determines the rules.

Explanation next regards the operations of the filtering rule analysis system of the eighth exemplary embodiment using a concrete example. The operations up to the input of rule set 910 and storage in matrix space storage 120 as matrix spatial data are similar to the first exemplary embodiment and explanation is therefore here omitted. Matrix space storage 120 is assumed to store the rule data shown by way of example in FIG. 71B as rule data that are contained in matrix spatial data. FIG. 71A is a schematic view representing each rule indicated by rule data shown by way of example in FIG. 71B and each matrix created in matrix generator 130. The numbers indicated by arrows in FIG. 71B represent the numbers of matrices that make up each rule.

In Step S911, rule integrator 200 refers to the rule data shown by way of example in FIG. 71B and extracts all combinations of two rules (rule data) that are rules other than the default rule and that share actions. In this example, rule integrator 200 extracts combinations of the ten types: (R2, R3), (R2, R4), (R2, R5), (R2, R6), (R3, R4), (R3, R5), (R3, R6), (R4, R5), (R4, R6), and (R5, R6). All of these combinations have the action "A" in common. The action of rule R1 in FIG. 71B is "D," and the only other rule having the action "D" is default rule R7. As a result, combinations that contain R1 are not extracted in this example.

Rule integrator 200 next selects rule data that make up each combination, finds Ma, Mb, and Mq, and if Ma+Mb=Mq, repeats the process of recording in a buffer the combination of rule data that has been selected, i.e., repeats the processes of Step S912 and succeeding steps. If no combinations remain in Step S912, the process of finding integration candidates ends.

FIG. 72 shows the comparison of Ma+Mb and Mq in each of the above-described ten types of combinations. In FIG. 72, M(Ra+Rb) shows the number of matrices that make up minimum multidimensional solid Q realized by rule Ra and rule Rb. For example, "M(R2+R3)=36" shows that the number of matrices that make up minimum multidimensional solid Q realized by rules R2 and R3 is 36. The notation such as M(R2) shown to the right of the equal sign or inequality signs show the number of matrices that make up each rule. For example, M(R2) shows the number of matrices that make up rule R2. As shown in FIG. 72, the combination of rule R3 and rule R5 is the only combination of two rules for which the number of matrices Mq that make up minimum multidimensional solid Q realized by the two rules equals the sum of numbers of matrices Ma+Mb that make up each of the two rules. Thus, when rule integrator 200 has determined in Step S912 that no combinations remain, only the combination of rule R3 and rule R5 is recorded in the buffer.

Focusing now on the combination of rule R4 and rule R6, as shown in FIGS. 71A and 71B, the ranges of the second attribute coincide for reference rules R4 and R6, and the region indicated by rule R4 and the region indicated by R6 are not separated. As a result, recording the combination of rule R4 and rule R6 in the buffer can also be considered appropriate, but in the present exemplary embodiment, the combination of rule R4 and rule R6 is excluded from integration candidates and therefore not recorded in the buffer. In the present exemplary embodiment, rule analysis system 100 may be provided with rule deletion unit 170 (see FIG. 34) as in the fifth exemplary embodiment, and the reduction described in the fifth exemplary embodiment may also be carried out. Rule integrator 200 may then execute the processes of Step S910 and succeeding steps. As a result of the reduction in this case, "YES" is also determined in Step S917 relating to the combination of rule R4 and rule R6, and the combination of rule R4 and rule R6 is also recorded in the buffer. However, explanation here regards a case in which only the combination of rule R3 and rule R5 is recorded in the buffer.

In Step S921, rule integrator 200 determines that the combination of rule R3 and rule R5 remains, and in Step S922, determines whether all apices of minimum multidimensional solid Q realized by rule R3 and rule R5 are related to rule R3 or rule R5. In the case of this example, all apices of minimum multidimensional solid Q realized by rule R3 and rule R5 relate to rule R3 or rule R5, and rule integrator 200 therefore records in the rule integration buffer the combination of rule R3 and rule R5. In this example, still unselected combinations no longer exist as a result of the above-described process, and the process therefore branches toward "NO" in Step S921 and the process of checking whether combinations of rules taken as integration candidates can be integrated therefore ends.

Explanation next regards the reasons for carrying out the determination of Step S922 as described above. The number of matrices of the portion in which two rules overlap and, of the matrices that make up minimum multidimensional solid Q realized by the two rules, the number of matrices that have no relation to the two rules may in some case match by mere chance, and the determination of Step S922 is carried out to exclude such cases. FIG. 73 shows an example in which the number of matrices of the portion in which two rules overlap coincides with, of the matrices that make up minimum multidimensional solid Q realized by the two rules, the number of matrices that have no relation to the two rules. In the example shown in FIG. 73, the number of matrices of the portion in which the two rules overlap is "2." In addition, of the matrices that make up minimum multidimensional solid Q, the number of matrices having no relation to the two rules is also "2." In such a case, "YES" is determined in Step S917 (see FIG. 69), but the rules cannot be integrated. In the present exemplary embodiment, only combinations for which the determination of Step S922 is "YES" are recorded in Step S923, whereby the recording in Step S923 of combinations of two rules that cannot be integrated such as shown by way of example in FIG. 73 can be prevented.

When the process branches toward "NO" in Step S921 after Step S920 shown in FIG. 68, rule integrator 200 in Step S930 both deletes rules R3 and R5 from the rule set stored in rule storage 110 and adds the new rule in which rules R3 and R5 have been integrated.

In the foregoing explanation, a case was described in which, when extracting combinations of rules in Step S911 (see FIG. 69), reference is made to rule data stored in matrix space storage 120 and combinations of rules then extracted. Alternatively, when extracting combinations of rules in Step S911, reference may be made to rule sets stored in rule storage 110 instead and the combinations of rules then extracted. In this case, reference may also be made to the matrix spatial data stored in matrix space storage 120 in the processes of finding the number of matrices shown in Steps S914 to S916 and Step S922.

In the foregoing explanation, a case was described in which the operations of matrix generator 130 are the same as in the first exemplary embodiment. However, in the process of creating matrix spatial data, matrix generator 130 may also carry out the process of Step S109 described in the seventh exemplary embodiment. In other words, matrix generator 130 may carry out the operations similar to matrix generator 130 described in the seventh exemplary embodiment.

In each of the exemplary embodiments described above, explanation regarded cases in which the starting point and end point of each attribute of the rules are taken as boundary points. If the starting points and end points are taken as the boundary points, the attributes of packets that are on the boundaries of rule regions will be located on the boundaries of a plurality of matrices. FIGS. 74A and 74B are explanatory views showing packets on the boundaries of rule regions. As shown in FIG. 74A, a packet for which the first attribute and the second attribute are both "2" is assumed to exist on the boundary of rule R1 and rule R2. When establishing a matrix with the starting point and end point as the boundary point, a packet in which the first attribute and second attribute are both "2" will be located on the boundary of the matrices that make up rule R1 and the matrices that make up rule R2. A packet in which each attribute is indicated by only one value is preferably contained inside the boundaries of only one matrix such that it will not be situated on the boundary of matrices. Rather than making the starting points and end points of each attribute of a rule the boundary points, values obtained by subtracting a prescribed value from the values that represent the starting points of each attribute of a rule and value obtained by adding a prescribed value to the values that represent the end points of each attribute of the rule may be taken as the boundary points. If the boundary points are established in this way, a packet in which each attribute is indicated by only one value as with the packet shown in FIG. 74A will be contained within the boundaries of only one matrix.

FIG. 74B shows such a state. In the example shown in FIG. 74B, the prescribed value is set to, for example, 0.5, whereby the boundary points are set to "1.5" obtained by subtracting the prescribed value from the starting point "2" of the first attribute of rule R1 and "4.5" obtained by adding the prescribed value to the end point "4" of the first attribute of rule R1. Boundary points are further set to "1.5" obtained by subtracting the prescribed value of 0.5 from the starting point "2" of the second attribute of rule R1 and "3.5" obtained by adding the prescribed value 0.5 to end point "3" of the second attribute of rule R1. Matrix Mx shown in FIG. 74B is a matrix prescribed by these boundary points "1.5" and "4.5" of the first attribute and the boundary points "1.5" and "3.5" of the second attribute. By establishing the boundary points in this way, a packet in which the value of each attribute is "2" shown in FIG. 74A will exist within the boundaries of matrix Mx.

Explanation next regards a case presented as a modification of each of the above-described exemplary embodiments in which, as described hereinabove, the boundary points are made a value obtained by subtracting a prescribed value from the value that indicates the starting point of each attribute of a rule and a value obtained by adding the prescribed value to the value that indicates the end point of each attribute of the rule.

When establishing the boundary points as described above in each of the above-described exemplary embodiments, matrix generator 130 (or matrix generator 131) in Step S103 (for example, see FIGS. 2, 27, 65 and the like) collects the starting points and end points relating to the attributes selected in the immediately preceding Step S102 from the condition portions of all rules stored in rule storage 110. Matrix generator 130 (or matrix generator 131) should then set, as boundary points, values obtained by subtracting a prescribed value from the collected starting points and values obtained by adding the prescribed value to the collected end points, and then in the next Step S104, should sort these boundary points and delete overlapping boundary points.

The prescribed value used in the above-described subtraction and addition should be determined as next described. A prescribed value that corresponds to a particular attribute should be a value less than the minimum value of the difference between two different values of that attribute. For example, when the attribute is the IP address (source address or destination address), this address is represented by, for example, "www.xxx.yyy.zzz," and this address, being represented by 32 bits of data, can be represented by an integer. As a result, the minimum value of the difference between two different values of an address is "1." Accordingly, when each address is an integer represented by 32 bits, the prescribed value should be set as a value less than 1 (for example, 0.5) and the boundary points should be found by subtracting this prescribed value from the address starting point that is represented by an integer of 32 bits and adding this prescribed value to the address end point that is represented by an integer of 32 bits.

The port number is an integer of 0 to 65535. Accordingly, when the attribute is a port number (source port or destination port), the minimum value of the difference between two different values of the port number is "1." As a result, when the attribute is a port number, the prescribed value is set as a value less than 1 (for example, 0.5) and the boundary points should be found by subtracting this prescribed value from the starting point or adding this prescribed value to the end point.

The protocol that serves as an attribute is converted to a numerical value in advance. As a result, the prescribed value may be set to a value less than the minimum value of the difference in values that correspond to different protocols. For example, if TCP is "0" and UDP is "1," the minimum value of the difference in values corresponding to each of the protocols is "1." The prescribed value should therefore be established as a value less than "1" (for example, 0.5) and the boundary points should be found by subtracting this prescribed value from the starting points or adding the prescribed value to the end points.

The boundary points should be taken as values obtained by subtracting the prescribed value from starting points and values obtained by adding the prescribed value to end points for each attribute, and after these boundary points have been sorted and overlapping boundary points deleted, these boundary points should be used to execute the process of Step S105 (see FIG. 1) to create matrices. In other words, matrix generator 130 (or matrix generator 131) uses these boundary points to create matrix data realized by two adjacent boundary points of all attributes. Matrix generator 130 (or matrix generator 131) should then create matrix spatial data by the processes of Steps S106 to S108. However, the rule data contained within matrix spatial data are generated by the addition of the list of matrices that make up rules to the rule data stored in rule storage 110. Accordingly, the attributes of the rule data contained in matrix spatial data are identical to the attributes of the rule data that are originally stored in rule storage 110, and values obtained by subtracting the prescribed value from starting points and values obtained by adding the prescribed value to end points are not described.

On the other hand, the matrix data contained in matrix spatial data take as boundary points values obtained by subtracting the prescribed value from values that represent the starting points of each attribute of rules and values obtained by adding the prescribed value to values that represent the end points of each attribute of rules, and these matrix data are generated by using these boundary points. As a result, the boundary points that have been found as described above are described as the starting points and end points of each attribute in the matrix data contained in matrix spatial data. In other words, the starting points and end points of each attribute in matrix data do not match the starting points and end points of each attribute in the rule data originally stored in rule storage 110.

When matrix spatial data are created that take as boundary points values obtained by subtracting a prescribed value from values that represent starting points of each attribute of rules and values obtained by adding the prescribed value to values that represent end points of each attribute of rules, the description "matrices that make up rules" is assumed to mean a set of matrices as described below. Specifically, "matrices that make up rules" means the set of matrices in which the ranges of each of the attributes of the matrices overlaps with at least a portion of the ranges of the attributes indicated by the condition portion of the rules.

FIGS. 75A and 75B show examples of matrices that take as boundary points values obtained by subtracting a prescribed value from values that represent the starting points of each attribute of rules and values obtained by adding the prescribed value to values that represent the end points of each attribute of rules. As shown in FIG. 75A, the starting point and end point of the first attribute of rule R1 are 2 and 4, respectively, and the starting point and end point of the first attribute of rule R2 are 1 and 2, respectively. The prescribed value is assumed to be 0.5. The boundary points of the first attribute found from rule R1 and R2 are therefore: 1.5 (=2−0.5), 4.5 (=4+0.5), 0.5 (=1−0.5), and 2.5 (=2+0.5). The boundary points of the second attribute found from rules R1 and R2 are: 1.5 (=2−0.5), 3.5 (=3+0.5), 1.5 (=2−0.5), and 3.5 (=3+0.5).

Sorting the boundary points of the first attribute found from rules R1 and R2 yields: 0.5, 1.5, 2.5, and 4.5. Sorting the boundary points of the second attribute found from rules R1 and R2, and further, deleting overlapping boundary points yields: 1.5 and 3.5. The three matrices shown by broken lines in FIG. 75B are obtained from these boundary points of the first attribute (0.5, 1.5, 2.5, 4.5) and boundary points of the second attribute (1.5, 3.5).

If matrix spatial data are created that take as boundary points values obtained by subtracting the prescribed value from values that represent the starting points of each attribute of rules and values obtained by adding the prescribed value to values that represent the end points of each attribute of rules, the results of adding and subtracting the prescribed value are shown when the starting points and end points of each attribute contained in the matrix data are shown. For example, the overlap of the range of matrix E of a particular rule A by a particular rule D may be supplied as the results of overlap analysis as in Step S214 shown in FIG. 4. When supplying the ranges of each attribute in matrix E in this case, overlap analyzer 140 supplies values obtained by adding the prescribed value to the starting points of each attribute and values obtained by subtracting the prescribed value from the end points of each attribute in the matrix data of matrix E. In other words, overlap analyzer 140 supplies values that precede the subtraction of the prescribed value and addition of the prescribed value in Step S103, i.e., values that match any starting point or any end point described in the rule data.

The minimum multidimensional solid Q described in the eighth exemplary embodiment is determined not by matrix data but by rules (rule data). Each of the apices of the minimum multidimensional solid Q are determined by the combinations of the starting points and end points of each attribute described in the rule data, and each of the apices of minimum multidimensional solid Q are therefore not identified from boundary points for which the addition and subtraction have been carried out at Step S103. In addition, the regions of minimum multidimensional solid Q are included within the regions of the entirety of matrices that make up minimum multidimensional solid Q.

In favorable exemplary embodiments of the present invention described in the foregoing explanation, the buffer may be a part of the storage area of rule storage 110 or matrix space storage 120, or may be a storage device distinct from rule storage 110 and matrix space storage 120. Matrix generators 130, 131 are equivalent to a spatial data creation means. The matrix spatial data are equivalent to spatial data. Rule maker 190 is equivalent to a rule creation means. Finally, rule integrator 200 is equivalent to an integratable rule identification means and a rule integration means.

INDUSTRIAL APPLICABILITY

The present invention can be applied in controlling the rule settings of network devices and software for realizing packet filtering.

The invention claimed is:

1. A filtering rule analysis method comprising:
   a step of storing a set of rules in which an order of priority has been set, the rules being used in a packet filtering process; and
   a spatial data generation step of generating spatial data that contains information of said order of priority, said spatial data indicating a correspondence relation between: a minimum region identified by starting points and end points of ranges of packet attributes described in each rule as a condition of application of the rule; and the rules.

2. The method according to claim 1, further comprising:
   an integratable rule identification step for identifying a combination of rules that can be integrated; and
   a rule integration step for integrating rules that make up the combination identified in said integratable rule identification step and that are rules belonging to said rule set that has been stored.

3. The method according to claim 2, wherein said integratable rule identification step includes steps of:
   when a sum of number of minimum regions that correspond to one of two rules that share operations and that are not default rules and number of minimum regions that correspond to the other rule of said two rules matches number of minimum regions that correspond to a region determined by said two rules, taking the combination of said two rules as an integratable rule combination candidate; and
   when, of the minimum regions that correspond to a region determined by two rules that make up said combination candidate, each minimum region that contains an apex of the region determined by said two rules corresponds to either one of said two rules, taking the combination of said two rules as an integratable rule combination.

4. The method according to claim 2, wherein said integratable rule identification step and said rule integration step are repeated until a combination of integratable rules can no longer be identified in said integratable rule identification step.

5. The method according to claim 1, wherein said spatial data generation step includes a step of deleting, of generated spatial data, data of a minimum region that can be placed in correspondence with only a default rule.

6. The method according to claim 2, wherein said spatial data generation step includes a step of deleting, of generated spatial data, data of a minimum region that can be placed in correspondence with only a default rule.

7. The method according to claim 1, wherein said spatial data generation step includes: a step of using values obtained by subtracting a prescribed value from values of starting points of ranges of packet attributes described in each rule as a condition of application of the rule and values obtained by adding a prescribed value to values of end points of ranges of said attributes to determine a minimum region that is identified by starting points and end points of ranges of packet attributes described in each rule as a condition of application of the rule.

8. The method according to claim 2, wherein said spatial data generation step includes: a step of using values obtained by subtracting a prescribed value from values of starting points of ranges of packet attributes described in each rule as a condition of application of the rule and values obtained by adding a prescribed value to values of end points of ranges of said attributes to determine a minimum region that is identified by starting points and end points of ranges of packet attributes described in each rule as a condition of application of the rule.

9. A filtering rule analysis system comprising:
rule storage means for storing a set of rules in which an order of priority has been set, the rules being used in a packet filtering process; and
spatial data generation means for generating spatial data which contains information of said order of priority, said spatial data indicating a correspondence relation between: a minimum region identified by starting points and end points of ranges of packet attributes described in each rule as a condition of application of the rule, and the rules.

10. The system according to claim 9, further comprising overlap analysis means that uses spatial data generated by said spatial data generation means to analyze overlap of ranges of attributes described as a condition of application of each rule.

11. The system according to claim 10, wherein said overlap analysis means detects a state in which a range of an attribute described in one rule is contained within or partially overlaps with a range of an attribute described in another rule having a higher order of priority than said one rule.

12. The system according to claim 9, further provided with:
packet attribute input means for receiving packet attributes as input; and
pass test means for using spatial data that has been generated by said spatial data generation means to determine the minimum region to which said packet attributes pertain, and then, by checking operation that accords with the rule that corresponds to the minimum region to which said packet attributes pertain, determining whether a packet having attributes that have been received as input is to be permitted to pass in the packet filtering process.

13. The system according to claim 12, wherein:
said packet attribute input means receives ranges of packet attributes represented by starting points and end points as packet attributes; and
said pass test means determines the minimum range to which the range of attribute of said packet pertains.

14. The system according to claim 9, wherein:
said rule storage means stores a plurality of rule sets;
said spatial data generation means extracts starting points and end points of ranges of attributes of a packets described in each rule as a condition of application of the rule from all rules contained in said plurality of rule sets and uses said starting points and end points to generate said spatial data for each rule set; and
said system further comprises sameness analysis means for determining whether packet filtering processes based on each rule set are the same process or not by determining whether operations of rules in minimum regions corresponding to a plurality of items of spatial data match or not.

15. The system according to claim 14, wherein said sameness analysis means supplies ranges of said minimum regions as output upon determining that the operations of rules in minimum regions that correspond to a plurality of items of spatial data do not match.

16. The system according to claim 9, further comprising rule deletion means that: refers to said spatial data generated by said spatial data generation means to identify a rule that, despite deletion, exerts no influence on the packet filtering process, and that deletes said identified rule.

17. The system according to claim 9, further comprising rule amendment means that refers to said spatial data generated by said spatial data generation means to amend a relevant rule so as to exclude, of the regions identified by ranges of attributes described in each rule as a condition of application of the rule, a region that despite elimination exerts no influence on the packet filtering process.

18. The system according to claim 17, wherein said rule amendment means realizes the amendment by identifying, a ranges of attributes described as a condition of application of one rule, a region of overlap with a range of an attribute described as a condition of application of another rule having a higher order of priority, and when a range of all attributes other than the one attribute in this region matches the range of the attributes originally described as the condition of application of said one rule, narrowing a range of said one attribute in said one rule.

19. The system according to claim 17, wherein said rule amendment means divides, by said minimum regions, a rule for which a portion of a range of an attribute described as a condition of application overlaps with the range of an attribute described as a condition of application of another rule having a higher order of priority, and, of the plurality of rules obtained by the division, deletes a rule that overlaps with the range of the attribute described as a condition of application of another rule having a higher order of priority.

20. The system according to claim 9, further comprising:
frequency analysis means that refers to attributes of a plurality of packets that are actual objects of the packet filtering process to count, for each minimum region, number of packets for which attributes are contained in the minimum region; and
rule creation means that sorts said minimum regions in order of greater number of packets that have been counted, and that creates a new rule based on a portion or all of said minimum regions and rules that correspond to these minimum regions.

21. The system according to claim 20, wherein said rule creation means selects, of minimum regions that have been sorted, a prescribed number of minimum regions in order of greater numbers of counted packets and then creates a new rule based on these minimum regions and rules that correspond to these minimum regions to add to originally existing set of rules.

22. The system according to claim 21, wherein said rule creation means identifies, of the set of rules to which a newly created rule has been added, a rule that despite deletion exerts no effect on the packet filtering process, and deletes the identified rules.

23. The system according to claim 20, wherein said rule creation means selects all sorted minimum regions in order, creates new a rule based on a minimum region that has been selected and a rule that corresponds to the selected minimum region, and creates a set of new rules from only created rules.

24. The system according to claim 20, wherein said rule creation means joins together minimum regions that are adjacent minimum regions for which difference in number of packets counted by said frequency analysis means is within a prescribed range to thus produce one minimum region and then produces a new rule after joining the minimum regions.

25. The system according to claim 9, further comprising:
integratable rule identification means for identifying a combination of rules that can be integrated; and
rule integration means for integrating rules together that are rules belonging to a rule set stored in said rule storage means and that make up a combination that have been identified by said integratable rule identification means.

26. The system according to claim 25, wherein said integratable rule identification means, when a sum of number of minimum regions that correspond to one of two rules that share operations and that are not a default rule and a number of minimum regions that correspond to the other rule of said two rules matches number of minimum regions that correspond to a region determined by said two rules, takes the combination of said two rules as an integratable rule combination candidate; and when, of the minimum regions that correspond to a region determined by said two rules that make up said combination candidate, each minimum region that contains an apex of the region determined by said two rules corresponds to either one of said two rules, takes the combination of said two rules as an integratable rule combination.

27. The system according to claim 25, wherein said integratable rule identification means identifies a combination of rules that can be integrated and said rule integration means repeats the integration of rules that make up identified combinations until said integratable rule identification means can no longer identify a combination of rules that can be integrated.

28. The system according to claim 9, wherein said spatial data generation means deletes, of generated spatial data, data of a minimum region that has been placed in correspondence with only a default rule.

29. The system according to claim 9, wherein said spatial data generation means uses values obtained by subtracting a prescribed value from values of starting points of ranges of packet attributes described in each rule as a condition of application of the rule and values obtained by adding a prescribed value to values of end points of ranges of said attribute to determine a minimum region that is identified by starting points and end points of ranges of packet attributes that are described in each rule as a condition of application of that rule.

30. A recording medium for storing a program which causes a computer, which includes a rule storage area for storing a set of rules in which an order of priority has been set, said ruled being used in a packet filtering process, to execute a process of:
generating spatial data that contains information of said order of priority, said spatial data indicating a correspondence relation between: a minimum region identified by starting points and end points of ranges of packet attributes described in each rule as a condition of application of the rule, and the rules.

31. The recording medium according to claim 30, wherein the program further causes said computer to execute:
an integratable rule identification process for identifying a combination of rules that can be integrated; and
a rule integration process of integrating rules that make up the combination identified by integratable rule identification means and that are rules belonging to a rule set that has been stored in a rule storage means.

32. The recording medium according to claim 31, wherein the program causes said computer to execute, in said integratable rule identification process:

a process of, when a sum of number of minimum regions that correspond to one of two rules that share operations and that are not a default rule and number of minimum regions that correspond to the other rule of said two rules matches number of minimum regions that correspond to a region determined by said two rules, taking the combination of said two rules as an integratable rule combination candidate; and a process of, when, of the minimum regions that correspond to a region determined by two rules that make up said combination candidate, each minimum region that contains an apex of the region determined by said two rules corresponds to either one of said two rules, taking the combination of said two rules as an integratable rule combination.

33. The recording medium according to claim 31, wherein the program causes said computer to execute a process of repeating said integratable rule identification process and said rule integration process until a combination of integratable rules can no longer be identified.

34. The recording medium according to claim 30, wherein the program causes said computer to execute a minimum region deletion process of deleting, of said spatial data, data of a minimum region that can be placed in correspondence with only a default rule.

35. The recording medium according to claim 30, wherein the program causes said computer to execute a process of using values obtained by subtracting a prescribed value from values of starting points of ranges of packet attributes described in each rule as a condition of application of the rule and values obtained by adding a prescribed value to values of end points of ranges of said attributes to determine a minimum region that is identified by starting points and end points of ranges of packet attributes described in each rule as a conditions of application of the rule.

36. A filtering rule analysis method comprising:
a step of storing a set of rules in which an order of priority has been set, the rules being used in a packet filtering process; and
a spatial data generation step of generating spatial data indicating a correspondence relation between: a minimum region identified by a range of packet attributes described in each rule as a condition of application of the rule; and the rules.

37. A filtering rule analysis system comprising:
rule storage means for storing a set of rules in which an order of priority has been set, the rules being used in a packet filtering process; and
spatial data generation means for generating spatial data indicating a correspondence relation between: a minimum region identified by a range of packet attributes described in each rule as a condition of application of the rule, and the rules.

38. A recording medium for storing a program which causes a computer, which includes a rule storage area for storing a set of rules in which an order of priority has been set, the rules being used in a packet filtering process, to execute a process of:
generating spatial data indicating a correspondence relation between: a minimum region identified by a range of packet attributes described in each rule as a condition of application of the rule, and the rules.

* * * * *